US012076667B2

(12) United States Patent
Renken et al.

(10) Patent No.: US 12,076,667 B2
(45) Date of Patent: Sep. 3, 2024

(54) DISPOSABLE INSERT FOR STRAINER BASKET

(71) Applicant: Hayward Industries, Inc., Charlotte, NC (US)

(72) Inventors: Troy Renken, Mooresville, NC (US); Jason Parcell, Pfafftown, NC (US); William Kevin Carpenter, Warrensville, NC (US); Jacob Smith, Mocksville, NC (US)

(73) Assignee: Hayward Industries, Inc., Charlotte, NC (US)

( * ) Notice: Subject to any disclaimer, the term of this patent is extended or adjusted under 35 U.S.C. 154(b) by 265 days.

(21) Appl. No.: 17/199,364

(22) Filed: Mar. 11, 2021

(65) Prior Publication Data

US 2021/0283534 A1    Sep. 16, 2021

Related U.S. Application Data

(60) Provisional application No. 63/043,621, filed on Jun. 24, 2020, provisional application No. 62/988,266, filed on Mar. 11, 2020.

(51) Int. Cl.
*B01D 29/23* (2006.01)
*E04H 4/12* (2006.01)

(52) U.S. Cl.
CPC ........... *B01D 29/23* (2013.01); *E04H 4/1272* (2013.01); *B01D 2201/325* (2013.01); *B01D 2201/4084* (2013.01)

(58) Field of Classification Search
None
See application file for complete search history.

(56) References Cited

U.S. PATENT DOCUMENTS

| 468,157 A | * | 2/1892 | Shapley | .................... E03F 5/04 |
|---|---|---|---|---|
| | | | | 137/247.11 |
| 790,052 A | * | 5/1905 | Hardie et al. | ........... A47J 31/14 |
| | | | | 210/466 |

(Continued)

FOREIGN PATENT DOCUMENTS

| CA | 3171229 A1 | * | 9/2021 | ............. B01D 29/23 |
| EP | 0499506 A1 | | 8/1992 | |

(Continued)

OTHER PUBLICATIONS

In the Swim, "Zone Filtration Skim Bag", product listing at <www.intheswim.com/p/skim-bag-skimmer-filter>, print-out dated Mar. 10, 2020 (5 pages).

(Continued)

*Primary Examiner* — Robert J Popovics
(74) *Attorney, Agent, or Firm* — McCarter & English, LLP

(57) ABSTRACT

Debris filtration and strainer systems for a fluid handling device are provided herein. The strainer systems can include one or more of a strainer basket, a removable insert, and an adapter for removably engaging the removable insert with the strainer basket. The removable insert includes a liner having a plurality of openings that are the same size as, or smaller than, the openings of a the strainer basket, and which is inserted into the strainer basket to capture debris from water passing therethrough, preventing clogging of the strainer basket and reducing the frequency of cleanings of the strainer basket. The liner can be fabricated from a biodegradable material, and thus can be easily removed, disposed of, and replaced. The removable insert can include a rigid connection tab with one or more features for removably engaging the strainer basket and/or an adapter positioned between the strainer basket and the removable insert.

37 Claims, 32 Drawing Sheets

(56) References Cited

U.S. PATENT DOCUMENTS

| | | | | |
|---|---|---|---|---|
| 1,248,114 A * | 11/1917 | Hershey | A47J 31/14 | |
| | | | 210/467 | |
| 2,070,998 A * | 2/1937 | Odom | B44D 3/10 | |
| | | | 209/403 | |
| 2,183,773 A * | 12/1939 | Lehman | A47J 31/14 | |
| | | | 209/374 | |
| D131,875 S | 3/1942 | Houston | | |
| 2,574,683 A * | 11/1951 | Anderson | A47L 9/1454 | |
| | | | 55/377 | |
| 2,590,235 A * | 3/1952 | Cranmer | A47L 5/362 | |
| | | | 55/362 | |
| 2,632,355 A | 3/1953 | Becker | | |
| 2,658,625 A * | 11/1953 | Rafferty | B01D 35/02 | |
| | | | 210/497.3 | |
| 2,758,667 A * | 8/1956 | Brace | A47L 5/362 | |
| | | | 55/362 | |
| 2,792,943 A * | 5/1957 | Mackintosh | B01D 29/27 | |
| | | | 210/209 | |
| 2,851,164 A * | 9/1958 | Morino | B01D 29/23 | |
| | | | 210/485 | |
| 2,864,462 A * | 12/1958 | Brace | A47L 9/1445 | |
| | | | 55/367 | |
| 2,870,863 A * | 1/1959 | Bramhall | A47L 9/14 | |
| | | | 55/363 | |
| 2,945,558 A * | 7/1960 | Cordell | A47L 9/1436 | |
| | | | 55/DIG. 2 | |
| 2,975,862 A * | 3/1961 | Goldberg | A47L 9/1427 | |
| | | | 55/381 | |
| 2,979,733 A * | 4/1961 | Saint Clair | E04H 4/1681 | |
| | | | 4/DIG. 9 | |
| 2,986,232 A * | 5/1961 | Wiley | D21C 7/08 | |
| | | | 55/357 | |
| 3,212,268 A * | 10/1965 | Ortega | E04H 4/1272 | |
| | | | 210/127 | |
| 3,403,718 A | 10/1968 | Hughes | | |
| 3,421,298 A * | 1/1969 | Downey | A47L 9/1454 | |
| | | | 55/377 | |
| 3,432,997 A * | 3/1969 | Le Baigue | F16K 15/1441 | |
| | | | 55/377 | |
| 3,456,549 A | 7/1969 | Horton | | |
| 3,468,260 A | 9/1969 | Belden | | |
| 3,508,661 A | 4/1970 | Diemond et al. | | |
| 3,542,201 A * | 11/1970 | Belonger | B01D 35/28 | |
| | | | 210/167.1 | |
| 3,557,857 A | 1/1971 | Swenson | | |
| 3,631,987 A * | 1/1972 | Cattano, Sr. | B01D 29/23 | |
| | | | 210/505 | |
| 3,637,331 A | 1/1972 | Smith et al. | | |
| 3,675,399 A * | 7/1972 | Westergren | A47L 9/1427 | |
| | | | 55/377 | |
| 3,685,919 A * | 8/1972 | Speck | F04D 7/04 | |
| | | | 415/56.6 | |
| 3,744,635 A | 7/1973 | Horvath | | |
| 3,812,659 A * | 5/1974 | Westergren | B01D 46/02 | |
| | | | 292/17 | |
| 3,814,261 A * | 6/1974 | Morgan, Jr. | B01D 29/90 | |
| | | | 210/453 | |
| 3,826,589 A | 7/1974 | Frank et al. | | |
| 3,909,415 A * | 9/1975 | Young | E04H 4/1218 | |
| | | | 210/234 | |
| 3,920,352 A | 11/1975 | Speck et al. | | |
| 3,958,894 A * | 5/1976 | Rowley | F04D 29/426 | |
| | | | 415/230 | |
| 3,966,363 A | 6/1976 | Rowley et al. | | |
| 3,986,958 A * | 10/1976 | Cattano | B01D 29/23 | |
| | | | 210/256 | |
| 4,022,690 A * | 5/1977 | Smith | E04H 4/1272 | |
| | | | 210/249 | |
| 4,059,519 A * | 11/1977 | Zieg | B01D 35/02 | |
| | | | 210/474 | |
| 4,182,216 A | 1/1980 | DeCaro | | |
| D255,480 S | 6/1980 | Zieg | | |
| 4,212,740 A * | 7/1980 | Greene | E04H 4/1272 | |
| | | | 210/242.1 | |
| 4,242,064 A | 12/1980 | Uncles | | |
| 4,247,394 A * | 1/1981 | Schmidt, Jr. | B01D 29/52 | |
| | | | 210/767 | |
| 4,253,959 A * | 3/1981 | Tafara | B01D 29/27 | |
| | | | 210/232 | |
| 4,269,557 A | 5/1981 | Kidd | | |
| 4,283,281 A * | 8/1981 | Cogan | B01D 29/23 | |
| | | | 210/453 | |
| 4,287,067 A | 9/1981 | Dyner | | |
| 4,325,150 A * | 4/1982 | Buddy | E04H 4/1272 | |
| | | | D23/209 | |
| 4,348,281 A * | 9/1982 | Perry | E04H 4/1272 | |
| | | | 210/163 | |
| 4,353,846 A | 10/1982 | Mehrens et al. | | |
| 4,377,360 A | 3/1983 | Kennedy | | |
| 4,381,192 A * | 4/1983 | Grimard | A47L 9/1436 | |
| | | | 55/378 | |
| 4,388,191 A * | 6/1983 | Morgan | B01D 29/902 | |
| | | | 210/474 | |
| 4,419,240 A * | 12/1983 | Rosaen | B01D 29/27 | |
| | | | 210/453 | |
| 4,426,286 A | 1/1984 | Puckett et al. | | |
| 4,430,214 A * | 2/1984 | Baker | E04H 4/1209 | |
| | | | 415/121.1 | |
| 4,432,384 A * | 2/1984 | Guiboro | E03F 5/18 | |
| | | | 137/247.35 | |
| 4,460,468 A * | 7/1984 | Morgan | B01D 29/90 | |
| | | | 210/453 | |
| 4,473,470 A | 9/1984 | Loutit | | |
| 4,488,883 A * | 12/1984 | Philp | A47L 9/127 | |
| | | | 55/467 | |
| 4,501,659 A * | 2/1985 | Henk | E04H 4/1272 | |
| | | | 417/90 | |
| 4,539,116 A * | 9/1985 | Morin | B01D 29/27 | |
| | | | 210/450 | |
| 4,610,787 A * | 9/1986 | Morgan | B01D 29/15 | |
| | | | 210/455 | |
| 4,629,557 A | 12/1986 | Tobias | | |
| 4,669,167 A * | 6/1987 | Asterlin | B01D 29/23 | |
| | | | 29/451 | |
| 4,699,715 A | 10/1987 | Lee, II | | |
| 4,701,259 A * | 10/1987 | Rosaen | B01D 29/27 | |
| | | | 210/450 | |
| 4,725,352 A * | 2/1988 | Haliotis | E04H 4/1272 | |
| | | | 137/625.3 | |
| 4,738,697 A * | 4/1988 | Westergren | A47L 9/1436 | |
| | | | 55/492 | |
| 4,769,052 A * | 9/1988 | Kowalski | B01D 46/06 | |
| | | | 210/417 | |
| 4,773,823 A | 9/1988 | Pease | | |
| 4,775,469 A * | 10/1988 | Zimmerly | B01D 29/27 | |
| | | | 55/378 | |
| 4,783,260 A | 11/1988 | Kurihara | | |
| D299,143 S | 12/1988 | Hazlehurst | | |
| 4,804,470 A * | 2/1989 | Calvillo | B01D 29/27 | |
| | | | 210/474 | |
| 4,818,398 A * | 4/1989 | Lott | B01D 29/23 | |
| | | | 210/287 | |
| 4,871,303 A | 10/1989 | Roesler | | |
| 4,898,513 A | 2/1990 | Hon | | |
| 4,901,926 A | 2/1990 | Klotzbach | | |
| 4,921,606 A * | 5/1990 | Goldman | B01D 29/27 | |
| | | | 55/378 | |
| 4,934,886 A | 6/1990 | Aikens | | |
| 4,967,463 A | 11/1990 | Pratt | | |
| 4,988,437 A * | 1/1991 | Gefter | B01D 35/30 | |
| | | | 210/453 | |
| 5,012,535 A | 5/1991 | Klotzbach | | |
| 5,066,179 A | 11/1991 | Pratt | | |
| 5,143,605 A * | 9/1992 | Masciarelli | E04H 4/1263 | |
| | | | 210/242.1 | |
| 5,156,535 A | 10/1992 | Budris et al. | | |
| 5,158,635 A * | 10/1992 | Schmierer | A47L 9/1445 | |
| | | | 156/227 | |
| 5,167,041 A | 12/1992 | Burkitt, III | | |

(56) References Cited

U.S. PATENT DOCUMENTS

| | | | |
|---|---|---|---|
| 5,193,977 A | 3/1993 | Dame | |
| 5,199,836 A | 4/1993 | Gogarty | |
| 5,202,020 A * | 4/1993 | Desjoyaux | B01D 29/35 4/490 |
| 5,255,398 A | 10/1993 | Flynn et al. | |
| 5,269,913 A * | 12/1993 | Atkins | B01D 35/147 210/136 |
| 5,328,602 A * | 7/1994 | Brooks | A61H 33/0087 4/541.1 |
| 5,338,446 A * | 8/1994 | Schuman | E04H 4/1645 210/453 |
| 5,376,271 A * | 12/1994 | Morgan, Jr. | B01D 29/96 210/453 |
| 5,409,606 A | 4/1995 | Spencer | |
| 5,472,460 A * | 12/1995 | Schmierer | A47L 9/1427 55/377 |
| 5,472,465 A * | 12/1995 | Schmierer | A47L 9/1427 55/377 |
| 5,499,610 A * | 3/1996 | Bruner | A01K 1/0107 209/374 |
| 5,514,275 A * | 5/1996 | Morgan, Jr. | B01D 29/23 210/448 |
| 5,544,385 A * | 8/1996 | Jailor | A47L 5/28 55/378 |
| 5,554,277 A * | 9/1996 | Rief | B01D 29/117 210/232 |
| 5,593,578 A * | 1/1997 | Bryan | B01D 29/902 210/450 |
| 5,624,559 A | 4/1997 | Levin et al. | |
| 5,643,451 A * | 7/1997 | Harris | B01D 29/27 210/453 |
| 5,672,271 A * | 9/1997 | Dye | E04H 4/1272 210/405 |
| 5,690,711 A * | 11/1997 | Bosses | B01D 46/02 55/382 |
| 5,695,651 A * | 12/1997 | Froud | B01D 29/605 261/6 |
| 5,725,620 A * | 3/1998 | Perea | B01D 46/02 55/369 |
| 5,742,954 A | 4/1998 | Idland | |
| 5,750,022 A * | 5/1998 | Blake | E04H 4/1636 210/406 |
| 5,755,962 A * | 5/1998 | Gershenson | B01D 63/00 210/497.1 |
| 5,772,712 A * | 6/1998 | Perea | A47L 9/1445 156/227 |
| 5,810,999 A * | 9/1998 | Bachand | C02F 1/006 210/206 |
| 5,840,188 A * | 11/1998 | Kirsgalvis | B01D 29/23 210/455 |
| 5,858,234 A | 1/1999 | Sukun | |
| 5,897,787 A | 4/1999 | Keller | |
| 5,931,028 A * | 8/1999 | Shin | D06F 39/10 210/167.01 |
| 5,935,280 A * | 8/1999 | Lee | A47L 9/1427 55/378 |
| 5,983,416 A | 11/1999 | Idland | |
| 5,989,421 A * | 11/1999 | Davis | B01D 29/96 210/477 |
| 6,007,594 A * | 12/1999 | Kaczor | A47L 9/149 55/377 |
| 6,007,714 A * | 12/1999 | Keith | E04H 4/1272 210/474 |
| D419,567 S | 1/2000 | Weiss | |
| 6,022,481 A * | 2/2000 | Blake | E04H 4/1645 210/776 |
| 6,027,641 A * | 2/2000 | Spradbury | B01D 29/90 210/167.2 |
| 6,033,451 A * | 3/2000 | Fish | A47L 9/1427 55/377 |
| 6,041,453 A | 3/2000 | Barrow et al. | |
| D425,911 S | 5/2000 | Fleischer et al. | |
| 6,106,248 A * | 8/2000 | Afshar | F04D 29/426 415/182.1 |
| 6,136,056 A * | 10/2000 | Krehan | A47L 9/1445 55/377 |
| 6,149,407 A | 11/2000 | Laing | |
| 6,179,889 B1 * | 1/2001 | Liu | A47L 9/1427 55/374 |
| 6,187,179 B1 | 2/2001 | Mayer et al. | |
| 6,214,217 B1 * | 4/2001 | Sliger, Jr. | B01D 29/01 210/232 |
| 6,287,466 B1 | 9/2001 | Yassin | |
| D450,106 S | 11/2001 | Herr | |
| D450,327 S | 11/2001 | Mori et al. | |
| 6,365,044 B1 * | 4/2002 | Crane | B01D 24/40 210/167.01 |
| 6,379,127 B1 | 4/2002 | Andrews et al. | |
| 6,379,408 B1 * | 4/2002 | Embree | A47L 9/1445 55/369 |
| 6,383,381 B1 * | 5/2002 | O'Flynn | B01D 29/035 210/477 |
| 6,436,286 B1 * | 8/2002 | Scott | B05B 9/03 210/474 |
| D466,522 S | 12/2002 | Huang | |
| 6,554,587 B2 | 4/2003 | Paolini et al. | |
| 6,572,765 B2 | 6/2003 | Lincke | |
| 6,623,245 B2 | 9/2003 | Meza et al. | |
| 6,659,717 B1 | 12/2003 | Kao | |
| 6,685,843 B2 * | 2/2004 | Leaverton | B01D 29/27 210/485 |
| 6,688,845 B2 * | 2/2004 | Pages Pages | F04D 29/426 415/58.4 |
| 6,706,174 B1 * | 3/2004 | Keith | B01D 29/01 210/489 |
| 6,716,348 B1 | 4/2004 | Morgan | |
| 6,733,555 B1 * | 5/2004 | Wilder | A47L 9/1445 55/369 |
| 6,797,164 B2 * | 9/2004 | Leaverton | B01D 29/27 210/485 |
| 6,824,354 B2 | 11/2004 | Laing | |
| 6,866,774 B1 | 3/2005 | Stephenson | |
| 6,878,266 B2 * | 4/2005 | Leaverton | C02F 1/004 220/495.11 |
| 6,893,557 B2 * | 5/2005 | Harris-Griffin | E04H 4/1272 210/416.2 |
| 6,896,798 B2 * | 5/2005 | Dover | A01K 63/045 210/167.01 |
| D507,579 S | 7/2005 | Rossman et al. | |
| 6,932,899 B2 * | 8/2005 | Bonelli | B01D 29/35 210/85 |
| 6,939,463 B2 | 9/2005 | Leaverton | |
| 6,951,608 B2 * | 10/2005 | Desjoyaux | B01D 29/92 210/232 |
| 6,955,637 B1 | 10/2005 | Montano et al. | |
| 6,962,655 B1 * | 11/2005 | Gjerstad | B01D 29/23 210/416.2 |
| 6,974,303 B2 | 12/2005 | Wang | |
| 7,001,159 B2 | 2/2006 | Peterson, Jr. et al. | |
| D517,570 S | 3/2006 | Stiles, Jr. et al. | |
| 7,024,724 B2 * | 4/2006 | Ponjican | A47L 9/1436 55/377 |
| 7,063,791 B2 | 6/2006 | Miner | |
| 7,083,392 B2 | 8/2006 | Meza et al. | |
| 7,144,501 B2 * | 12/2006 | Beaulieu | A01K 63/04 210/167.01 |
| D536,705 S | 2/2007 | Griffin et al. | |
| 7,188,378 B2 | 3/2007 | Ryan | |
| 7,191,998 B1 | 3/2007 | Chalberg et al. | |
| 7,203,977 B2 | 4/2007 | Mattson, Jr. et al. | |
| 7,223,337 B1 | 5/2007 | Franzino et al. | |
| D550,805 S | 9/2007 | Hazlehurst | |
| D551,256 S | 9/2007 | Pecca et al. | |
| 7,276,156 B2 * | 10/2007 | Lockerman | E03F 5/0404 210/170.03 |
| D557,374 S | 12/2007 | Pecca | |
| 7,316,423 B2 | 1/2008 | Rochelle | |
| 7,334,743 B2 | 2/2008 | Wintering et al. | |

(56) References Cited

U.S. PATENT DOCUMENTS

| | | | |
|---|---|---|---|
| 7,341,612 B2* | 3/2008 | Nhan | A47L 9/1436 15/348 |
| D568,340 S | 5/2008 | Stiles, Jr. et al. | |
| 7,384,544 B2* | 6/2008 | Meincke | C02F 1/001 4/507 |
| 7,424,753 B2 | 9/2008 | Gruenwald | |
| 7,454,802 B2 | 11/2008 | Tennant et al. | |
| 7,468,083 B2* | 12/2008 | Davis | A47L 9/00 55/377 |
| D588,159 S | 3/2009 | Griffin et al. | |
| D590,842 S | 4/2009 | Clark et al. | |
| 7,531,092 B2 | 5/2009 | Hazlehurst | |
| 7,534,355 B2* | 5/2009 | Lockerman | E03F 1/00 210/170.03 |
| 7,540,721 B2 | 6/2009 | Liedtke et al. | |
| 7,665,158 B2 | 2/2010 | Castellote | |
| 7,686,587 B2 | 3/2010 | Koehl | |
| 7,686,589 B2 | 3/2010 | Stiles, Jr. et al. | |
| 7,780,406 B2* | 8/2010 | Sloan | F04D 29/026 417/423.11 |
| 7,815,797 B1* | 10/2010 | Keith | E04H 4/1272 210/477 |
| 7,878,766 B2 | 2/2011 | Meza et al. | |
| 7,993,515 B2* | 8/2011 | Davies | E04H 4/1272 210/167.2 |
| 8,011,032 B2* | 9/2011 | Cline | E04H 4/129 4/512 |
| 8,017,004 B2* | 9/2011 | Crumpler | E03F 1/00 210/170.03 |
| 8,075,649 B2* | 12/2011 | Bosses | B01D 46/02 15/352 |
| 8,182,212 B2 | 5/2012 | Parcell | |
| 8,186,517 B2 | 5/2012 | Bowman et al. | |
| 8,205,575 B2* | 6/2012 | Nicastle | A01K 7/00 119/72 |
| 8,245,852 B2* | 8/2012 | Sloan | F04D 9/02 210/167.13 |
| 8,297,920 B2 | 10/2012 | Ortiz et al. | |
| D694,851 S * | 12/2013 | Solakian | D23/209 |
| 8,601,836 B2* | 12/2013 | Kim | D06F 39/10 68/18 F |
| 8,734,098 B2 | 5/2014 | Ortiz et al. | |
| 8,771,505 B2* | 7/2014 | Lafond | B01D 21/2444 210/170.03 |
| 8,858,795 B2* | 10/2014 | McLane | B01D 29/908 210/313 |
| 8,864,986 B1* | 10/2014 | Smith | E04H 4/1272 210/232 |
| 8,944,787 B2* | 2/2015 | Korupp | F04D 13/06 417/423.9 |
| 8,978,898 B2* | 3/2015 | Sakairi | B01D 29/27 210/450 |
| 8,998,576 B2* | 4/2015 | Miller | F04D 29/428 415/206 |
| 9,079,128 B2 | 7/2015 | Parcell et al. | |
| 9,086,075 B2* | 7/2015 | Miller | F01D 5/048 |
| 9,232,880 B2* | 1/2016 | Bosses | A47L 9/1436 |
| 9,260,878 B2* | 2/2016 | Zars | E04H 4/1272 |
| 9,366,047 B2* | 6/2016 | Pettit | E04H 4/1218 |
| 9,416,920 B2* | 8/2016 | Veinbergs | F17D 1/08 |
| 9,447,595 B1* | 9/2016 | Goettl | E04H 4/1272 |
| 9,453,354 B1* | 9/2016 | Goettl | E04H 4/1272 |
| 9,539,529 B2* | 1/2017 | Mullis | B01D 35/02 |
| 9,593,500 B1* | 3/2017 | Goettl | E04H 4/1272 |
| 9,630,127 B2* | 4/2017 | Hoots | B01D 29/27 |
| 9,663,964 B1* | 5/2017 | Kurani | B01D 29/27 |
| 9,675,913 B1* | 6/2017 | Sebor | B01D 35/02 |
| 9,874,037 B1* | 1/2018 | Goettl | E04H 4/1272 |
| 9,945,141 B2* | 4/2018 | Goettl | C02F 1/001 |
| 9,999,848 B2* | 6/2018 | Morgan, III | B01D 29/25 |
| 9,999,849 B2* | 6/2018 | Morgan, III | B01D 29/27 |
| 10,030,647 B2* | 7/2018 | Ortiz | F04B 49/20 |
| 10,161,151 B2* | 12/2018 | Goettl | E04H 4/1272 |
| 10,214,931 B2 | 2/2019 | Saccoccio et al. | |
| 10,378,228 B2* | 8/2019 | Huang | B01D 35/301 |
| 10,465,676 B2* | 11/2019 | Robol | F04B 19/00 |
| 10,618,136 B2* | 4/2020 | Bauckman | B23P 19/04 |
| 10,718,337 B2* | 7/2020 | Parcell | F04D 29/708 |
| 10,859,086 B2* | 12/2020 | Trentin | F04D 29/02 |
| 10,883,489 B2* | 1/2021 | Robol | F04B 19/00 |
| 10,989,200 B2* | 4/2021 | Rejniak | F04D 15/0218 |
| 11,193,504 B1* | 12/2021 | Mjelde | F04D 29/448 |
| 11,331,616 B2* | 5/2022 | Henderson | B01D 29/52 |
| 11,332,951 B2* | 5/2022 | Jackson | B01D 29/27 |
| 11,408,441 B1* | 8/2022 | Mjelde | F04D 29/4293 |
| 11,415,137 B2* | 8/2022 | Afshar | F04D 29/086 |
| 11,517,163 B2* | 12/2022 | Sauer | A47L 9/1445 |
| 11,524,252 B2* | 12/2022 | Aquilina | E04H 4/1272 |
| 11,554,333 B2* | 1/2023 | Farley | B01D 35/26 |
| 11,572,877 B2* | 2/2023 | Ortiz | F04B 39/14 |
| D989,429 S * | 6/2023 | Chen | D32/30 |
| 11,668,329 B1* | 6/2023 | Mjelde | F04D 29/426 417/423.14 |
| 11,730,326 B2* | 8/2023 | Bosses | A47L 5/28 15/347 |
| 11,883,771 B2* | 1/2024 | Henderson | C02F 1/004 |
| 2001/0005983 A1* | 7/2001 | Berfield | A47L 9/1427 55/374 |
| 2001/0021613 A1 | 9/2001 | Fadeley et al. | |
| 2002/0117432 A1* | 8/2002 | Lincke | B01D 29/27 210/167.12 |
| 2002/0192071 A1* | 12/2002 | Pages Pages | F04D 29/605 415/58.4 |
| 2003/0017055 A1 | 1/2003 | Fong | |
| 2003/0094423 A1* | 5/2003 | Leaverton | B01D 29/27 210/167.12 |
| 2003/0205537 A1* | 11/2003 | Leaverton | C02F 1/004 210/767 |
| 2004/0009075 A1 | 1/2004 | Meza et al. | |
| 2004/0022599 A1 | 2/2004 | Nagayama | |
| 2004/0045895 A1* | 3/2004 | Bonelli | B01D 29/23 210/497.1 |
| 2004/0091373 A1 | 5/2004 | Terry et al. | |
| 2004/0104163 A1* | 6/2004 | Leaverton | C02F 1/00 210/237 |
| 2004/0149666 A1 | 8/2004 | Leaverton | |
| 2004/0182766 A1* | 9/2004 | Kelty | E04H 4/1272 210/167.12 |
| 2004/0247411 A1 | 12/2004 | Nagayama | |
| 2005/0019154 A1 | 1/2005 | Dial | |
| 2005/0084401 A1 | 4/2005 | Coray et al. | |
| 2005/0095150 A1 | 5/2005 | Leone et al. | |
| 2005/0098039 A1* | 5/2005 | Davis | B01D 46/0005 55/467 |
| 2005/0100455 A1 | 5/2005 | Tuddenham | |
| 2005/0118039 A1 | 6/2005 | Shorten et al. | |
| 2005/0158194 A1 | 7/2005 | Sloan et al. | |
| 2005/0158195 A1 | 7/2005 | Peterson et al. | |
| 2005/0173321 A1* | 8/2005 | Cady | B01D 29/23 210/167.12 |
| 2006/0086656 A1* | 4/2006 | Morgan | B01D 29/27 210/448 |
| 2006/0086674 A1* | 4/2006 | Morgan | B01D 29/27 210/767 |
| 2006/0088423 A1 | 4/2006 | Brunet et al. | |
| 2006/0101571 A1* | 5/2006 | Goettl | E04H 4/1272 4/507 |
| 2006/0107453 A1* | 5/2006 | Goettl | E04H 4/1236 4/507 |
| 2006/0204367 A1 | 9/2006 | Meza et al. | |
| 2006/0242757 A1* | 11/2006 | Goettl | E04H 4/1236 4/507 |
| 2006/0289344 A1* | 12/2006 | Queirel | E04H 4/169 210/167.1 |
| 2007/0114162 A1 | 5/2007 | Stiles et al. | |
| 2007/0114168 A1 | 5/2007 | Hazlehurt | |
| 2007/0154319 A1 | 7/2007 | Stiles et al. | |
| 2007/0154320 A1 | 7/2007 | Stiles et al. | |
| 2007/0154321 A1 | 7/2007 | Stiles et al. | |
| 2007/0154322 A1 | 7/2007 | Stiles et al. | |
| 2007/0154323 A1 | 7/2007 | Stiles et al. | |

(56) References Cited

U.S. PATENT DOCUMENTS

| | | |
|---|---|---|
| 2007/0163929 A1 | 7/2007 | Stiles et al. |
| 2007/0183902 A1 | 8/2007 | Stiles et al. |
| 2007/0286723 A1 | 12/2007 | Ihle et al. |
| 2008/0086810 A1 | 4/2008 | Le |
| 2008/0086991 A1* | 4/2008 | Hale ................. A47L 7/0042 55/378 |
| 2008/0134425 A1 | 6/2008 | Tatum |
| 2008/0181786 A1 | 7/2008 | Meza et al. |
| 2008/0181788 A1 | 7/2008 | Meza et al. |
| 2008/0181790 A1 | 7/2008 | Meza et al. |
| 2008/0203009 A1 | 8/2008 | Hazlehurst |
| 2008/0283456 A1* | 11/2008 | Charlotin ............. B01D 29/21 210/167.12 |
| 2009/0064406 A1 | 3/2009 | Lawyer et al. |
| 2009/0136363 A1 | 5/2009 | Stiles, Jr. et al. |
| 2009/0145498 A1 | 6/2009 | Bowman et al. |
| 2009/0252616 A1 | 10/2009 | Brunet et al. |
| 2009/0311115 A1 | 12/2009 | Ono et al. |
| 2009/0320202 A1 | 12/2009 | Lawyer et al. |
| 2010/0006158 A1 | 1/2010 | Castellote et al. |
| 2010/0049228 A1 | 2/2010 | Kuehner et al. |
| 2010/0050372 A1* | 3/2010 | Frackowiak ........... B01D 46/88 55/422 |
| 2010/0051532 A1* | 3/2010 | Wawrla ................. A47J 31/605 210/232 |
| 2010/0059429 A1* | 3/2010 | Barry .................... E04H 4/1254 210/167.1 |
| 2010/0115715 A1 | 5/2010 | Ortiz et al. |
| 2010/0146696 A1 | 6/2010 | Campbell et al. |
| 2010/0183452 A1 | 7/2010 | Bosua |
| 2010/0230336 A1* | 9/2010 | Davies ................. E04H 4/1263 210/167.2 |
| 2010/0247332 A1 | 9/2010 | Stiles, Jr. et al. |
| 2010/0254825 A1 | 10/2010 | Stiles, Jr. et al. |
| 2010/0314301 A1* | 12/2010 | Sloan .................... F04D 29/628 210/94 |
| 2011/0076156 A1 | 3/2011 | Stiles, Jr. et al. |
| 2011/0286859 A1 | 11/2011 | Ortiz et al. |
| 2011/0315616 A1* | 12/2011 | Lafond .................... E03F 5/16 210/163 |
| 2012/0090087 A1* | 4/2012 | Korupp .................. F04D 13/06 4/509 |
| 2012/0304415 A1* | 12/2012 | Bosses .................. A47L 9/1472 15/246.2 |
| 2013/0098823 A1* | 4/2013 | Davidian ............. B01D 21/307 210/242.3 |
| 2013/0115071 A1* | 5/2013 | Miller .................... F04D 29/445 415/206 |
| 2013/0146525 A1* | 6/2013 | Parcell ................... B01D 29/35 210/348 |
| 2013/0180460 A1* | 7/2013 | Stiles, Jr. ............. A01K 63/003 119/226 |
| 2014/0083516 A1* | 3/2014 | Veinbergs ................. F17D 1/08 137/15.01 |
| 2014/0319038 A1* | 10/2014 | Lafond .................... E03F 5/14 210/170.03 |
| 2015/0008176 A1* | 1/2015 | Morgan, III ........... B01D 29/25 210/450 |
| 2015/0068961 A1* | 3/2015 | Zars ....................... E04H 4/1272 210/167.11 |
| 2015/0217213 A1* | 8/2015 | Morgan, III ........... B01D 29/58 210/335 |
| 2015/0354242 A1* | 12/2015 | Saccoccio ............. B01D 29/50 210/806 |
| 2016/0010353 A1* | 1/2016 | Giroux .................. B01D 29/11 4/494 |
| 2016/0023138 A1* | 1/2016 | Kurani .................. B01D 35/30 210/495 |
| 2016/0326762 A1* | 11/2016 | Goettl ................... E04H 4/1272 |
| 2017/0030099 A1* | 2/2017 | Vogtner ................. E04H 4/1272 |
| 2017/0101796 A1* | 4/2017 | Goettl ................... E04H 4/1272 |
| 2018/0283027 A1* | 10/2018 | Huang .................. B01D 35/05 |
| 2019/0262748 A1* | 8/2019 | McKain .................. F16L 55/24 |
| 2019/0271320 A1* | 9/2019 | Afshar .................. F04D 29/708 |
| 2019/0284826 A1* | 9/2019 | Gu ........................ E04H 4/1209 |
| 2019/0388807 A1* | 12/2019 | van der Meijden .. E04H 4/1218 |
| 2020/0124056 A1* | 4/2020 | Wu ........................... H02K 9/14 |
| 2021/0017782 A1* | 1/2021 | Jackson ................. B01D 39/10 |
| 2021/0039022 A1* | 2/2021 | Aquilina ............... E04H 4/1272 |
| 2021/0172188 A1* | 6/2021 | Afshar .................. E04H 4/1281 |
| 2021/0283534 A1* | 9/2021 | Renken ................. E04H 4/1272 |
| 2021/0402331 A1* | 12/2021 | Farley ................... B01D 35/26 |
| 2022/0055922 A1* | 2/2022 | Mendez ................. C02F 1/281 |
| 2022/0096988 A1* | 3/2022 | Henderson ........... B01D 36/02 |
| 2022/0258091 A1* | 8/2022 | Henderson ........... B01D 46/521 |
| 2023/0108937 A1* | 4/2023 | Perez ..................... B01D 35/02 210/167.1 |
| 2023/0220693 A1* | 7/2023 | Owens ...................... C02F 1/40 210/167.1 |
| 2023/0220694 A1* | 7/2023 | Spykerman ........... E04H 4/1272 210/167.19 |
| 2023/0220695 A1* | 7/2023 | Owens .................. E04H 4/1272 222/1 |
| 2024/0117649 A1* | 4/2024 | Wooten .................. B01D 29/23 |

FOREIGN PATENT DOCUMENTS

| | | |
|---|---|---|
| EP | 0601899 A1 | 6/1994 |
| EP | 0657602 A1 | 6/1995 |
| EP | 0674109 A1 | 9/1995 |
| EP | 0971137 A1 | 1/2000 |
| EP | 1262670 A2 | 12/2002 |
| EP | 1267085 A2 | 12/2002 |
| FR | 2672646 A1 | 8/1992 |
| GB | 1590253 A | 5/1981 |
| GB | 2199106 A | 6/1988 |
| GB | 2352789 A | 2/2001 |
| GB | 2361041 A | 10/2001 |
| JP | S58-211599 A | 12/1983 |
| JP | H06-341398 A | 12/1994 |
| JP | 2000-220622 A | 8/2000 |
| JP | 2000-220623 A | 8/2000 |
| WO | 94/10466 A1 | 5/1994 |
| WO | 00/68575 A2 | 11/2000 |
| WO | WO-2021183829 A1 * | 9/2021 ............. B01D 29/23 |

OTHER PUBLICATIONS

In the Swim, "Pool Filter Savers—Skimmer Socks", product listing at <www.intheswim.com/p/filter-savers>, print-out dated Mar. 10, 2020 (6 pages).

Impresa Products, "10-Pack of Pool Skimmer Socks—Perfect Savers for Filters, Baskets, and Skimmers", product listing at <www.amazon.com/10-Pack-Pool-Skimmer-Socks-Skimmers/dp/B01GW1JXOY/ref=sr_1_12?keywords=pool+basket+liner&qid=1583872195&s=lawn-garden&sr=1-12>, print-out dated Mar. 10, 2020 (14 pages).

U.S. Appl. No. 60/732,439; Title: Strainer Basket; Inventor: Jeffrey P. Pecca; filed: Oct. 31, 2005 (24 pages).

Sta-Rite Owner's Manual for the Max-E-Glass II and Dura-Glass II Centrifugal Pumps with Integral Trap (2003) (19 pages).

Sta-Rite Basket C8-58P (Perspective and Six Orthogonal View Photographs) (2003) (7 pages).

Textron, Inc., Various Textron Busings Printouts from http://www.avdel.textron.com (at least as early as Jan. 2006) (5 pages).

Hayward Buyer's Guide and Parts List, effective Dec. 29, 2003 (4 pages).

Pentair Pool Products, WhisperFlo Pump Owner's Manual, Jun. 5, 2001 (10 pages).

Pentair Pool Products, WhisperFlo XF High Performance Pump (known prior to Dec. 9, 2011) (4 pages).

Pentair Water Pool and Spa, WhisperFlo XF and Max-E-Pro XF High Performance Pump Installation and User's Guide, Dec. 10, 2010 (20 pages).

Pentair's WhisperFlo Strainer Basket photographs (known prior to Dec. 9, 2011) (14 pages).

Pages from various Internet sources printed on Oct. 25, 2005, including "Centrifugal Pumps", "Closed Impeller", "Volute Casing", Base Plate, and "Close Coupled" (17 pages).

(56) References Cited

OTHER PUBLICATIONS

Canadian Office Action dated Oct. 17, 2023, issued in connection with Canadian Application No. 3, 171,229 (3 pages).
International Preliminary Report on Patentability dated Sep. 6, 2022, issued in connection with International Application No. PCT/US2021/022006 (10 pages).
TriStar™ Pump Series Owner's Manual, Rev. D, Hayward Pool Products, Inc., © 2005 (15 pages).
EcoStar™ Owner's Manual, Rev. B, Hayward Industries, Inc., © 2010 (32 pages).
PCT International Search Report and Written Opinion of the International Searching Authority mailed May 6, 2021, in connection with International Application No. PCT/US2021/022006 (12 pages).

* cited by examiner

DISPOSABLE INSERT FOR STRAINER BASKET

RELATED APPLICATIONS

This application claims priority to U.S. Provisional Patent Application No. 62/988,266 filed on Mar. 11, 2020 and U.S. Provisional Patent Application No. 63/043,621 filed on Jun. 24, 2020, the entire disclosures of which are hereby expressly incorporated by reference.

BACKGROUND

Technical Field

The present invention relates generally to means for straining for filtering fluid, and in particular, to a disposable insert for a strainer basket that strains debris from water.

Related Art

It is known in the art to use a pump assembly to drain debris-ridden water from a reservoir (e.g., a pool, a spa, etc.), strain the debris from the water, and pump the strained water to a filter for filtration of the water before return the water back to the reservoir. A flow path is typically provided from a suction outlet of the reservoir (e.g., a drain and/or one or more skimmers), and another flow path is typically provided from the pump assembly to a filter. The pump assembly includes an impeller (or other motive element), as well as a housing that receives a strainer basket for straining debris from the debris-ridden water before the water flows to the impeller. The strainer basket typically has openings that allow the passage of water therethrough, while inhibiting the passage of debris. However, these openings may clog as a results of the debris becoming trapped in or on the openings. This can reduce pumping and/or straining efficiency, and can increase the level of difficulty involved in removing the debris from the strainer basket. Accordingly, what is needed is a disposable insert that inhibits clogging of the strainer basket and which is easily installed, used, and replaced.

SUMMARY

The present disclosure relates to a disposable insert for a strainer basket. The disposable insert includes a removable liner that includes a plurality of openings that are the same size as, or smaller than, the openings of a conventional strainer basket, and which is inserted into the strainer basket to strain water. The liner could be fabricated from a biodegradable material, and can be easily removed, disposed of, and replaced. The liner prevents clogging of the strainer basket and reduces the frequency of cleanings of the strainer basket. The liner includes an inflow aperture sized and shaped to match an intake aperture of the strainer basket, and a peripheral flange that is sized and shaped to match a peripheral flange of the strainer basket. The liner could include one or more ridges and/or ribbed portions that prevent blockage or reduction in water flow by larger debris such as leaves, etc. Optionally, a removable inner frame could be provided and inserted into the liner to provide structural support for the liner.

The present disclosure also relates to a disposable insert system for a pump having a strainer basket. The system can include a removable liner sized and shaped to be inserted into the strainer basket of the pump and the removable liner can include a connection tab formed from a rigid material having an inlet aperture for receiving water to be strained and a flexible body secured about the inlet aperture of the connection tab. The flexible body can define a central chamber for receiving the water to be strained and can have a plurality of openings formed therein, the plurality of openings having diameters smaller than openings of the strainer basket. The system can also include an adapter collar that is configured to be secured within an inlet aperture of the strainer basket. The connection tab of the removable liner can be removably engageable with the adapter collar, so that the removable liner can be disengaged from the strainer basket when the removable liner has been filled with debris and subsequently replaced with a new removable liner.

BRIEF DESCRIPTION OF THE DRAWINGS

The foregoing features of the present disclosure will be apparent from the following Detailed Description of the Invention, taken in connection with the accompanying drawings, in which.

DETAILED DESCRIPTION

The present disclosure relates to a disposable insert for a strainer basket, as discussed in detail below in connection with FIGS. 1-33.

Figure 1:
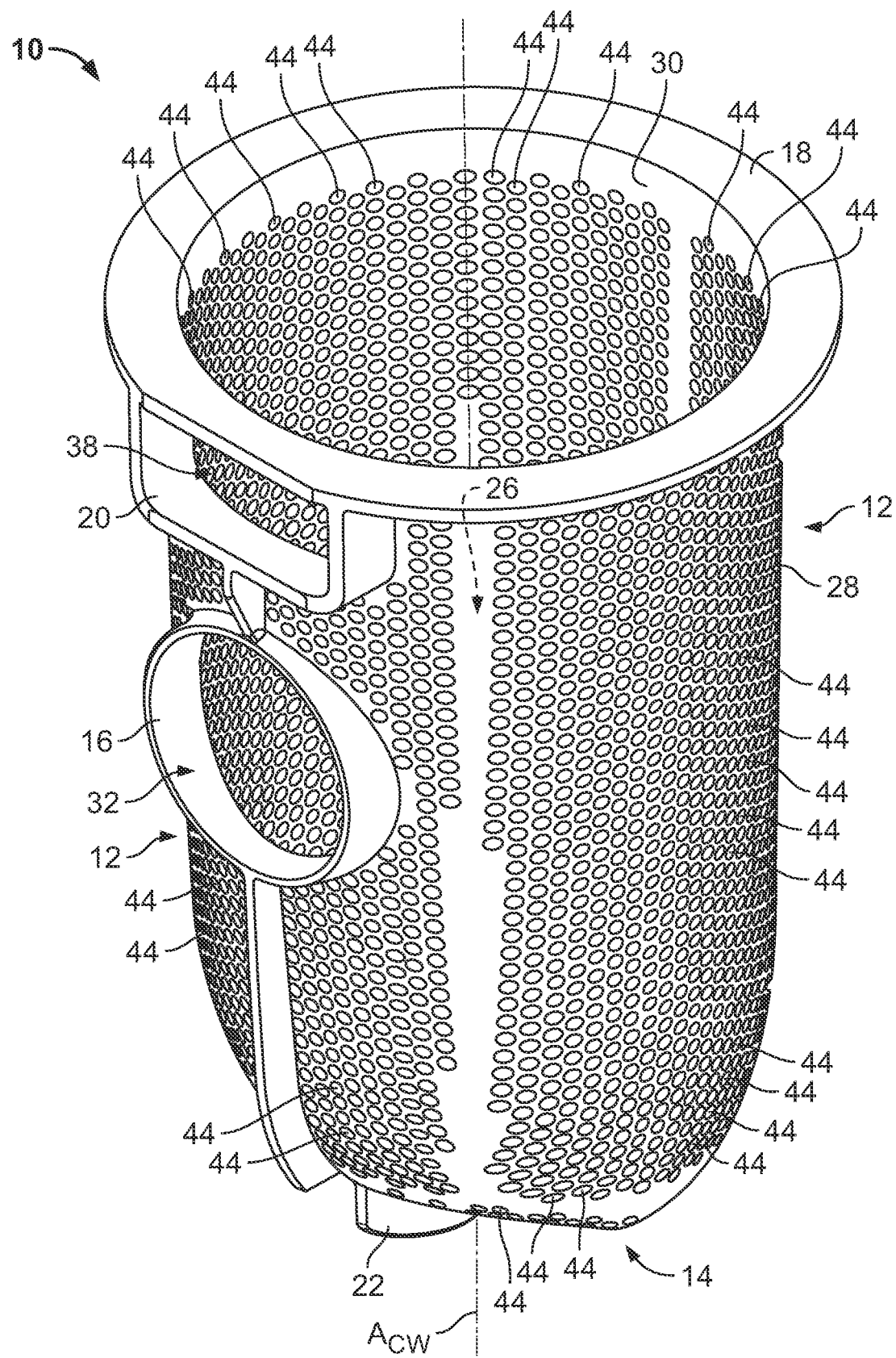
FIG. 1 is a perspective view of a strainer basket with which the disposable insert of the present disclosure could be utilized.

FIG. 1 is a perspective view illustrating a strainer basket 10 with which the disposable insert of the present disclosure could be utilized. The strainer basket 10 is typically utilized to strain debris from water in a pool or spa pumping system, and includes a cylindrical wall 12, an end wall 14, an inlet wall 16 (forming an inlet aperture 32), an annular flange 18, a protuberance 20 or other handle for inserting and removing the basket 10, and one or more fins 22 or other spacing/seating means for seating the basket 10 in a pump assembly. The cylindrical wall 12 and end wall 14 include a plurality of openings 44 which block debris but allow water to pass therethrough, thereby straining debris from the water. The cylindrical wall 12 could include a cylindrical inner surface 30 and a cylindrical outer surface 28. Water to be strained flows through the inlet aperture 32, the water is strained, and the strained water exists the basket 10 through the openings 44. An axis of symmetry $A_{CW}$ could extend through the basket 10. Of course, the shape and configuration of the basket 10 could vary, and the disposable insert of the present disclosure is compatible with baskets of various shapes and configurations.

Operation of the strainer basket 10 will now be discussed in connection with a pump assembly. A reservoir, such as a pool or spa, is provided that has a drain and an inlet. Also provided is a flow path between the drain and the pump assembly, as well as a flow path between the pump assembly and the reservoir inlet. The pump assembly is adapted to facilitate drainage of debris-ridden water from the reservoir and to pump water to the reservoir inlet. The pump assembly includes a pump assembly housing for receiving the strainer basket 10 and an impeller or other motive element.

The strainer basket 10 can be used to strain debris from the debris-ridden water before the water flows to the impeller, where the debris can cause impeller malfunction. The pump assembly housing includes a housing chamber in fluid communication with the flow path from the drain and a flow path to the impeller. The strainer basket 10 is placed into the housing chamber, such that the inlet passage 32 is in fluid communication with the flow path from the drain, and the inlet wall 16 inhibits leakage of the debris-ridden water. The fins 22 space the outer cylindrical surface 28 from the walls of the pump assembly housing. The pump assembly housing has a groove with an optional raised portion for receiving one or more of the fins 22 to inhibit motion of the strainer basket 10 with respect to the pump assembly housing and to space the strainer basket 10 from the pump assembly housing. The pump assembly housing includes a lid, which can be closed to form a seal against the annular flange 18.

During operation of the pump assembly, the debris-ridden water flows from the drain, through the inlet passage 32 and into an inner chamber of the strainer basket 10. The debris-ridden water is strained as the water exits the chamber through each fluid outlet 44 into the pump chamber, which causes the debris to become trapped in the inner chamber of the strainer basket 10. The debris is inhibited from becoming trapped in and/or on each fluid outlet 44, at least partially by virtue of each fluid conduit being substantially and/or essentially free of corners, by virtue of the inner surfaces of the basket 10 being substantially and/or essentially free of areas that are incongruent with respect to the cylindrical plane of the inner surfaces of the basket 10, by virtue of other aspects of the fluid outlet geometry, and/or by virtue of other aspects of the strainer basket 10.

The strained water flows from the pump chamber through an outlet of the pump assembly housing to the impeller to be pumped into the flow path to the inlet reservoir. During a maintenance operation, the lid of the pump assembly housing can be opened and the strainer basket 10 can be removed from the pump assembly housing. Debris can then be emptied from the strainer basket 10. As will be discussed below, inclusion of the disposable insert of the present disclosure in the strainer basket 10 provides an added degree of debris filtration, and greatly eases maintenance and cleaning of the strainer basket 10.

Figure 2:
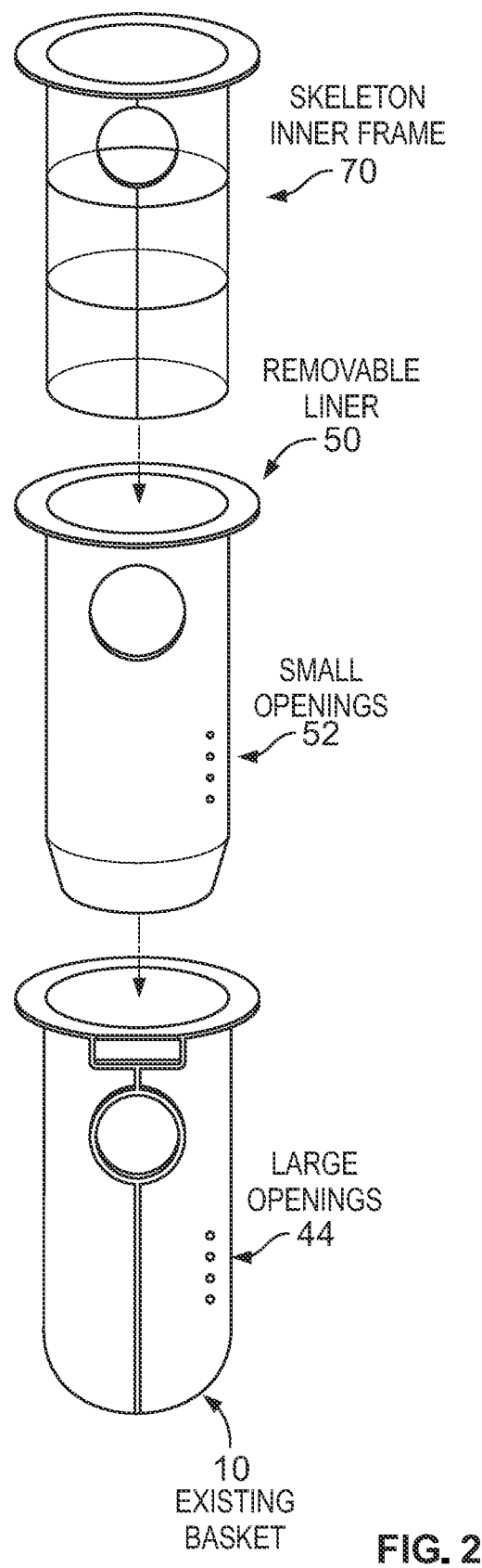
FIG. 2 is an exploded view of the disposable insert of the present disclosure.

FIG. 2 is an exploded perspective view illustrating the disposable insert of the present disclosure. The disposable insert could be in the form of a removable liner 50 that is insertable into, and removable from, the strainer basket 10. Advantageously, the liner 50 can be removed from the strainer basket 10 by pulling the liner 50 and the strainer 10 in opposite directions, free from obstruction or any requirement to disengage any fasteners, etc. The removable liner 50 includes a plurality of openings 52 that have diameters that are the same size as, or smaller than, the diameters of the openings 44 of the strainer basket 10. Advantageously, this permits the removable liner 50 to capture debris that would ordinarily not be captured by the strainer basket 10, and/or debris which would ordinarily get lodged in the openings 44 of the strainer basket 10. For example, certain types of debris such as pine needles (or other types of debris) can get lodged in the openings 44 of the strainer basket 10, thereby clogging the strainer basket 10. Still further, such debris can make cleaning of the strainer basket 10 difficult. The smaller openings 52 of the liner 50 allow water to flow through the liner 50 while capturing such debris. Additionally, the liner 50 could be disposable, such that the liner 50 can be removed from the strainer basket 10, thrown out, and replaced by another liner, thereby allowing for easy and rapid maintenance of a pool/spa pump. Optionally, an inner frame 70 could be provided and inserted into the removable liner 50 to provide structural support for the liner 50. When assembled, the liner 50 is "sandwiched" in position between the strainer basket 10 and the inner frame 70. Each of the foregoing components will now be discussed in greater detail in connection with FIGS. 3-6.

Figure 3:
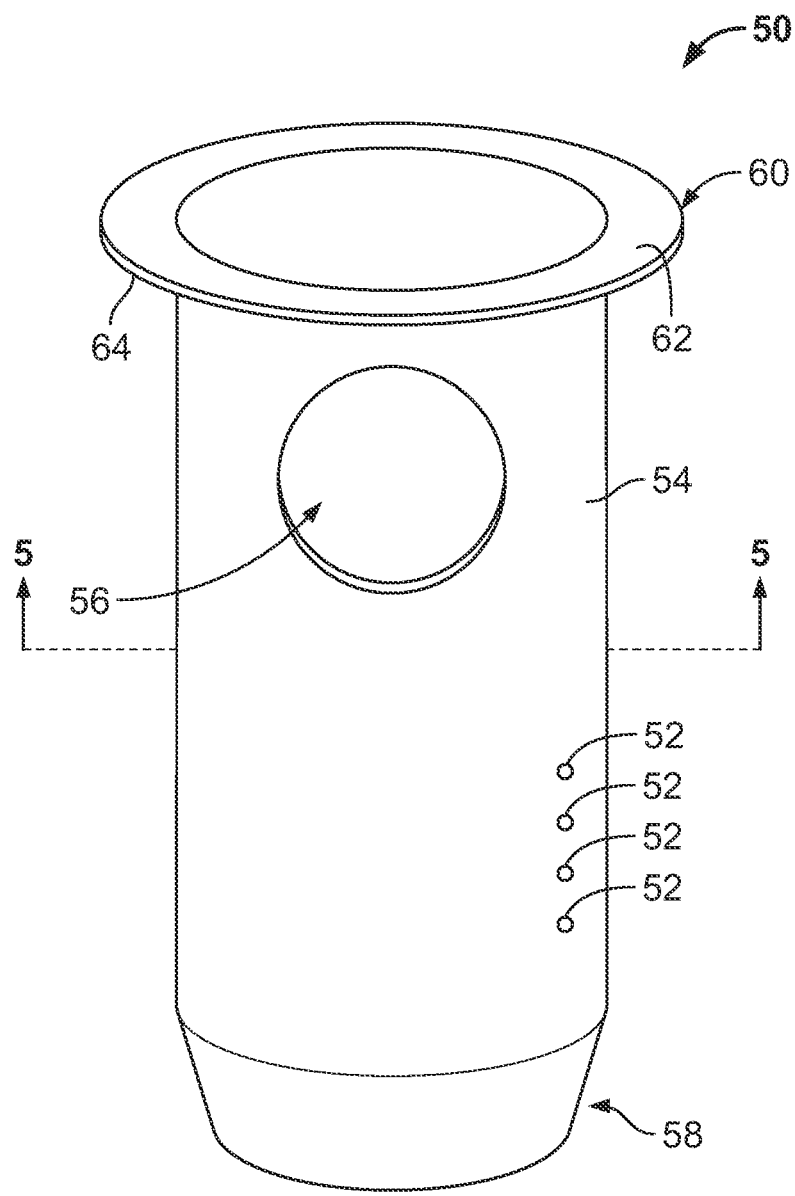
FIG. 3 is a perspective view showing the removable insert of the present disclosure in greater detail.

FIG. 3 is a perspective view of showing the removable liner 50 in greater detail. The liner 50 includes a generally cylindrical body 54, an inlet aperture 56 into which water to be filtered flows, and a peripheral flange 60 attached to (or formed integrally with) an upper end of the body 54. As noted above, the liner 50 includes a plurality of openings 52 having diameters that are the same size as, or smaller than, the diameters of the openings 44 of the debris basket 10. The inlet aperture 56 is sized and shaped to match the inlet aperture 32 of the strainer basket 10, such that water to be filtered flows through the inlet aperture, then through the inlet aperture 56 and into the body 54 of the liner 50. The water is then filtered by the openings 52 of the body 54 such that debris is removed from the water and captured by the liner 50, and the filtered water then flows through the openings 44 of the strainer basket 10. The flange 60 is sized and shaped to match the size and shape of the flange 18 of the strainer basket 10, and includes a lower surface 64 that contacts the flange 18 of the strainer basket 10 when the liner 50 is inserted into the basket 10. An upper surface 62 is also provided on the flange 60, and contacts a flange of the frame 70 (discussed below) when the frame 70 is inserted into the liner 50. In other embodiments, the peripheral flange 60 could be replaced with a plastic frame that snaps into the strainer basket 10 and supports the liner 50, or other structure which supports the liner 50 and does not require positioning between the flange 18 of the strainer basket 10 and a lid of the pump.

Figure 4:
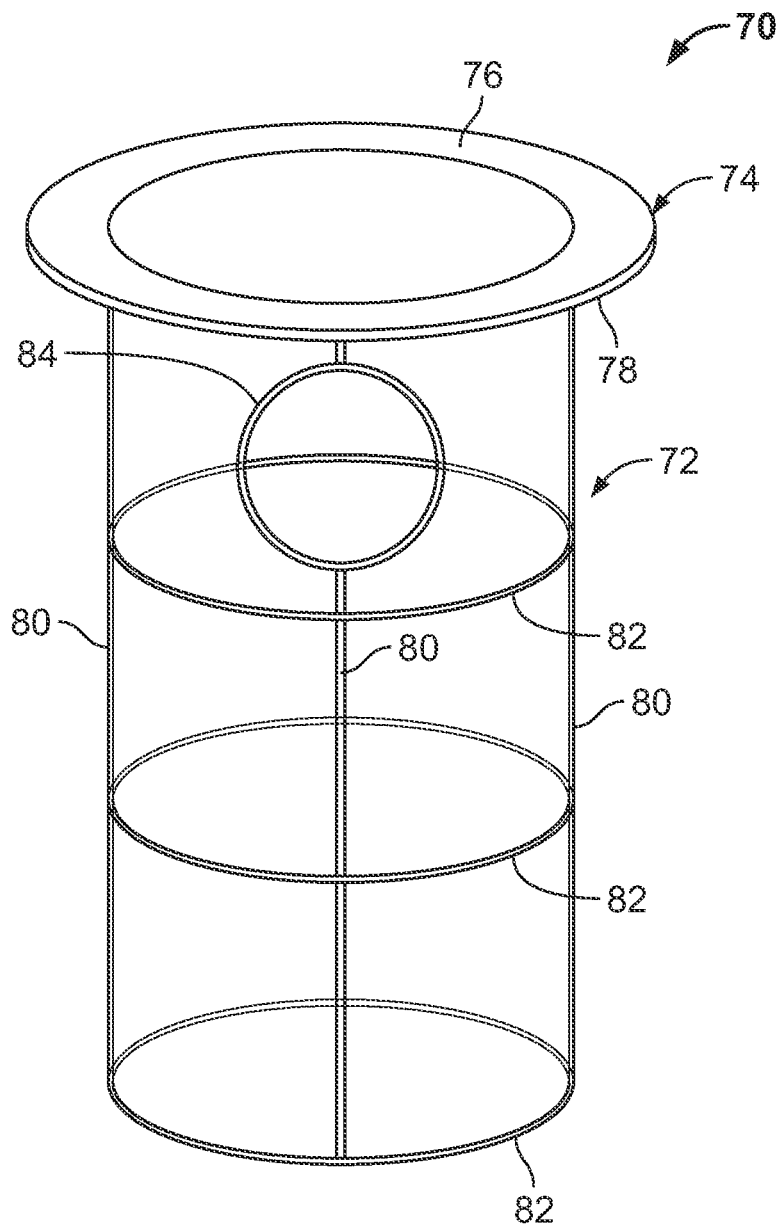
FIG. 4 is a perspective view showing the inner frame of the present disclosure in greater detail.

FIG. 4 is a perspective view showing the frame 70 in greater detail. The frame 70 includes a depending portion 72 and a peripheral flange 74. The depending portion 72 is attached to and depends from the flange 74, and provides structural support for the liner 50 when the frame 70 is inserted into the liner 50. The depending portion 72 could be formed from a plurality of vertical (e.g., longitudinal) support members 80 interconnected with a plurality of horizontal (e.g., transverse) support members 82. In some embodiments, the longitudinal support members 80 could have a linear (e.g., rod-like) shape and the transverse support members 82 could be annular in shape. Of course, the geometry of the depending portion 72 could be varied as desired so long as the frame 70 provides sufficient structural support for the liner 50. A central support member 84 could be sized and shaped to match the intake aperture 56. The flange 74 is sized and shaped to match the flange 60 of the liner 50, and includes an upper surface 76 and a lower surface 78. When the frame 70 is inserted into the liner 50, the lower surface 76 of the flange contacts the upper surface 62 of the flange 60 of the liner 50. The upper surface 76 of the flange 74 contacts a removable lid of a pump in which the strainer basket 10, liner 50, and frame 70 are installed (such as the lid of a pool/spa pump). It is noted that the frame 70 is optional, and need not be utilized if the liner 50 is formed of material having sufficient structural rigidity to withstand the flows/pressures present during operation of a pool/spa pump. Also, one or more of the support components of the frame 70, such as one or more of the vertical support members 80 and/or one or more of the horizontal support members 72, could be formed integrally with the liner 50 to provide additional structural support for the liner 50. In the event that the frame 70 is not provided, the lid of the pump would directly contact the upper surface 62 of the flange 60 of the liner 50. Also, it is noted that the flange 74 and support members 80 and 82 could be integrally formed as a single, monolithic structure, if desired.

Figure 5:
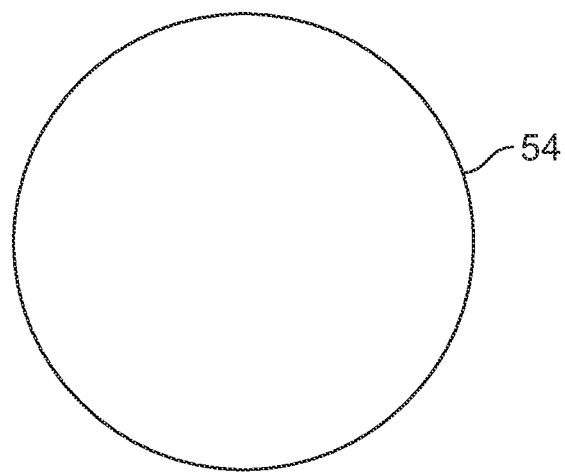
FIG. 5 is a sectional view of the liner of the present disclosure.

FIG. 5 is a cross-sectional view of the liner 50, taken along the line 5-5 of FIG. 2. As can be seen, the body 54 of the liner 50 could have a rounded profile. The liner 50 (including the body 54 and the flange 60) could be disposable and could be formed from a wide variety of materials, including, but not limited to, a plastic (e.g., biodegradable) material, a mesh material, a non-homogenous material, polyethylene, polyethylene terephthalate (PET), polypropylene, or other suitable materials. Preferably, such materials are relatively lightweight, inexpensive, and easily disposed of when the liner 50 is spent and requires replacement (e.g., the material of the liner 50 could be chosen such that the liner 50 is easily grasped by a user, removed from the basket 10 by freely pulling the liner 50 and the basket 10 in opposite directions, and discarded in household trash). Moreover, a plurality of liners 50 could be nested together and sold as a package of replacement liners (e.g., in a box of 10 replacement liners) that could be purchased and installed by a pool/spa owner, service technician, etc.

Figure 6:
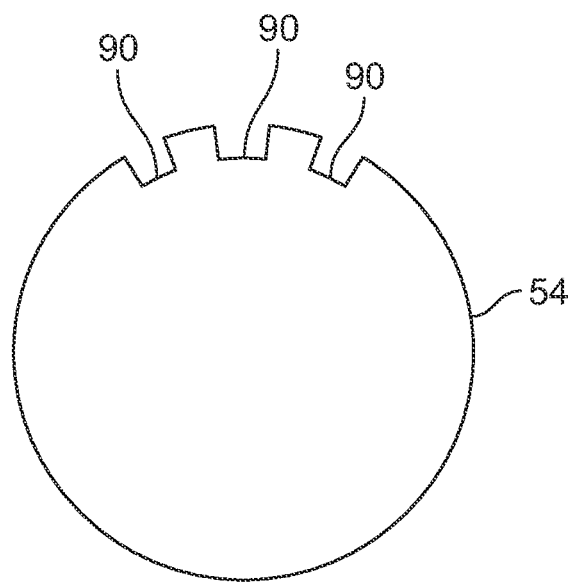
FIG. 6 is a sectional view of another embodiment of the liner of the present disclosure, wherein one or more ribbed portions are provided.

Optionally, as shown in FIG. 6, the body 54 could include one or more ridges 90, so as to mitigate the effects of larger debris blocking the body 54 and inhibiting water flow through the body 54. For example, if a leaf or other type of debris is lodged against the inner surface of the body 74, the geometry of the ridges 90 will still allow water flow through the body 54 since the leaf will not completely cover the entire inner surface of the body 54. Indeed, the ridges 90 could extend between an inner radius and an outer radius greater than the inner radius, such that debris (e.g., leaves) abutting a portion of the ridges 90 along the inner radius may block the holes of that portion, while debris-laden water can still pass through portions of the ridges that are not along the inner radius (e.g., portions that are near, or along, the outer radius). Alternatively, the body 54 could include one or more ribs extending therefrom. Such ribs could be formed integrally with the body 54 (e.g., from the same material as the body 54), if desired. It is also noted that the ridges 90 (or, ribs discussed above) have the additional benefit of providing structural support for the liner 50.

Figure 7:
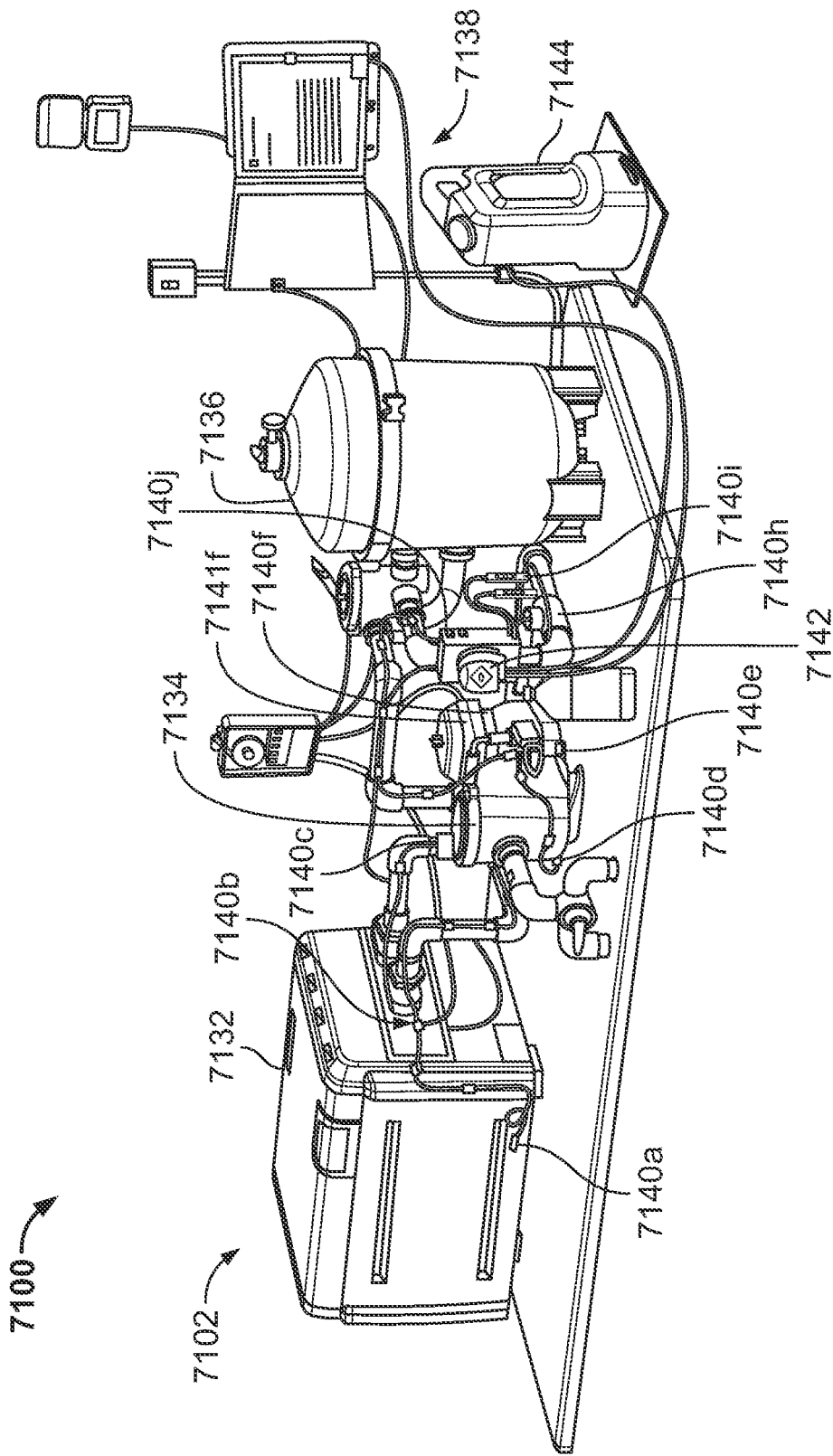
FIG. 7 is a perspective view illustrating a pool/spa equipment pad in which the disposable insert of the present disclosure could be utilized.

FIG. 7 is diagram of a typical pool/spa equipment pad 7100. As noted above, the disposable liner 50 and frame 70 could be utilized in a pool/spa pumping application, such as in connection with the pool/spa equipment shown in FIG. 7. Such equipment (indicated generally at 7102) can include a pool/spa control system 7138 for controlling and communicating with the pool/spa equipment 7102, a heating/cooling system 7132, a pump 7134 (driven by a motor/drive 7141*f*), a filter 7136 (which could be of any suitable type, such as a diatomaceous earth (DE) filter, a sand filter, or a cartridge filter), and one or more pool/spa sanitization systems 7142, 7144 (including, but not limited to, a chlorinator, a chemistry dispensing device, an electrolytic chlorinator, etc.). A plurality of sensors 7140*a*-7140*i* could also be provided for monitoring the operation of the aforementioned devices. The pump 7134 includes a chamber and a strainer basket removable from the chamber, and the liner 50 could be removably positioned in the strainer basket. During operation, the pump 7134 draws debris-laden water from a pool or a spa and into the liner 50, the liner 50 filters the debris from the water, the water flows through the strainer basket (which additionally filters the water), and then water flows from the pump 7134 and into the filter 7136 for even further filtration of the water. Advantageously, the disposable liner 50 and frame 70 could be utilized in the pump 7134, allowing for easy installation, usage, removal, disposal, and replacement by a pool/spa owner, service technician, or other personnel.

Figure 8:
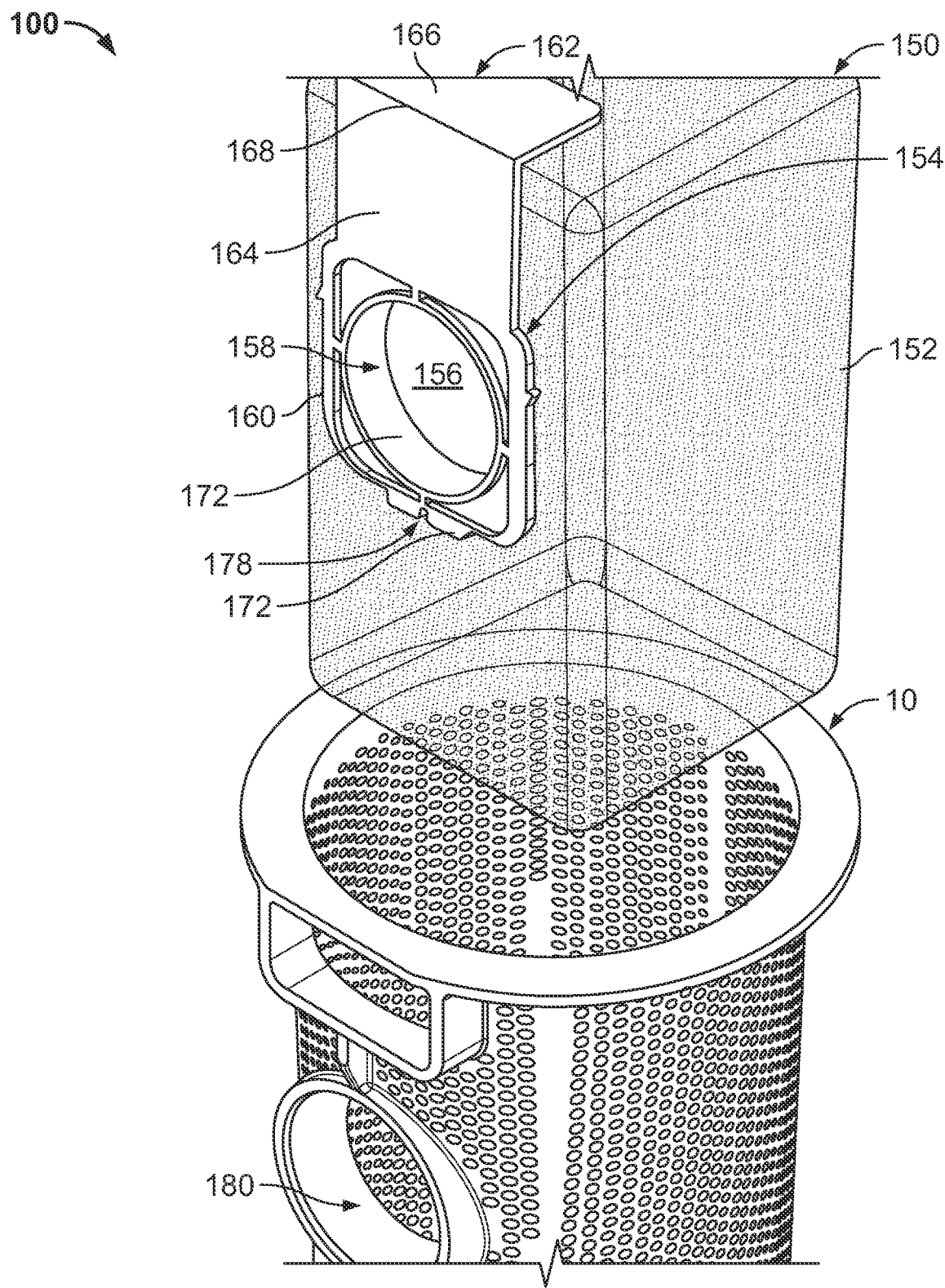
FIG. 8 is an exploded view of a disposable insert system of the present disclosure.

FIG. 8 is an exploded view of a disposable insert system 100 according to aspects of the present disclosure, including the strainer basket 10, a disposable liner 150, and an adapter 180 for securing the disposable liner 150 to the strainer basket 10. The disposable liner 150 can include a mesh debris bag 152 and a rigid connection tab 154 attached thereto that can be configured to removably engage the disposable liner 150 with the adapter 180, and thus the strainer basket 10.

The debris bag 152 defines a generally closed chamber with an inlet aperture 156 (e.g., similar to a traditional vacuum bag with a single inlet) for receiving debris laden water from the inlet 32 of the strainer basket 10. The debris bag 152 can be generally tubular and have "boxed" corners, but of course, other shapes are possible. According to some aspects of the present disclosure, the debris bag 152 can be formed from a contiguous piece of mesh material (e.g., a rectangle) with a single seam that can be welded or sewn, continuously, using automation processes known to those of ordinary skill in the art, and the resulting tube can then be cut to length. The end-seams of the debris bag 152 can also be welded, or sewn, when the bag 152 is cut to length. The mesh debris bag 152 can define a plurality of openings (not shown) having diameters that are the same size as, or smaller than, the diameters of the openings 44 (see FIG. 1) of the strainer basket 10. Advantageously, this permits the debris bag 152 to capture debris that would ordinarily not be captured by the strainer basket 10, and/or debris which would ordinarily get lodged in the openings 44 of the strainer basket 10. According to some embodiments, the bag 152 can include one or more stiffeners (not shown), such as a wires, tubes, or the like that traverse the perimeter the bag 152, in order to support the bag 152 and prevent it from being drawn into the inlet 32 of the strainer basket 10 during backflow operations. For example, in some embodiments, a wire can be integrated into the continuous seam of the bag 152.

The connection tab 154 can include an inlet aperture 158 defined by an aperture wall 172, a peripheral flange 160 extending around the inlet aperture 158, and a handle 162 having a vertical support member 164 extending from the peripheral flange 160 and a horizontal member 166 depending from an upper edge 168 of the vertical support member 164. The inlet aperture 156 of the liner 150 can be secured about the aperture wall 172 of the connection tab 154. As will be discussed in greater detail in connection with FIG. 9, the inlet aperture 158 and the peripheral flange 160 can be sized and shaped to be removably engaged with the adapter 180. The handle 162 can be configured to allow a user to easily grasp the disposable liner 150 and remove the liner 150 from the strainer basket 10 when the bag 152 has been filled with debris, while also minimizing the user's contact with the debris. Accordingly, the vertical support member 164 of the handle 162 can be sized such that the upper edge 168 and depending horizontal support member 166 are at, or near, the plane defined by the annular flange 18 of the strainer basket 10. Additionally, the handle 162 can be bonded to a top side 170 the debris bag 152, or the handle 162 can include a feature that engages the bag 152, such that the horizontal support member 166 can support the top 170 of the bag 152, thereby preventing the bag 152 from collapsing into the interior of the strainer basket 10 and blocking the inlet 32 during backflow operations. One or more bars (see FIG. 10), or a grating, can also be disposed within the inlet aperture 158 of the connection tab 154 in order to prevent the debris bag 152 from being drawn into the inlet aperture 32 of the strainer basket 10 during a backflow operation. According to some embodiments of the present disclosure, the debris bag 152 can be formed from a material that is sufficiently rigid, such that the bag 152 is self-supporting (e.g., holding its shape against gravity and water flow) and does not collapse into the interior of the strainer basket 10 during normal operation of the filter, or during a backflow operation.

The debris bag 152 and the tab 154 can be secured together using ultrasonic welding, chemical adhesives, or the like, or these components could be formed together as a single component. For example, the debris bag 152 and the tab 154 could both be formed from polymers that can be formed both into a textile (e.g., the bag 152) and an injection-molded component (e.g., the tab 154), such that the debris bag 152 and the tab 154 can be easily welded to each other, being formed from the same material. Such materials can include polyester, nylon, and the like. For example, the bag 152 can be formed from a contiguous sheet of 0.100" diamond polyester mesh having a thickness of 0.031". The bag 152 can also be formed from a polyester mesh fabric that is a mixture of polyester and bamboo, making the bag 152 more environmentally friendly.

Figure 9:
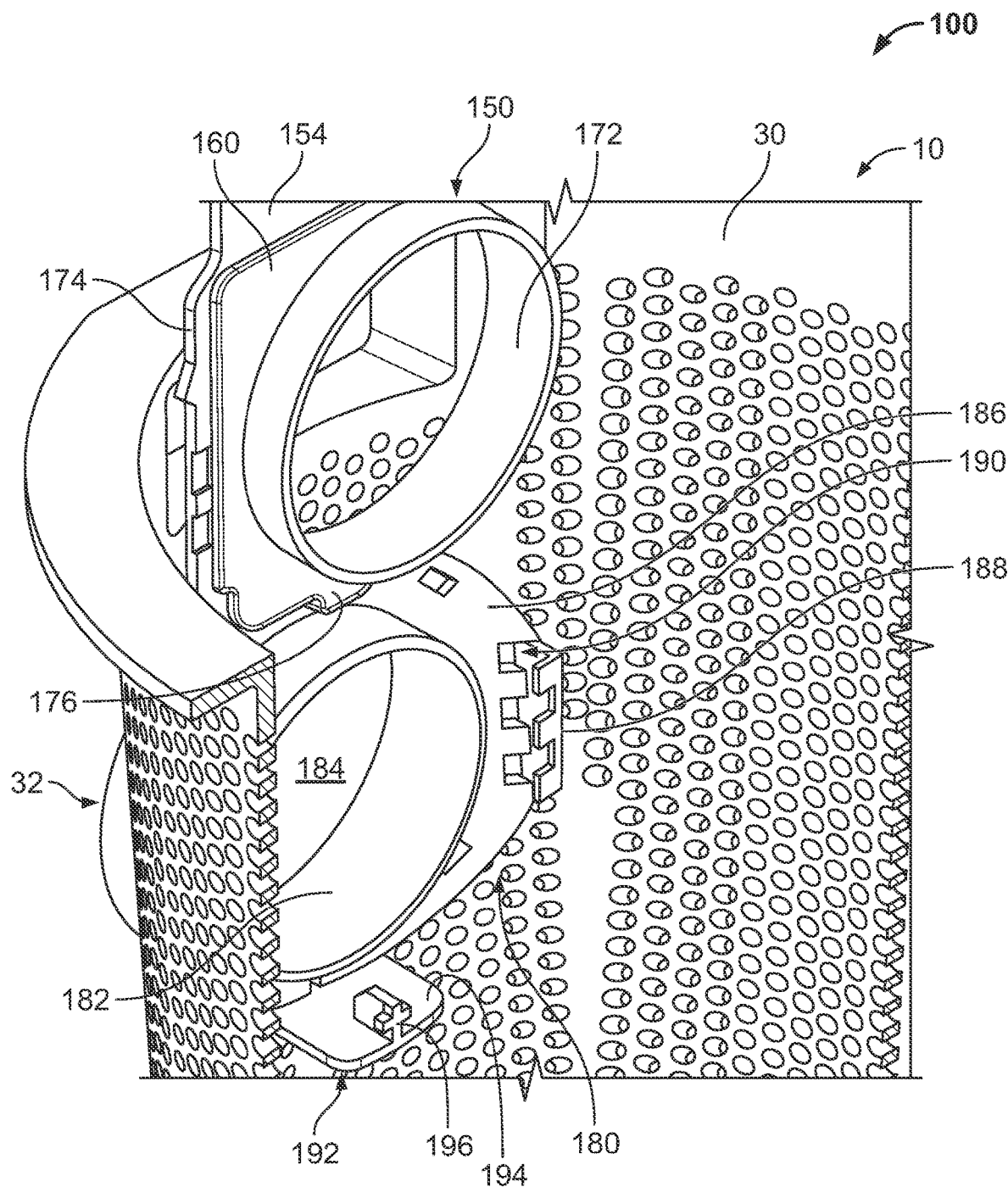
FIG. 9 is a perspective view illustrating the disposable insert system of FIG. 8 in greater detail.

FIG. 9 is a partial perspective view of the disposable insert system 100 of the present disclosure, illustrating components thereof in greater detail. The adapter 180 can include an aperture wall 182 defining a central aperture 184 and a peripheral flange 186 extending from the aperture wall 182. As will be described in greater detail herein, the adapter 180 can be permanently (e.g., using adhesive or the like), or removably engaged with (e.g., via snap-fit, interference fit, etc.) the inlet aperture 32 of the strainer basket 10 and can include one or more features for attaching the disposable liner 150 thereto. As shown, the aperture wall 182 can have an outer diameter that is less than the inner diameter of the inlet aperture 132 of the strainer basket 10, so that the aperture wall 182 can be received therein, and the peripheral flange 186 can be configured to have a curvature that matches the curvature of the inner surface 30 of the strainer basket 10, so that the peripheral flange 186 can be positioned flush against the inner surface 30 when the adapter 180 is fully engaged with the strainer basket 10. Likewise, the aperture wall 172 of the connection tab 154 can have an inner diameter that is larger than the outer diameter of the aperture wall 182 of the adapter 180, so that the connection tab 154 can fit over and receive the aperture wall 182 of the adapter 180. Alternatively, the aperture wall 172 of the connection tab 154 can have an inner diameter that is equal to the inner diameter of the aperture wall 182 of the adapter 180, so that the aperture wall 172 of the connection tab 154 can be positioned adjacent to and abut the aperture wall 182 of the adapter 180, thereby forming a flow path therebetween having a uniform diameter.

The adapter 180 can also include one or more retainers 188 that are configured to removably secure the connector tab 154 to the adapter 180, and thus, to the strainer basket 10.

For example, the retainers 188 can facilitate a blind-mate interface for installation of a new disposable liner 150 within the strainer basket 10, without the use of tools. As shown in FIG. 9, the retainers 188 can include a channel 190 configured to receive an outer edge 174 of the peripheral flange 160 of the connector tab 154. According to embodiments of the present disclosure, the channel 190 can be in snap-fit engagement with the outer edge 174 of the peripheral flange 160, or the channel 190 can be configured to slidable receive the outer edge 174 of the peripheral flange 160. The adapter can also include one or more alignment structures 192 for optimal positioning of the connection tab 154 adjacent to the adapter 180 prior to engagement therewith. For example, the alignment structure 192 can include a support wall 194 with a detent 196 thereon and the connection tab 154 can include a reciprocal alignment feature 176 with a notch 178 (see FIG. 8) therein. In operation, a user can position the connection tab 154 relative to the adapter 180, such that the detent 196 is positioned within the notch 178 and the alignment feature 176 rests on the support wall 194, thereby aligning the aperture 158 of the connection tab 154 with the aperture 184 of the adapter 180. The user can then snap the outer edge 174 of the support tab 154 into the retainers 188 of the adapter as discussed herein, thereby securing a new disposable liner 150 within the strainer basket 10.

Figure 10:
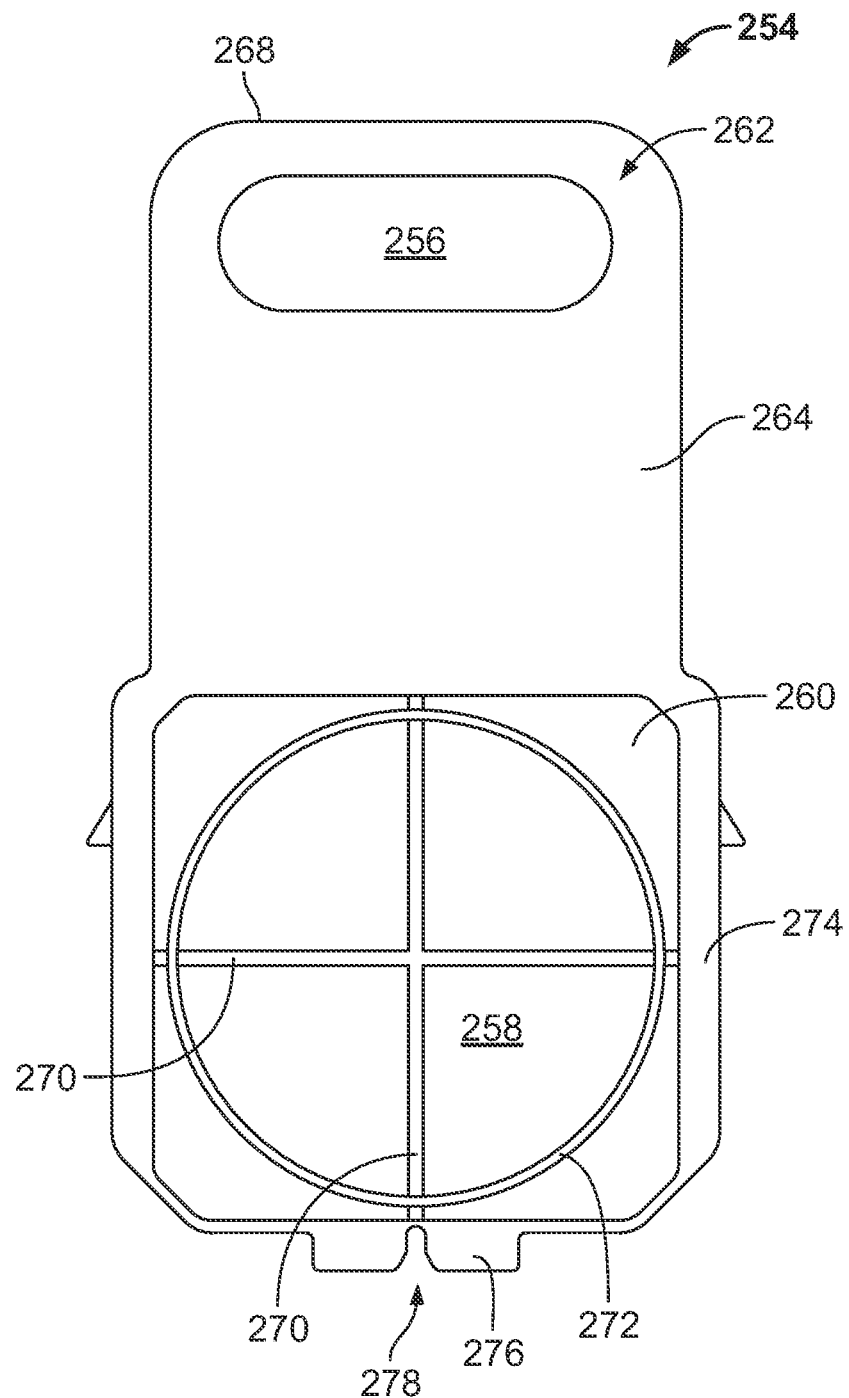
FIG. 10 is a front elevational view of a connection tab of another disposable insert system of the present disclosure.

FIG. 10 is a front elevational view of another exemplary connection tab 254 according to the present disclosure. The connection tab 254 can be similar to connection tab 154 in both form and function, except for the distinctions noted herein. As shown, the connection tab 254 includes a central inlet aperture 258 defined by an aperture wall 272, a peripheral flange 260 extending from the aperture wall 272 and having an outer edge 274 that can be received by the retainers 188 of the adapter 180, and an alignment feature 276 with a notch 278 that can cooperate with the alignment structure 192 of the adapter 180. The connection tab 254 can also include a handle 262 formed from a vertical support member 264 that extends from the peripheral flange 260 high enough for the user to grasp when the connector tab 254 is engaged with the with the adapter 180. The vertical support member 264 can include an aperture 256 formed therein that can be spaced from an upper edge 268 of the vertical support member 264. According to certain embodiments of the present disclosure, the handle 262 can formed in a variety of different configurations. For example, the handle could comprise vertical stiffeners that protrude above and outside of the debris bag, forming a handle across the diameter of the strainer, another feature on the connection tab could extend high enough in the strainer basket 10 to act as a handle, or the handle could be a sewn loop of fabric that is integrally formed with the debris bag 152, thereby obviating the need for a separate handle component. As discussed above, the connection tab 254 can also include one or more bars 270, or a coarse grating that minimally obstructs the water flow path, positioned across the aperture 258 to prevent a flexible bag 152 from being drawn into the aperture 32 of the strainer basket 10 during a backflow operation. The connection tab 254 (and other connection tabs disclosed herein) can be formed using an injection molding process. Alternatively, the connection tab 254 can be "blanked" out of a sheet of plastic, or other suitable material.

Figure 11A:
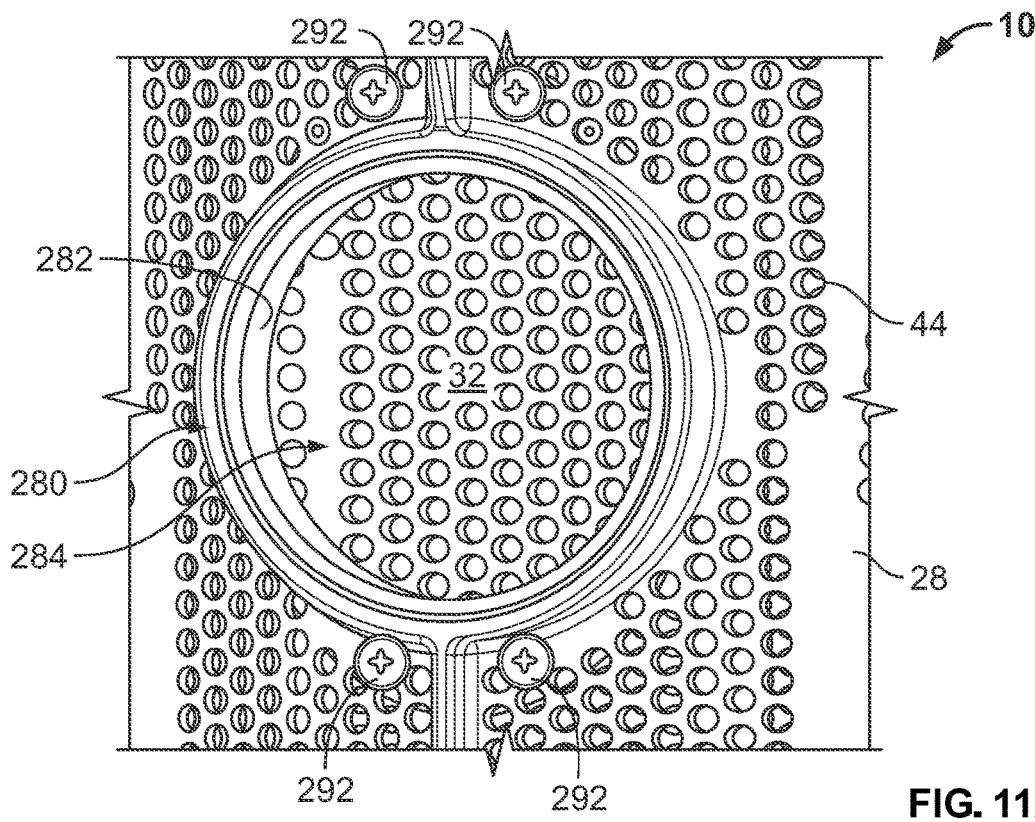
FIG. 11A is a first perspective view of an adapter collar of the present disclosure engaged with the strainer basket of FIG. 1.
Figure 11B:
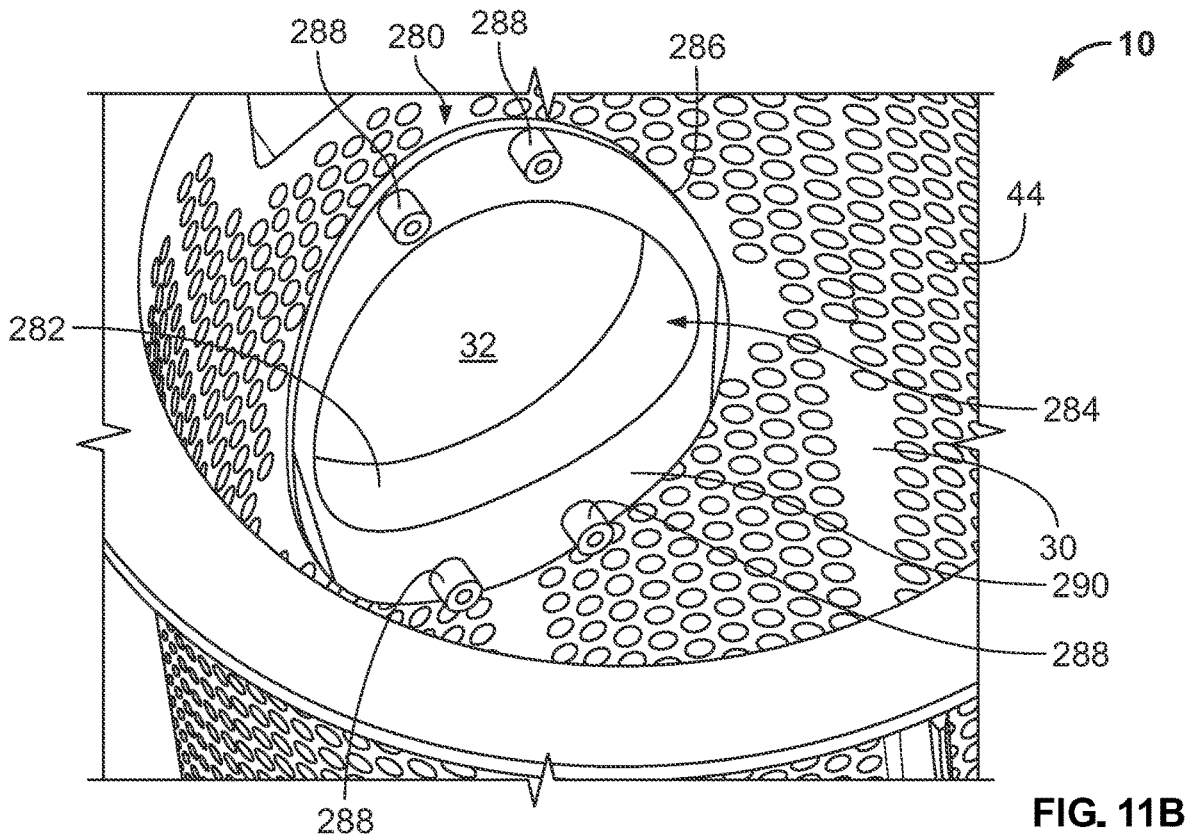
FIG. 11B is a second perspective view of the adapter collar of FIG. 11A engaged with the strainer basket of FIG. 1.

FIGS. 11A and 11B illustrate another exemplary adapter 280 according to the present disclosure. More specifically, FIG. 11A is a front perspective view of the adapter 280 positioned within the inlet aperture 32 of the strainer basket 10 and FIG. 11B a rear perspective view of the adapter 280 positioned within the inlet aperture 32 of the strainer basket 10. As shown, the adapter 280 can include an aperture wall 282 defining an aperture 284 and a peripheral flange 286 extending from the aperture wall 282. The aperture wall 282 can have an outer diameter configured to be received within the inlet aperture 32 of the strainer basket 10 and the peripheral flange 286 can be configured to have a curvature that conforms with the curvature of the inner surface 30 of the strainer basket 10 so that the peripheral flange 286 can sit flush against the inner surface 30 when the adapter 280 is engaged with the strainer basket 10. The peripheral flange 286 can also be provided with one or more protrusions 288 on a rear surface 290 thereof configured to receive and engage one or more fasteners 292 (e.g., screws, bolts, rivets, and the like). As shown best in FIG. 11A, the protrusions 288 can be positioned directly behind, and aligned with, one or more of the openings 44 in the strainer basket 10 so that the fasteners 292 can extend from the outer surface 28 of the strainer basket, through the one or more openings 44, through the peripheral flange 286, and be received by the protrusions 288, thereby securely engaging the adapter 280 with the strainer basket 10.

Figure 12:
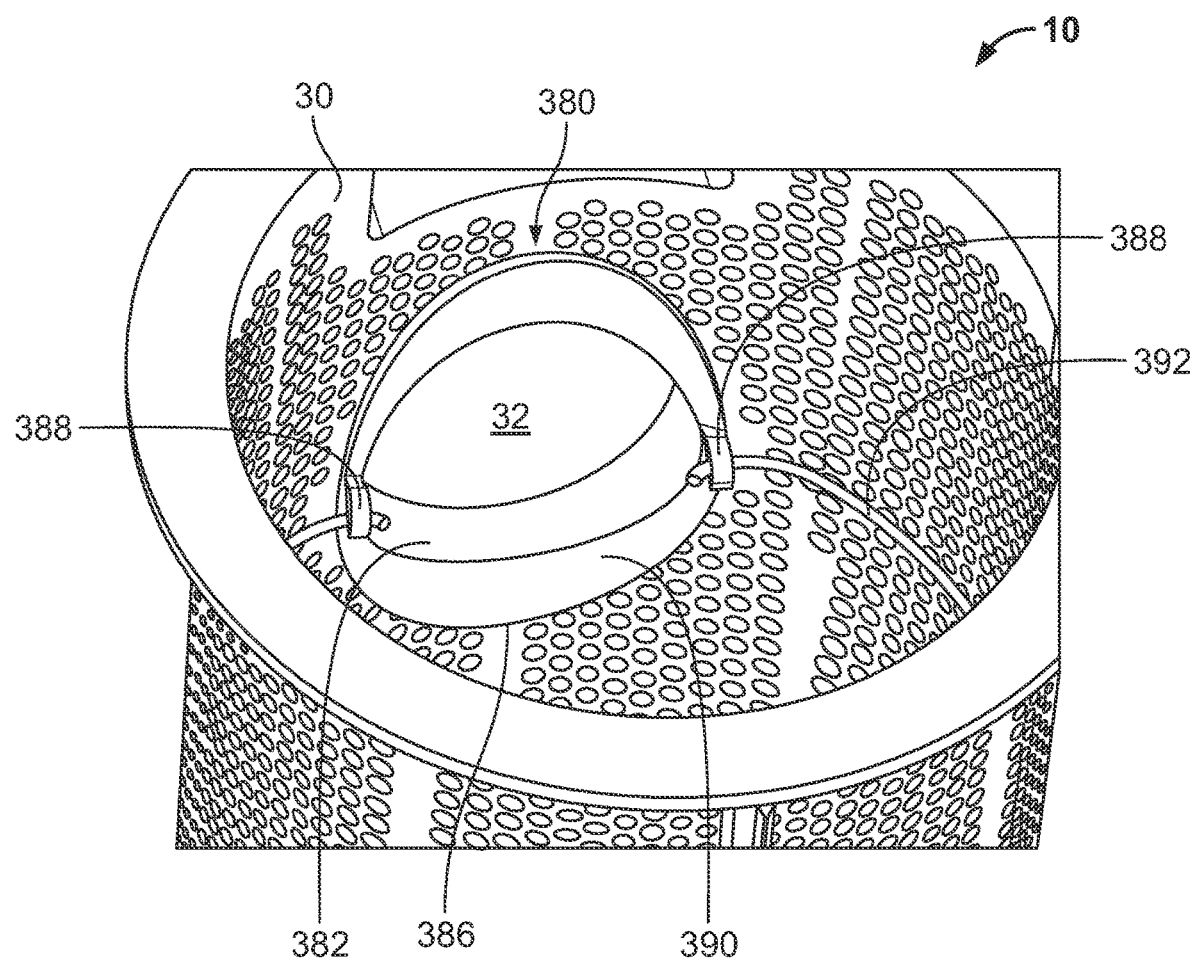
FIG. 12 is a perspective view of another adapter collar of the present disclosure engaged with the strainer basket of FIG. 1.

FIG. 12 a rear perspective view of another exemplary adapter 380 according to the present disclosure positioned within the inlet aperture 32 of the strainer basket 10. As shown, the adapter 280 can include an aperture wall 382 and a peripheral flange 386 extending from the aperture wall 382. The aperture wall 382 can have an outer diameter configured to be received within the inlet aperture 32 of the strainer basket 10 and the peripheral flange 386 can be configured to have a curvature that conforms with the curvature of the inner surface 30 of the strainer basket 10 so that the peripheral flange 386 can sit flush against the inner surface 30 when the adapter 380 is engaged with the strainer basket 10. The adapter 380 can also include one or more braces 392 formed from a rigid, or semi-rigid material (e.g., metal, plastic, rubber, etc.) that are coupled to a rear surface 390 of the peripheral flange 386 via one or more mounting points 388 extending therefrom. As shown, the one or more braces 392 can traverse the periphery of the inner surface 30 of the strainer basket 10, thereby securing the adapter 380 within the aperture 32, against the inner wall 30, and preventing the adapter 380 from moving into the interior of the strainer basket 10 during operation. According to other embodiments of the present disclosure, any of the adapter collars disclosed herein (e.g., adapters 180, 280, and 380) can be integrally formed with the strainer basket 10. For example, the strainer basket 10 and the adapter collars disclosed herein can be formed as a single component using an injection molding process or the like.

Figure 13:
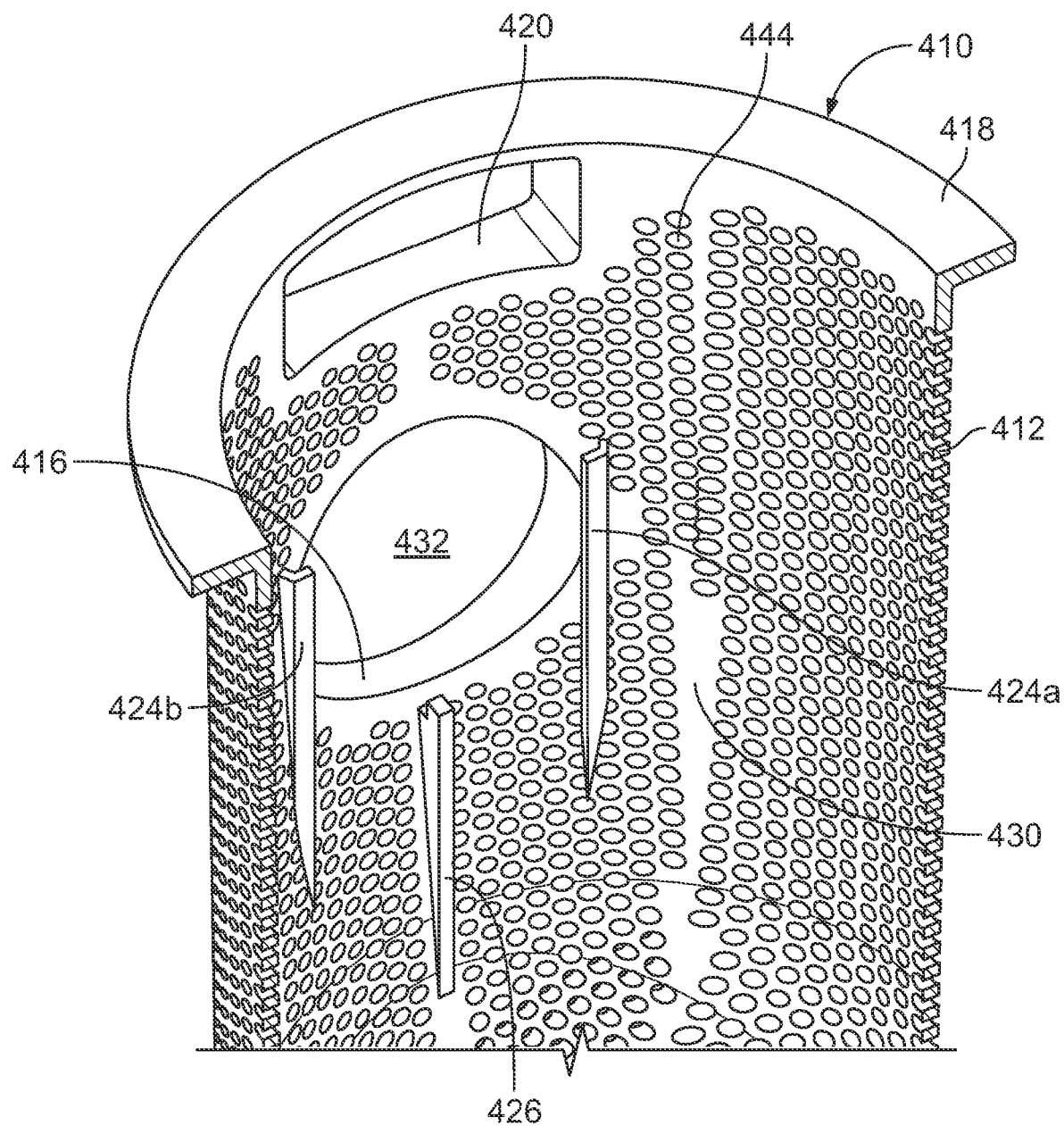
FIG. 13 is a perspective view of another strainer basket of the present disclosure.

FIG. 13 is a perspective view of another exemplary strainer basket 410 according to the present disclosure. The strainer basket 410 can be substantially similar to strainer basket 10 in both form and function, except for the distinctions noted herein. As shown, the strainer basket 410 can include a cylindrical wall 412 having an outer surface 428 (not shown), an inner surface 430 and a plurality of openings 444 therein, an inlet wall 416 disposed through the cylindrical wall 412 and defining an inlet aperture 432, a handle 420, and an annular flange 418 extending from an upper edge of the cylindrical wall 412. The strainer basket 410 can also include one or more tracks 424a and 424b positioned on the inner surface 430 about the inlet aperture 432 that can be configured to slidably receive one or more of the connection tabs (e.g., connection tab 154 or 254) of the present disclosure. A support 426 can also be provided on the inner surface 430 of the strainer basket 410 to prevent additional vertical movement of the connection tab after it has been received by the tracks 424a and 424b and aligned with the inlet aperture 432. The tracks 424a and 424b and the support 426 can be integrally formed with the cylindrical wall 412 of the strainer basket 412, or attached thereto using means known to those of ordinary skill in the art (e.g., welding, bonding, gluing, and the like).

Figure 14:
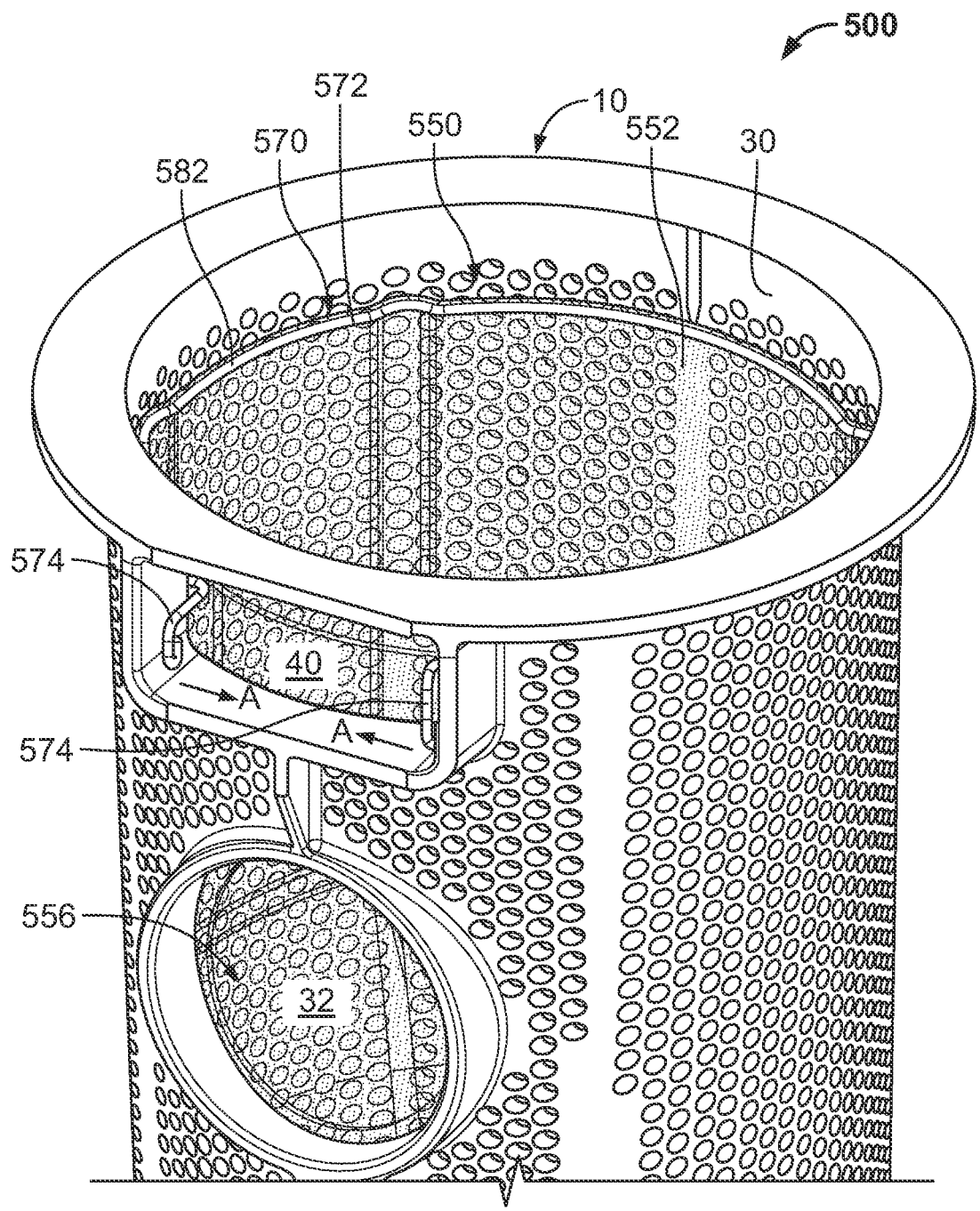
FIG. 14 is a perspective view of another disposable insert of the present disclosure engaged with the strainer basket of FIG. 1.

FIG. 14 is a perspective view of an exemplary disposable insert system 500 according to aspects of the present disclosure including the strainer basket 10 and a disposable liner 550. The disposable liner 550 can include a mesh debris bag 552 having a generally cylindrical shape sized to be received within the interior of the strainer basket 10 and an inner frame 570. The mesh debris bag 552 can define a plurality of openings (not shown) having diameters that are the same size as, or smaller than, the diameters of the openings 44 (see FIG. 1) of the strainer basket 10. Advantageously, this permits the debris bag 552 to capture debris that would ordinarily not be captured by the strainer basket 10, and/or debris which would ordinarily get lodged in the openings 44 of the strainer basket 10. The debris bag 552 can have an open top 554 (e.g., similar to the construction of a garbage bag) and an inlet aperture 556 disposed therethrough that can be sized and positioned to align with the inlet aperture 32 of the strainer basket 10. The open top 554 of the debris bag 552 (and other debris bags disclosed herein) can have the advantage of allowing a user to see into the bag and determine when it must be replaced. The inner frame 570 can include one or more horizontal support members 582 that partially, or entirely, traverse the perimeter of the inner surface 30 of the strainer basket 10 and one or more vertical support members 572 disposed therebetween. As shown, the horizontal support member 582 can include engagement arms 574 that extend from the interior of the strainer basket 10 into an aperture 40 defined by the handle 20, thereby securing the disposable liner 550 within the strainer basket 10 and preventing the debris bag 552 from falling to the bottom of the strainer 10 and/or blocking the inlet 32. The horizontal support member 582 can be formed from a resiliently deformable material (e.g., wire, plastic, rubber, and the like). Accordingly, a user can remove the disposable liner 550 by compressing the arms 574 together, in the direction of arrows A, and pulling the disposable liner 550 out through the open top of the strainer basket 10. According to some embodiments of the present disclosure, a horizontal support members 582 can be positioned in the same plane as, or on top of, the peripheral flange 18 (see FIG. 1) such that the lid of the pump assembly housing can be closed to form a seal thereagainst.

Figure 15:
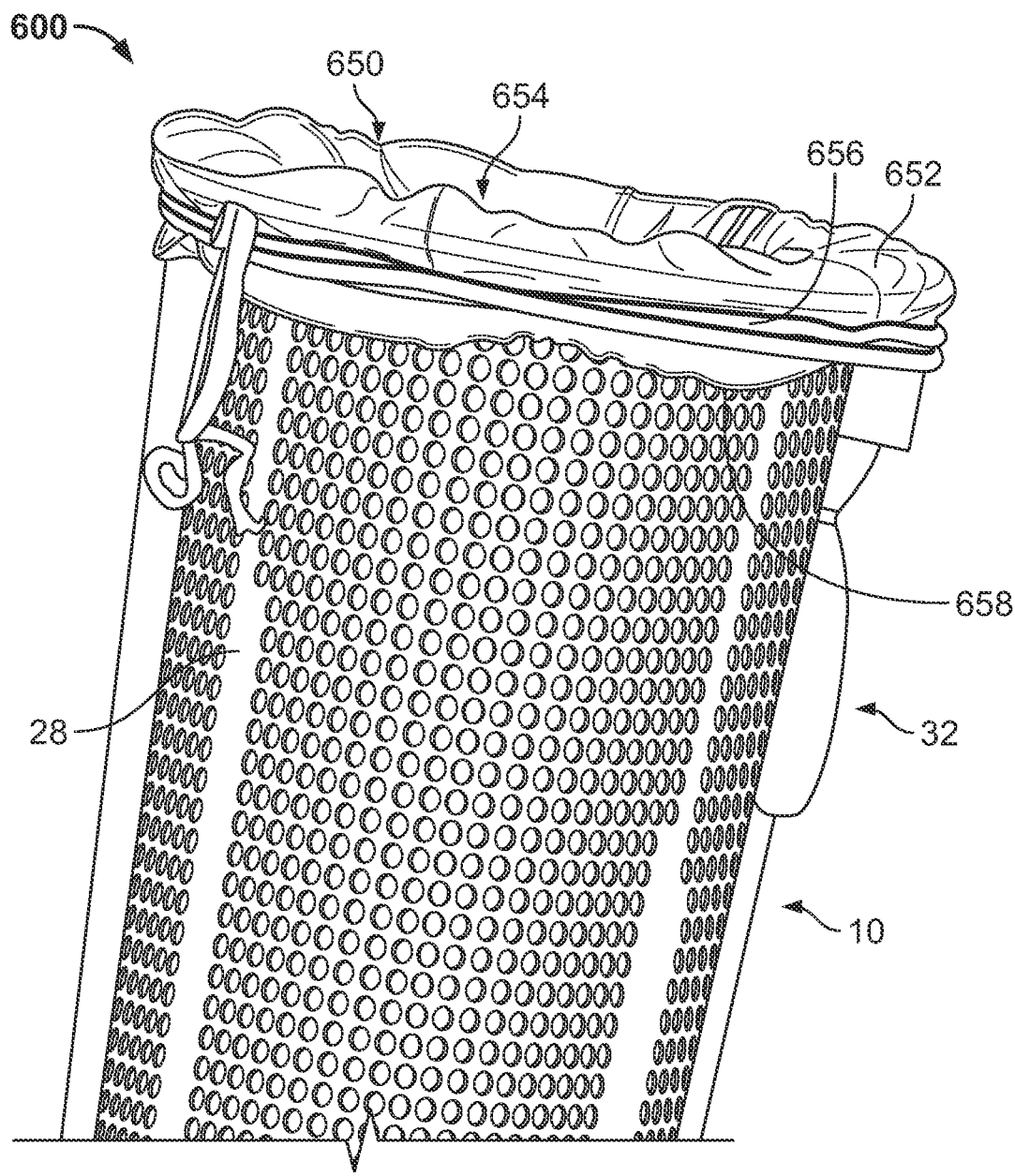
FIG. 15 is a perspective view of another disposable insert of the present disclosure engaged with the strainer basket of FIG. 1.

FIG. 15 is a perspective view of an exemplary disposable insert system 600 according to aspects of the present disclosure including the strainer basket 10 and a disposable liner 650. The disposable liner 650 can include a mesh debris bag 652 having a generally cylindrical shape sized to be received within the interior of the strainer basket 10. The mesh debris bag 652 can define a plurality of openings (not shown) having diameters that are the same size as, or smaller than, the diameters of the openings 44 (see FIG. 1) of the strainer basket 10. Advantageously, this permits the debris bag 652 to capture debris that would ordinarily not be captured by the strainer basket 10, and/or debris which would ordinarily get lodged in the openings 44 of the strainer basket 10. The debris bag 652 can have an open top 654 (e.g., similar to the construction of a garbage bag) and an inlet aperture (not shown) disposed therethrough that can be sized and positioned to align with the inlet aperture 32 of the strainer basket 10. The disposable liner 650 can include a draw string 656, elastic, or the like, attached to the debris bag 652 at an upper edge 658 about the open top 654. As shown, the upper edge 658 of the debris bag 652 and the draw string 656 can be wrapped over and around the annular flange 18 (not shown) of the strainer basket 10 and the draw string can be secured about the outer surface 28 of the strainer basket 10, thereby securing the disposable liner 650 therewithin. According to some embodiments of the present disclosure, the lid of the pump assembly housing can be closed to form a seal against the debris bag 652 and strainer basket 10 by sandwiching the debris bag 652 between the annular flange 18 (not shown) of the strainer basket 10 and the lid of the pump assembly housing.

Figure 16:
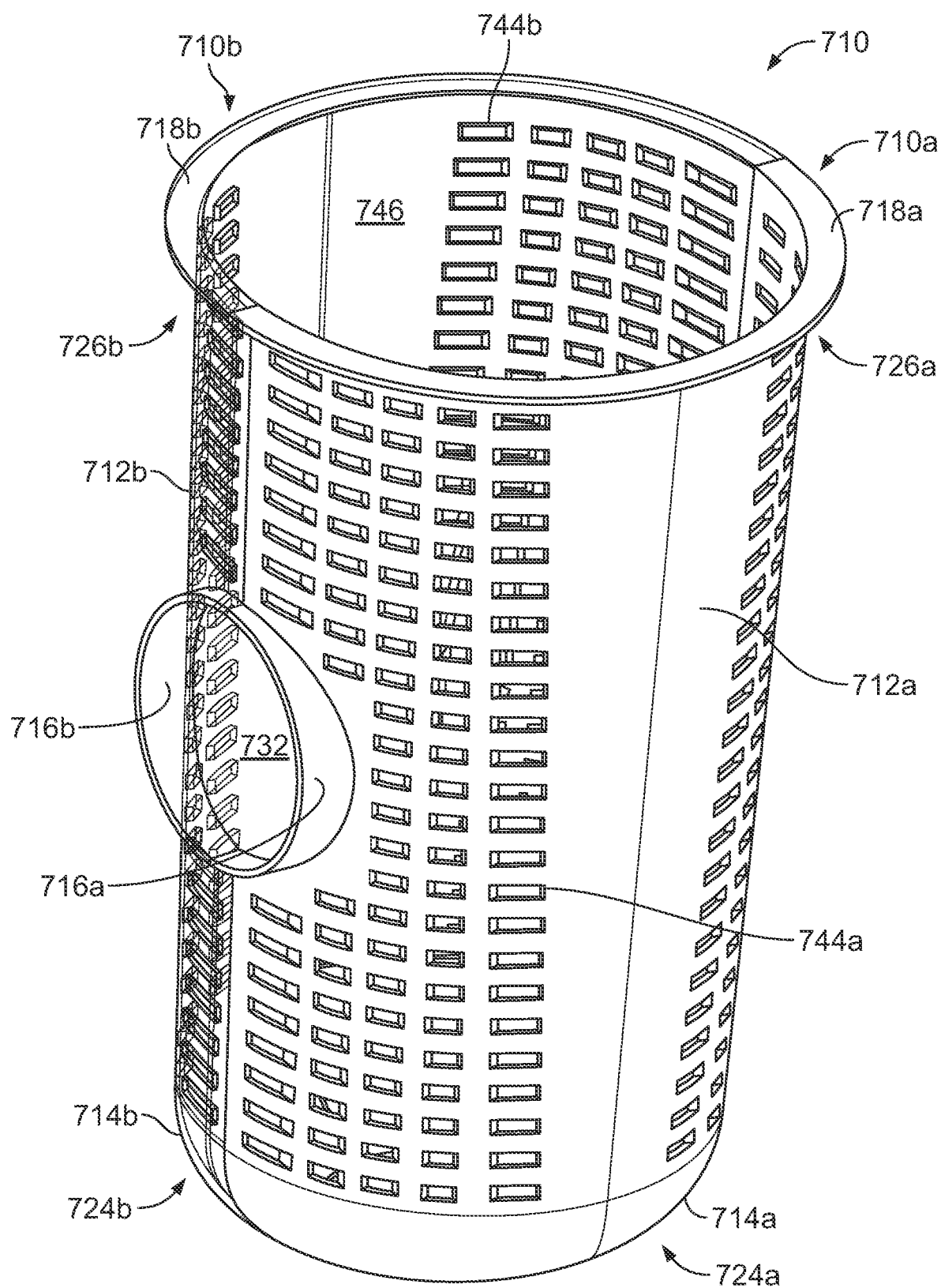
FIG. 16 is a perspective view of a disposable strainer basket of the present disclosure.

FIG. 16 is a perspective view of an exemplary disposable strainer basket 710 according to the present disclosure. The disposable strainer basket 710 can be similar to the strainer basket 10 in both form and function, except for the distinctions noted herein. The disposable strainer basket 710 can include a first half 710a and a second half 710b that can be snapped, or otherwise secured, together by a user prior to installation in a pool or spa pump, as discussed herein. Forming the disposable strainer basket 710 from the first half 710a and the second half 710b can be advantageous in that the tooling actions, cycle time, and maintenance requirements required for the production thereof can be reduced, when compared with a comparable component (e.g., the strainer basket 10) formed as a single piece using a similar manufacturing process (e.g., injection molding). As shown, the first half 710a can include a semi-cylindrical body 712a with a plurality of openings 744a, a semi-cylindrical base 714a at a distal end 724a of the semi-cylindrical body 712a, a semi-cylindrical inlet wall 716a, and a semi-cylindrical annular flange 718a extending from a proximal end 726a of the semi-cylindrical body 712a. Similarly, the second half 710b can include a semi-cylindrical body 712b with a plurality of openings 744b, a semi-cylindrical base 714b at a distal end 724b of the semi-cylindrical body 712b, a semi-cylindrical inlet wall 716b, and a semi-cylindrical annular flange 718b extending from a proximal end 726b of the semi-cylindrical body 712b. When the first half 710a and the second half 710b are secured together, the semi-cylindrical body 712a, the semi-cylindrical body 712b, the semi-cylindrical base 714b, and the semi-cylindrical base 714b form a central plenum 746 for receiving debris laden water from the pool or spa and the semi-cylindrical inlet walls 716a and 716b define an inlet aperture 732 for providing the water to the central plenum. According to some embodiments of the present disclosure, the lid of the pump assembly housing can be closed against the semi-cylindrical annular flanges 718a and 718b of the strainer basket 710 to form a seal therebetween. It will be understood by those of ordinary skill in the art that the disposable strainer basket 710 can also be used in connection with one or more of the disposable liners disclosed herein.

Figure 17:
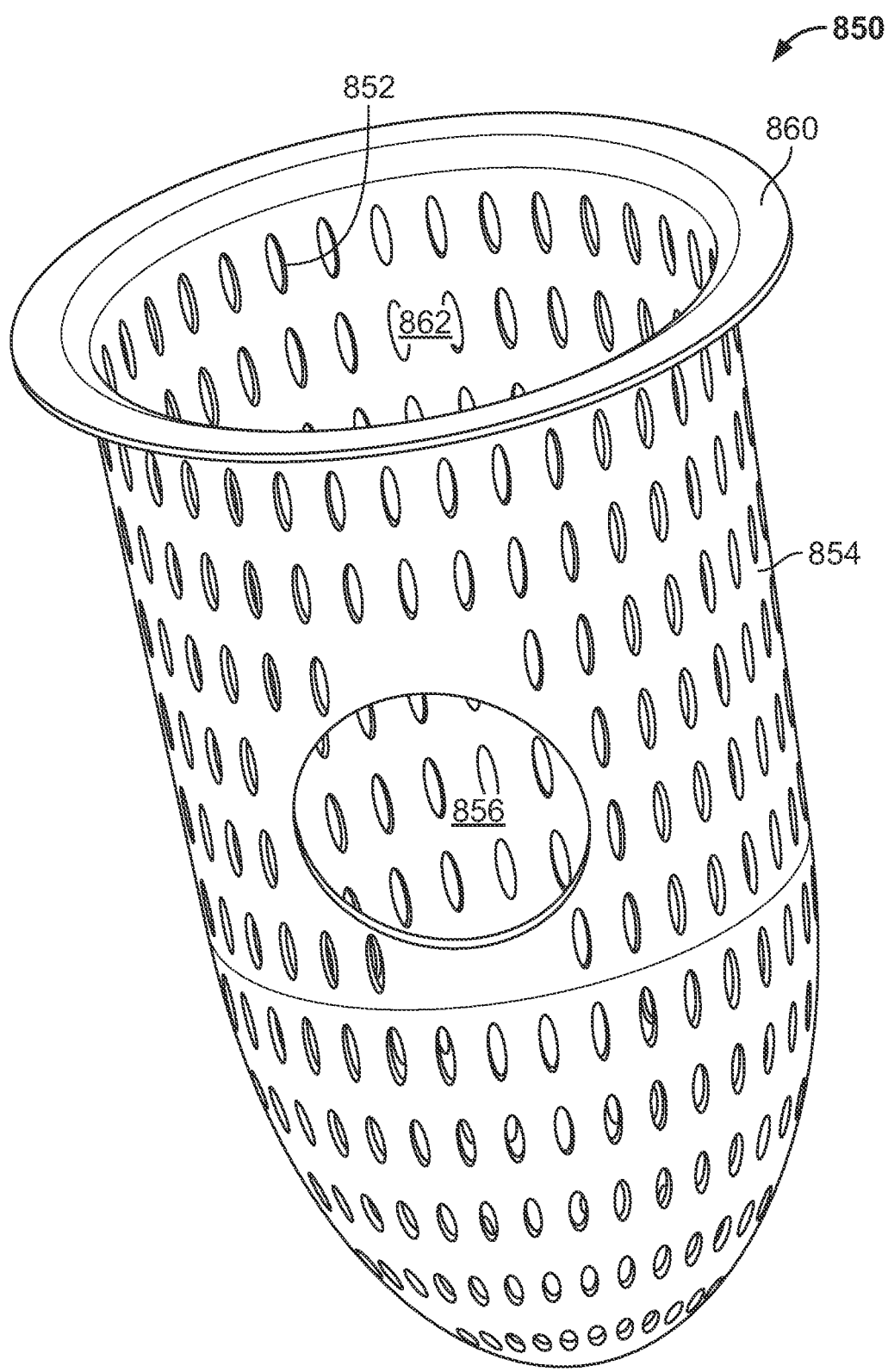
FIG. 17 is a perspective view of another disposable insert of the present disclosure.

FIG. 17 is a perspective view of another exemplary disposable liner 850 according to the present disclosure. The disposable liner 850 can be formed from a rigid, or semi-rigid material, can be sized to be received within one or more of the strainer baskets disclosed herein (e.g., strainer baskets 10, 410, and 710), and can include a generally cylindrical body 854 having a plurality of openings 852, an inlet aperture 856 disposed through the body 854, and a peripheral flange 860 disposed about a proximal opening 862 in the body 854. The plurality of openings 852 can have diameters that are the same size as, or smaller than, the diameters of the openings of the strainer baskets disclosed herein (e.g., the openings 44 of strainer basket 10). Advantageously, this permits the disposable liner 850 to capture debris that would ordinarily not be captured by the strainer baskets, and/or debris which would ordinarily get lodged in the openings of the strainer baskets. According to some embodiments of the present disclosure, the lid of the pump assembly housing can be closed to form a seal against the disposable liner 850 and a strainer basket by sandwiching the peripheral flange 860 of the disposable liner 850 between the annular flange of the strainer basket (e.g., flange 18 of strainer basket 10) and the lid of the pump assembly housing.

Figure 18:
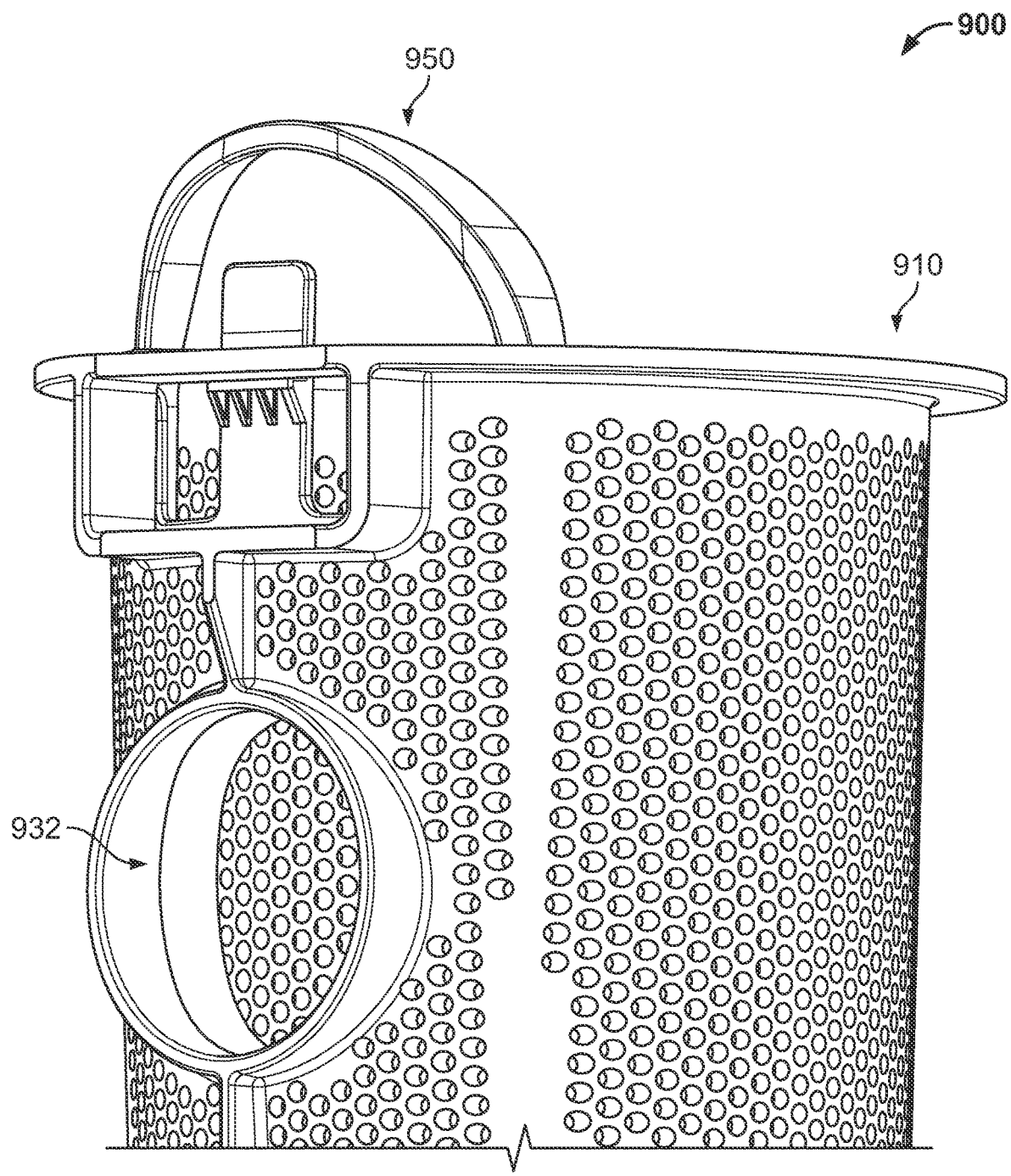
FIG. 18 is a front perspective view of another embodiment of the disposable insert system of the present disclosure, including a strainer basket and a removable liner.
Figure 19:
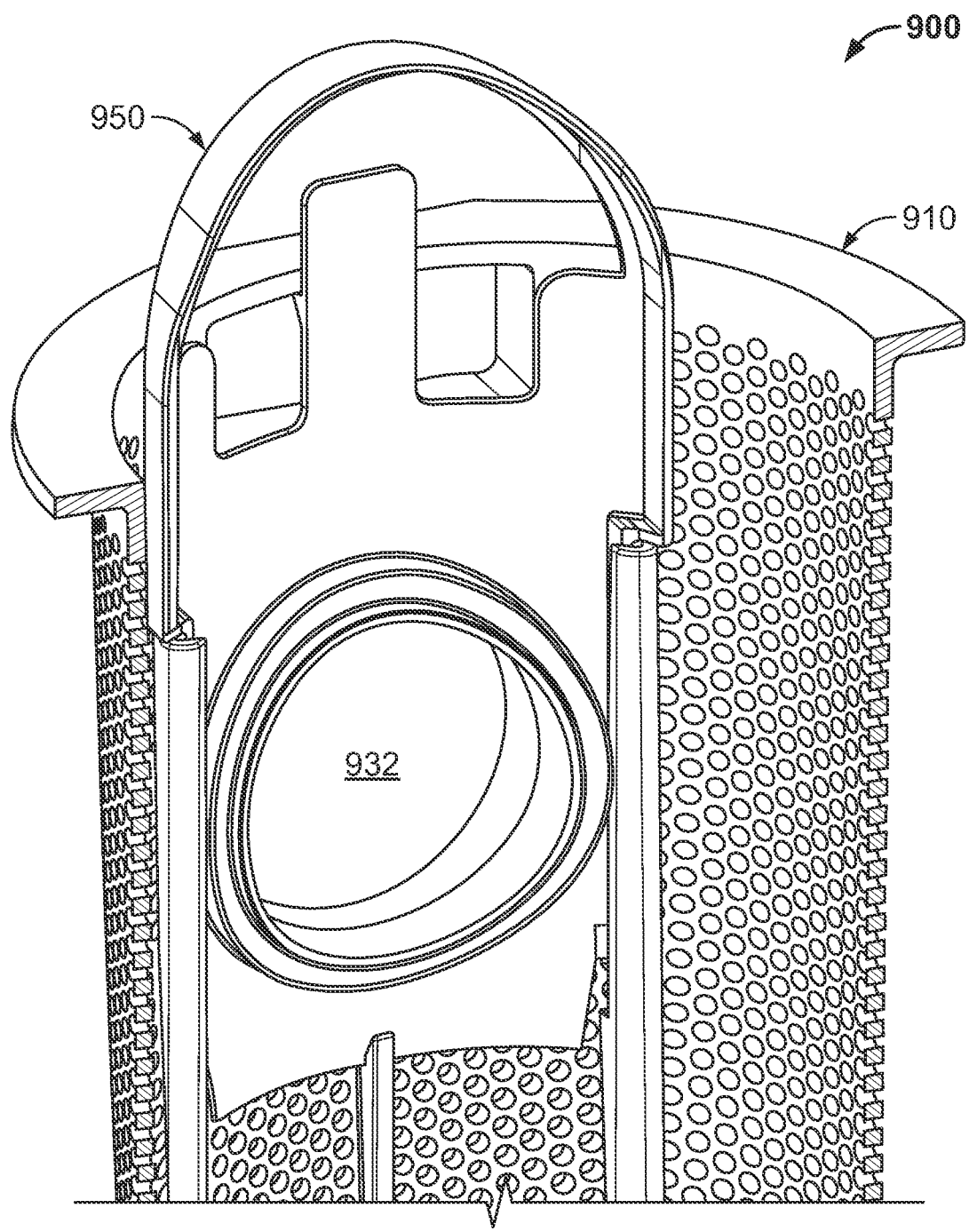
FIG. 19 is a partial rear perspective view of the disposable insert system of FIG. 18.
Figure 20:
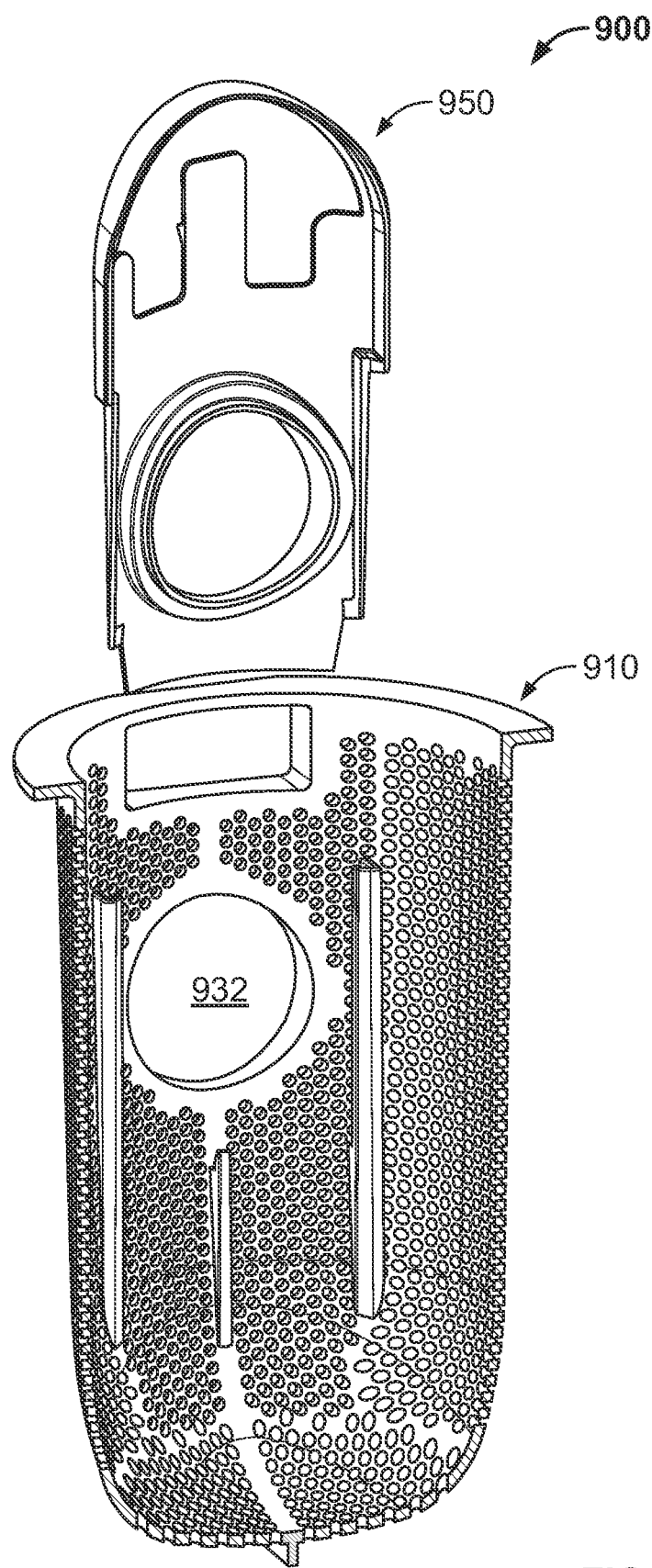
FIG. 20 is an exploded view of the disposable insert system of FIG. 18.

FIGS. 18-24 illustrate another embodiment of the disposable insert strainer system, indicated generally at 900, including a strainer basket 910 and a disposable liner 950. Specifically, FIG. 18 is a front perspective view of the strainer system 900, FIG. 19 is a partial rear perspective view of the strainer system 900, and FIG. 20 is a partial exploded view of the strainer system 900. For the purpose of clarity, one or more components of the disposable liner 950 (e.g., debris bag 952 and support member 980, discussed in connection with FIGS. 23-24) are not shown in FIGS. 18-20. The disposable liner 950 could be in the form of a removable liner that is insertable into, and removable from, the strainer basket 910. Advantageously, the liner 950 can be removed from the strainer basket 910 by pulling the liner 950 and the strainer 910 in opposite directions, without requiring the removal of any fasteners or the use of tools, etc. Each of the foregoing components of the strainer system 900 will now be discussed in greater detail in connection with FIGS. 21-24.

Figure 21:
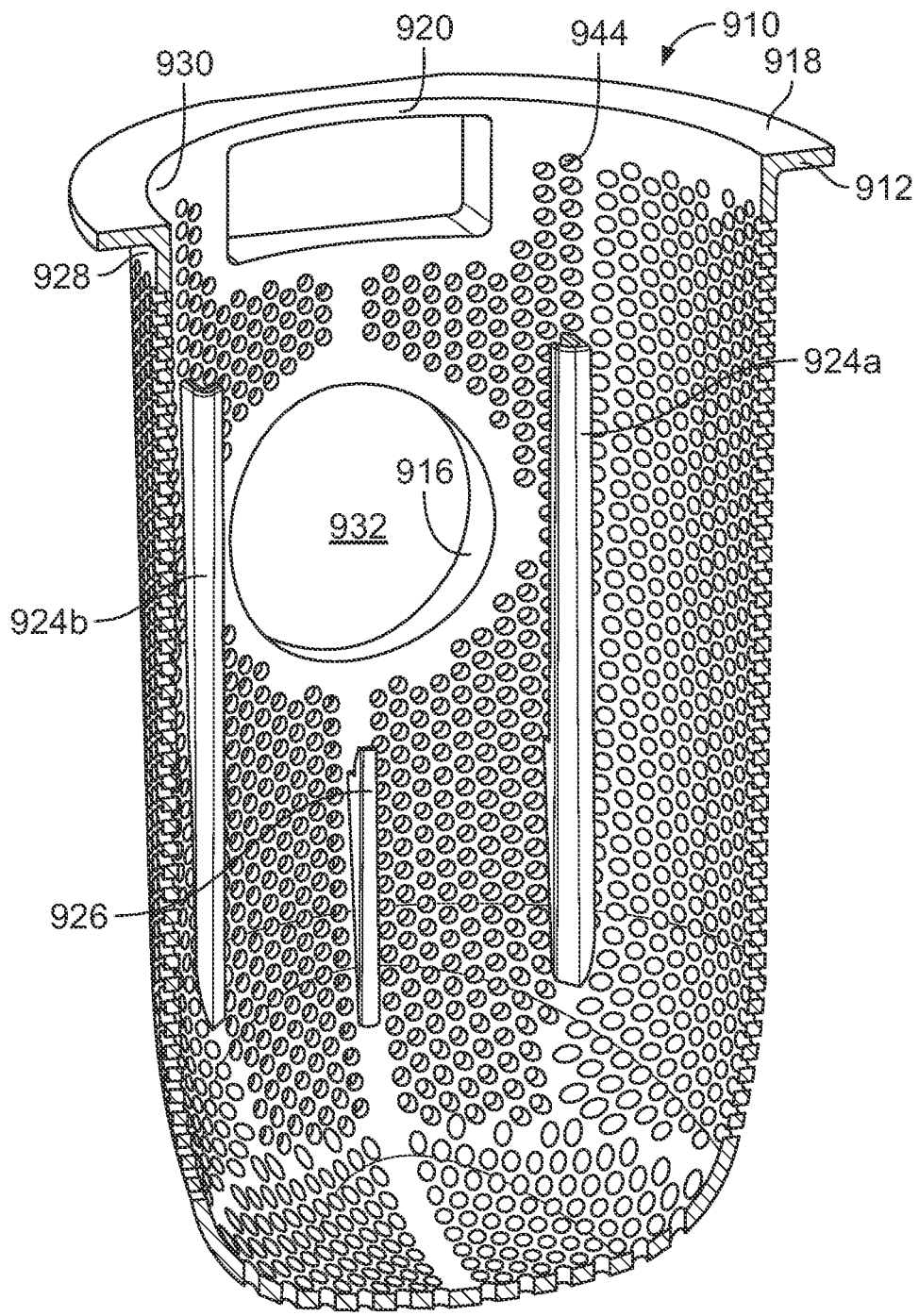
FIG. 21 a partial rear perspective view of the strainer basket of FIG. 18.
Figure 22:
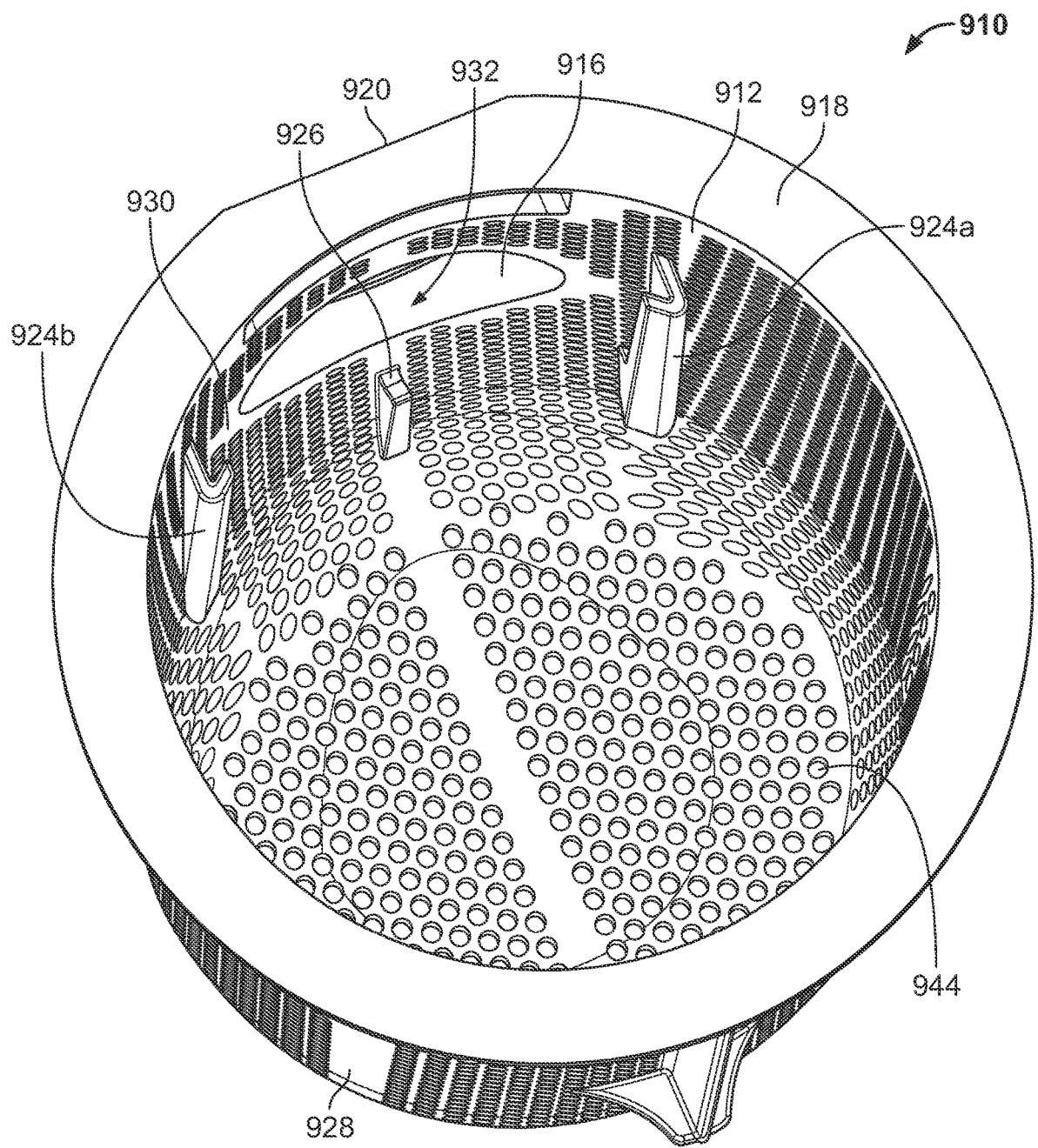
FIG. 22 is a top perspective view of the strainer basket of FIG. 18.

FIG. 21 is a partial rear perspective view of the strainer basket 910 and FIG. 22 is a top perspective view of the strainer basket 910. The strainer basket 910 can be substantially similar to strainer basket 10 in both form and function, except for the distinctions noted herein. As shown, the strainer basket 910 can include a cylindrical wall 912 having an outer surface 928, an inner surface 930 and a plurality of openings 944 therein, an inlet wall 916 disposed through the cylindrical wall 912 and defining an inlet aperture 932, a handle 920, and an annular flange 918 extending from an upper edge of the cylindrical wall 912. The strainer basket 910 can also include one or more tracks 924a and 924b positioned on the inner surface 930 about the inlet aperture 932 that can be configured to slidably receive one or more of the connection tabs (e.g., connection tab 154, connection tab 254, or connection tab 954, discussed in connection with FIGS. 23-24) of the present disclosure. A support 926 can also be provided on the inner surface 930 of the strainer basket 910 to prevent additional vertical movement of the connection tab 954 after it has been received by the tracks 924a and 924b and aligned with the inlet aperture 932. The tracks 924a and 924b and the support 926 can be integrally formed with the cylindrical wall 912 of the strainer basket 910, or attached thereto using means known to those of ordinary skill in the art (e.g., welding, bonding, gluing, and the like).

Figure 23:
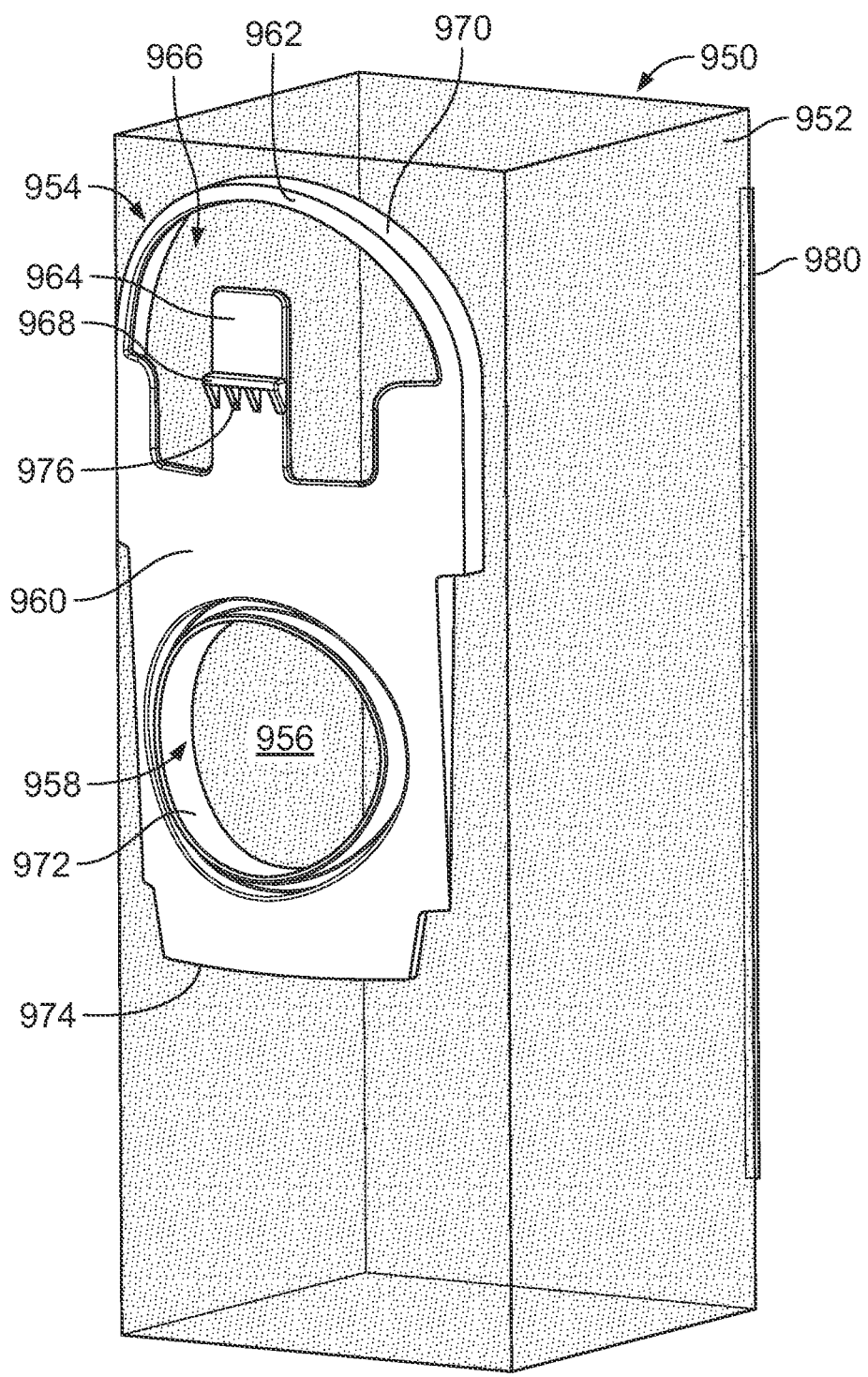
FIG. 23 is a front perspective view of the removable liner of FIG. 18.
Figure 24:
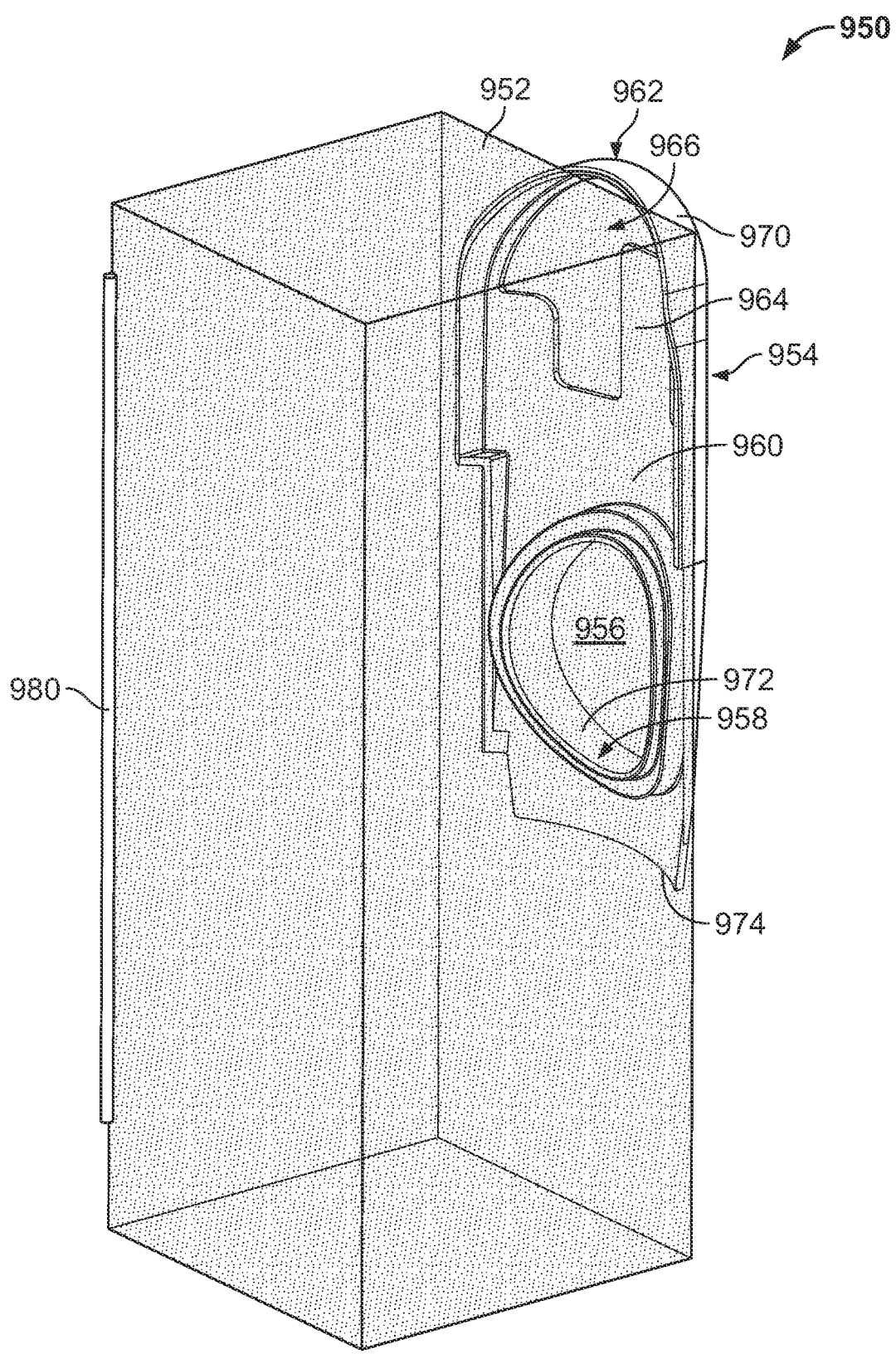
FIG. 24 is a rear perspective view of the removable liner of FIG. 18.

FIG. 23 is a front perspective view of the disposable liner 950 and FIG. 24 is a rear perspective view of the disposable liner 950. The disposable liner 950 can include a mesh debris bag 952 and a rigid connection tab 954 attached thereto that can be configured to removably engage the disposable liner 950 with the strainer basket 910. The debris bag 952 defines a generally closed chamber with an inlet aperture 956 (e.g., similar to a traditional vacuum bag with a single inlet) for receiving debris laden water from the inlet 932 of the strainer basket 910. The debris bag 952 can be generally tubular and have "boxed" corners, but of course, other shapes are possible. According to some aspects of the present disclosure, the debris bag 952 can be formed from a contiguous piece of mesh material (e.g., a rectangle) with a single seam that can be welded or sewn, continuously, using automation processes known to those of ordinary skill in the art, and the resulting tube can then be cut to length. The end-seams of the debris bag 952 can also be welded, or sewn, when the bag 952 is cut to length. The mesh debris bag 952 can define a plurality of openings (not shown) having diameters that are the same size as, or smaller than, the diameters of openings 944 of the strainer basket 910 (see, e.g., FIG. 18). Advantageously, this permits the debris bag 952 to capture debris that would ordinarily not be captured by the strainer basket 910, and/or debris which would ordinarily get lodged in the openings 944 of the strainer basket 910. According to some embodiments, the bag 952 can include one or more stiffeners, such as a wires, tubes, or the like that traverse the perimeter/exterior of the bag 952, in order to support the bag 952 and prevent same from being drawn into the inlet 932 of the strainer basket 910 during backflow operations. For example, as shown, a vertical support member 980 can be integrated into the continuous seam of the bag 952, opposite the connection tab 954. Additionally, the basket 910 could also be provided with one or more additional tracks, tabs, or the like (e.g., positioned opposite the inlet 932), configured to removably retain the vertical support member 980 against the inner surface 930 of the basket 910, thereby providing further support for the bag 952 and preventing same from being drawn into the inlet 932 of the strainer basket 910 during backflow operations.

The rigid connection tab 954 includes a body 960, an aperture wall 972 extending from (e.g., generally perpendicular to) the body 960 and defining an inlet aperture 958, a handle 962, a locking tab 964, and a flange 970 extending about the periphery of the body 960 and configured to enhance the structural rigidity of the connection tab 954. The locking tab 964 and the handle 962 can be defined by an aperture 966 extending through the body 160 and the locking tab 964 can be provided with a protrusion 968 configured to engage a handle 920 of the basket 910 when positioned therein (see FIG. 18).

The inlet aperture 956 of the debris bag 952 can be secured about the aperture wall 972 of the connection tab 954. As will be discussed in greater detail herein, the connection tab 954 of the liner 950 can be sized and shaped to be removably engaged with the tracks 924a and 924b of the basket 910. The handle 962 can be configured to allow a user to easily grasp the disposable liner 950 and remove the liner 950 from the strainer basket 910 when the bag 952 has been filled with debris, while also minimizing the user's contact with the debris. As shown in FIGS. 18 and 19, the handle 962 can extend above the annular flange 918 of the basket 910, such that the user can grasp the handle 962 when the liner 950 is engaged with the with the basket 910. According to certain embodiments of the present disclosure, the handle 962 can also function as a handle for the basket 910 when the liner is engaged therewith, allowing a user to remove both the liner 950 and basket 910 from, for example, a pool or spa pump with a single movement.

Additionally, the handle 962 can be bonded to the debris bag 952, or the handle 962 can include a feature that engages the bag 952, such that the bag 952 is prevented from collapsing into the interior of the strainer basket 910 and blocking the inlet 932 during backflow operations. One or more bars (see, e.g., bars 270 of FIG. 10), or a grating, can also be disposed within the inlet aperture 958 of the connection tab 954 in order to prevent the debris bag 952 from being drawn into the inlet aperture 932 of the strainer basket 910 during a backflow operation. According to some embodiments of the present disclosure, the debris bag 952 can be formed from a material that is sufficiently rigid, such that the bag 952 is self-supporting (e.g., holding its shape against gravity and water flow) and does not collapse into the interior of the strainer basket 910 during normal operation of the filter, or during a backflow operation.

The debris bag 952 and the tab 954 can be secured together using ultrasonic welding, chemical adhesives, or the like, or these components could be formed together as a single component. For example, the debris bag 952 and the tab 954 could both be formed from polymers that can be formed both into a textile (e.g., the bag 952) and an injection-molded component (e.g., the tab 954), such that the debris bag 952 and the tab 954 can be easily welded to each other, being formed from the same material. Such materials can include polyester, nylon, and the like. For example, the bag 952 can be formed from a contiguous sheet of 0.100" diamond polyester mesh having a thickness of 0.031". The bag 952 can also be formed from a polyester mesh fabric that is a mixture of polyester and bamboo, making the bag 952 more environmentally friendly.

The connection tab 954 can have a curvature that matches the curvature of the basket 910 and the flange 970 can be configured to be removably received by the first and second tracks 924a and 924b of the basket 910, such that the body 960 of the connection tab 954 can be positioned flush against the inner surface 930 of the of basket 910 when the disposable liner 950 is engaged therewith. For example, the first and second tracks 924a and 924b can cooperate with the flange 970 to facilitate a blind-mate interface for installation of a new disposable liner 950 within the strainer basket 910, without the use of tools. According to embodiments of the present disclosure, the tracks 924a and 924b can be configured to slidably receive the peripheral flange 270.

Additionally, the aperture wall 972 can be sized and positioned on the body 960 of the connection tab 954, such that the aperture wall 972 is substantially concentric, coplanar, and flush with the inlet wall 916 of the basket 910 and the inlet apertures 932, 956, and 958 are substantially aligned when the disposable liner 950 is engaged with the basket 910 (e.g., as shown in FIG. 18). For example, the aperture wall 972 of the connection tab 954 can have an inner diameter that is equal to the inner diameter of the aperture wall 916 of the basket 910, so that the aperture wall 972 of the connection tab 954 can be positioned adjacent to and abut the aperture wall 916 of the basket 910, thereby forming a flow path therebetween having a uniform diameter.

In operation, a user can vertically align the flange 970 of the connection tab 954 with the tracks 924a and 924b of the basket 910 (e.g., as shown in FIG. 20), and then lower the connection tab 954 into the basket, such that the flange 970 is slidably received by the tracks 924a and 924b. As shown best in FIG. 19, a bottom edge 974 of the connection tab 954 can rest on the support 926 of the basket 910, thereby preventing further downward travel. Additionally, the protrusion 968 of the locking tab 964 can engage a lower face of the basket handle 920, thereby preventing upward travel of the connection tab 954 and securing the liner 950 within the basket 910. Furthermore, the connection tab 954, and the locking tab 964, can be formed from a resiliently deformable material. As such, a user can disengage the connection tab 954 from the basket 910 by applying a force against the locking tab 964 (e.g., towards the interior of the basket 910) until the locking tab 964 is deflected and the protrusion 968 is no longer retained under the handle 920 of the basket 910 and by pulling upward on the handle 962 of the liner 950. The locking tab 964 can also be provided with a ramped portion 976 to facilitate deflection of the locking tab 964 and displacement of the protrusion 968 as the connection tab 954 is inserted into the basket 910.

Figure 25:
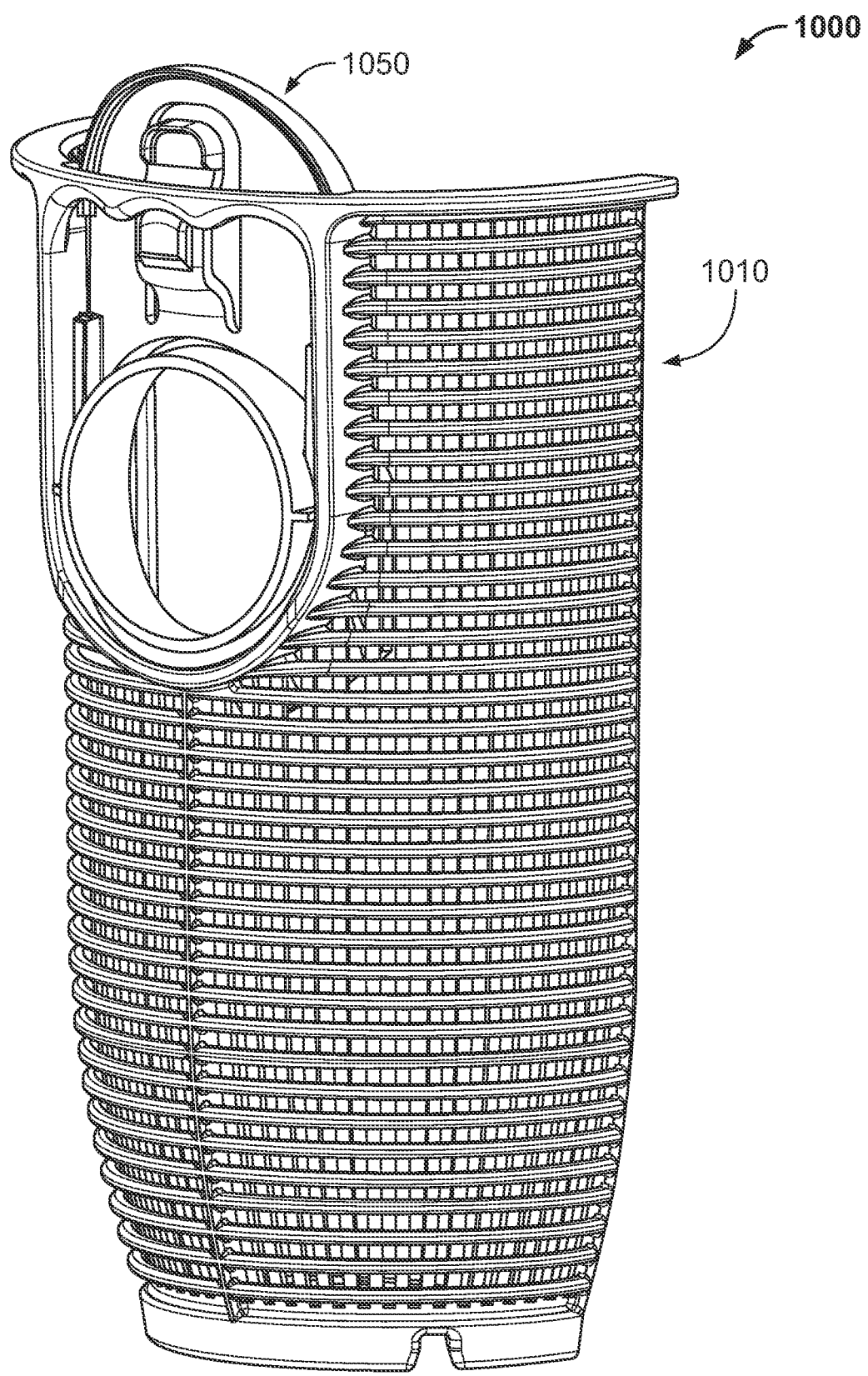
FIG. 25 is a front perspective view of another embodiment of the disposable insert system of the present disclosure, including a strainer basket and a removable liner.
Figure 26:
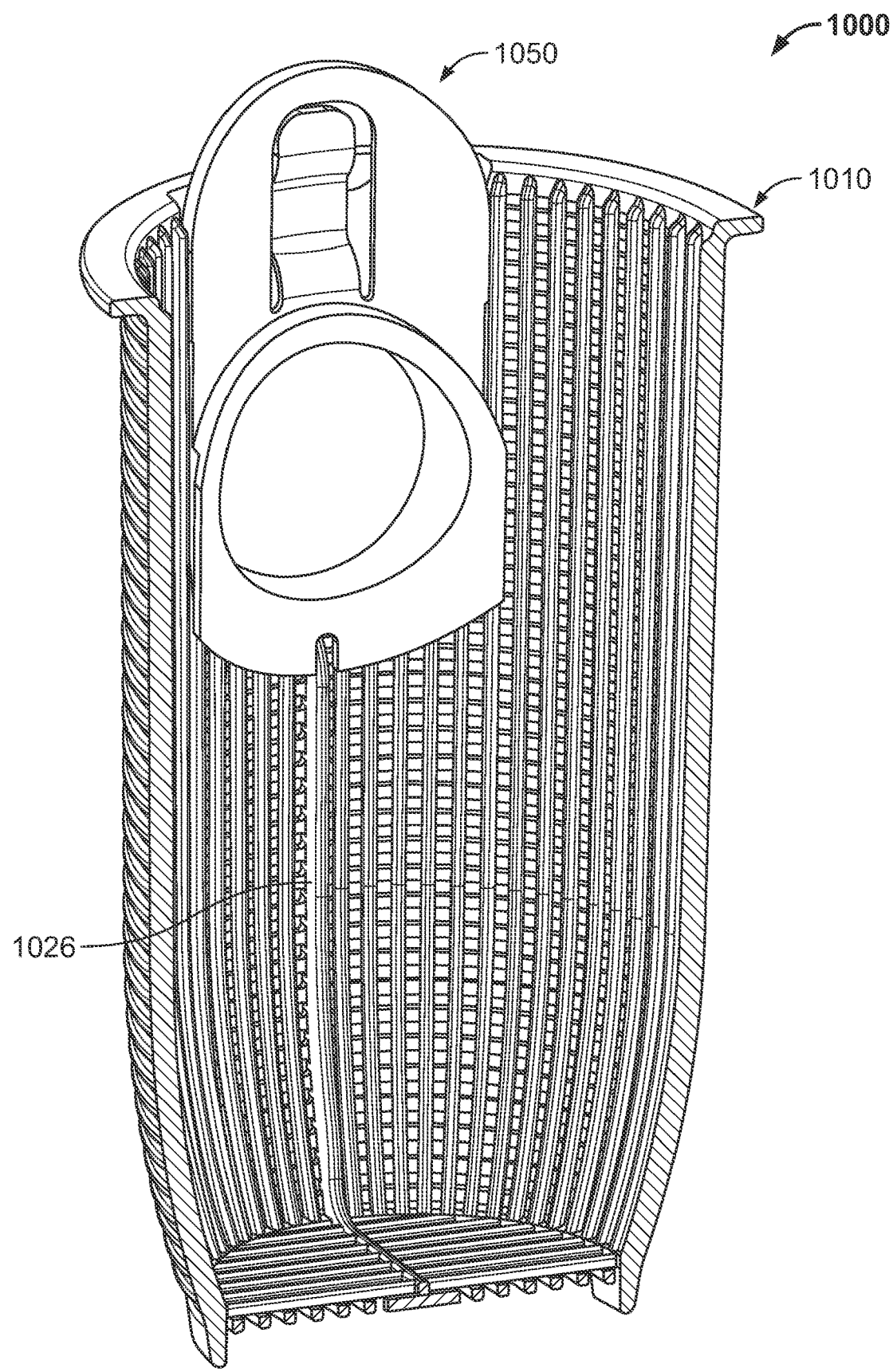
FIG. 26 is a partial rear perspective view of the disposable insert system of FIG. 25.
Figure 27:
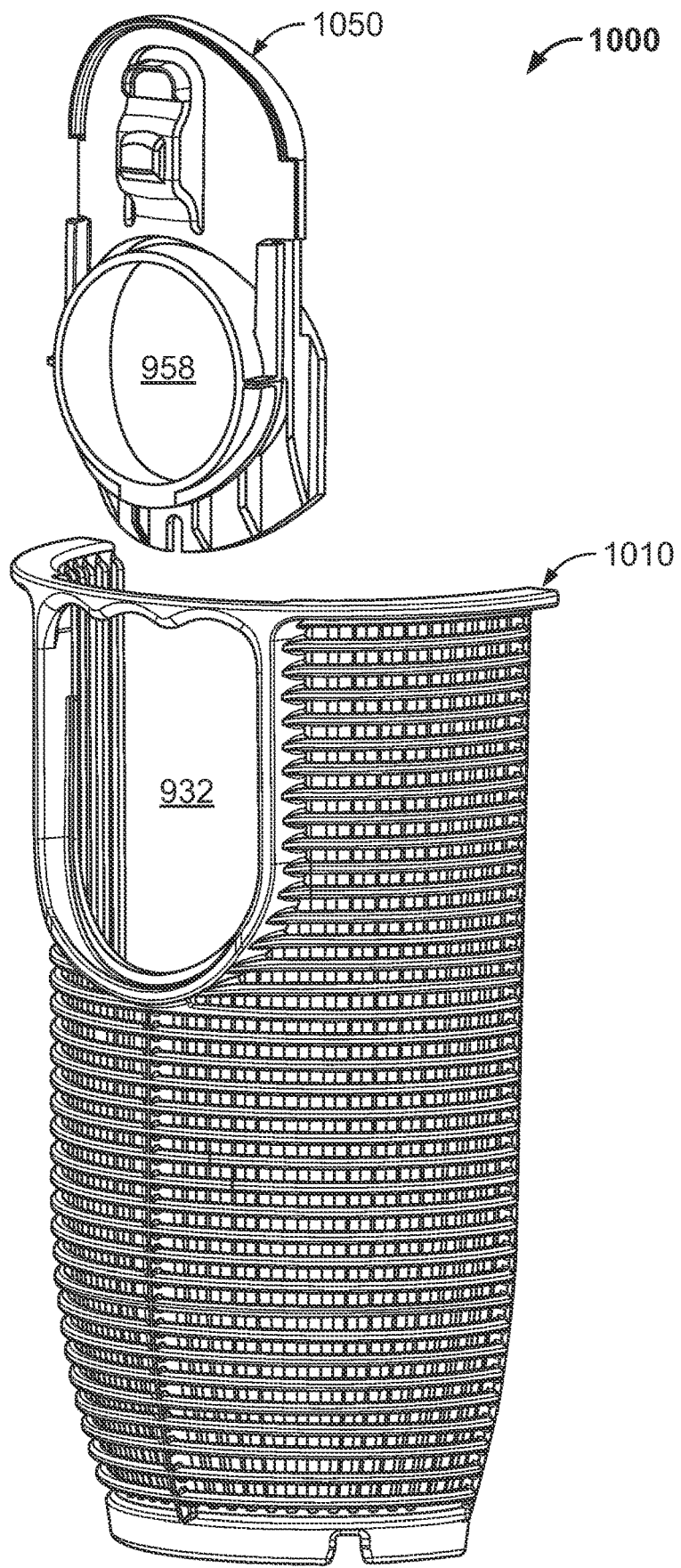
FIG. 27 is a front exploded view of the disposable insert system of FIG. 25.
Figure 28:
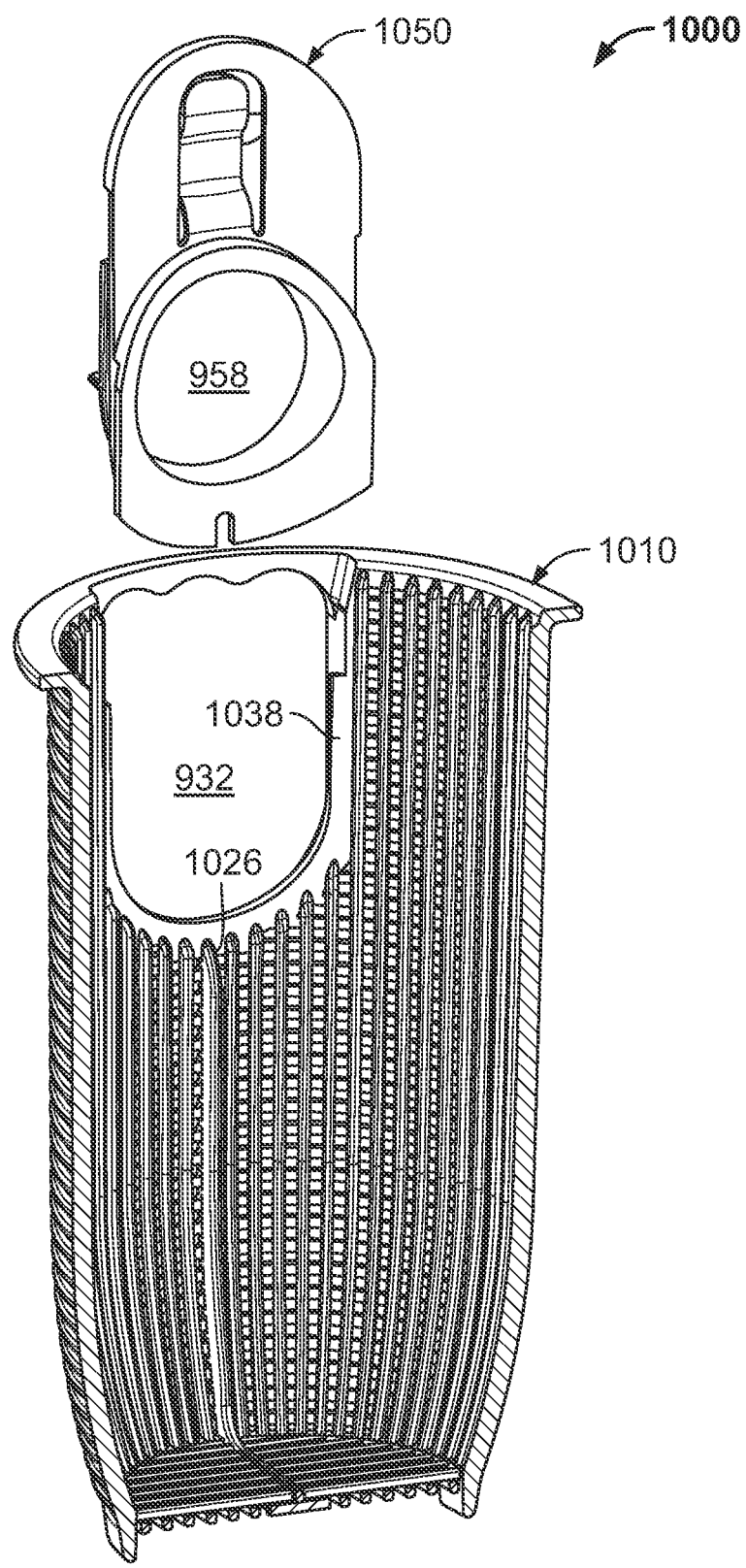
FIG. 28 is a rear exploded view of the disposable insert system of FIG. 25.

FIGS. 25-31 illustrate another embodiment of the disposable insert strainer system, indicated generally at 1000, including a strainer basket 1010 and a disposable liner 1050. Specifically, FIG. 25 is a front perspective view of the strainer system 1000, FIG. 26 is a partial rear perspective view of the strainer system 1000, FIG. 27 is an exploded partial front view of the strainer system 1000, and FIG. 28 is an exploded partial rear view of the strainer system 1000. For the purpose of clarity, one or more components of the disposable liner 1050 (e.g., debris bag 1052 and support member 1080, discussed in connection with FIGS. 30-31) are not shown in FIGS. 25-28. The disposable liner 1050 could be in the form of a removable liner that is insertable into, and removable from, the strainer basket 1010. Advantageously, the liner 1050 can be removed from the strainer basket 1010 by pulling the liner 1050 and the strainer 1010 in opposite directions, without requiring the removal of any fasteners, the use of tools, etc. Each of the foregoing components of the strainer system 1000 will now be discussed in greater detail in connection with FIGS. 29-31.

Figure 29:
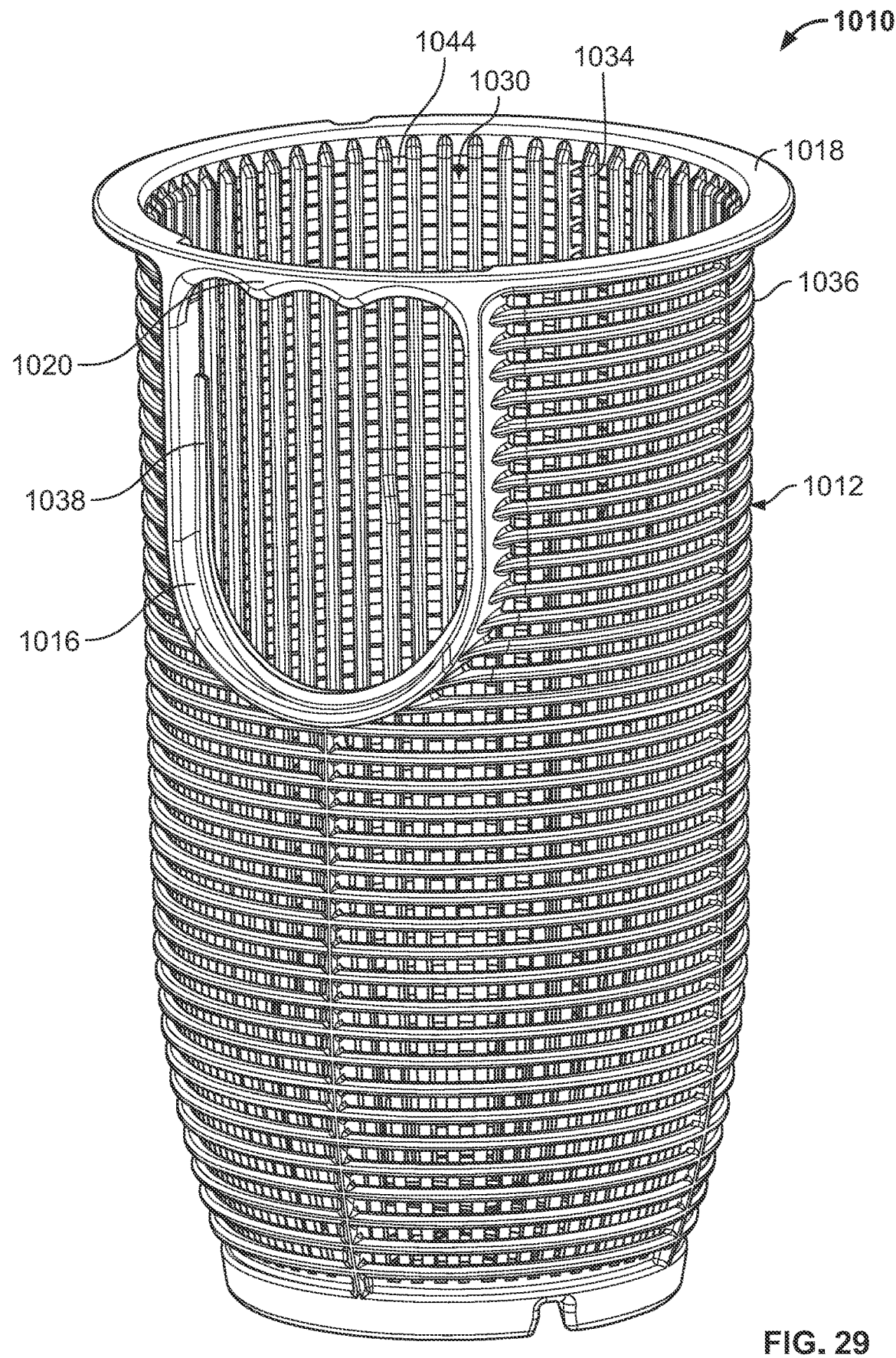
FIG. 29 a perspective view of the strainer basket of FIG. 25.

FIG. 29 is a perspective view of the strainer basket 1010. As shown, the strainer basket 1010 can include a cylindrical body 1012 defining an interior chamber 1030, the cylindrical body 1012 formed from a plurality of generally tubular interior vertical members 934 and a plurality of generally annular external horizontal members 936, a plurality of openings 1044 between the plurality of vertical members 1034 and the plurality of horizontal members 1036, an inlet wall 1016 defining an inlet aperture 1032 extending through the cylindrical body 1012, a handle 1020 forming a portion of the inlet aperture 1032, and an annular flange 1018 extending from an upper edge of the cylindrical body 1012. The strainer basket 1010 can also include a connection flange 1038 disposed about a portion of the inlet wall 1016 and extending generally perpendicular thereto. As will be described in greater detail herein, the connection flange 1038 is configured to receive thereon first and second tracks 1024a and 1024b of a connection tab 1054 of the liner 1050, to removably engage the liner 1050 with the basket 1010. A support 1026 can be integrally formed with, or comprise, one or more of the vertical members 1034 and can be provided within the interior chamber 1030 of the strainer basket 1010 to prevent additional vertical movement of the connection tab 1054 after engaging the connection flange 1038 and being aligned within the inlet aperture 1032 (see FIGS. 25-26).

Figure 30:
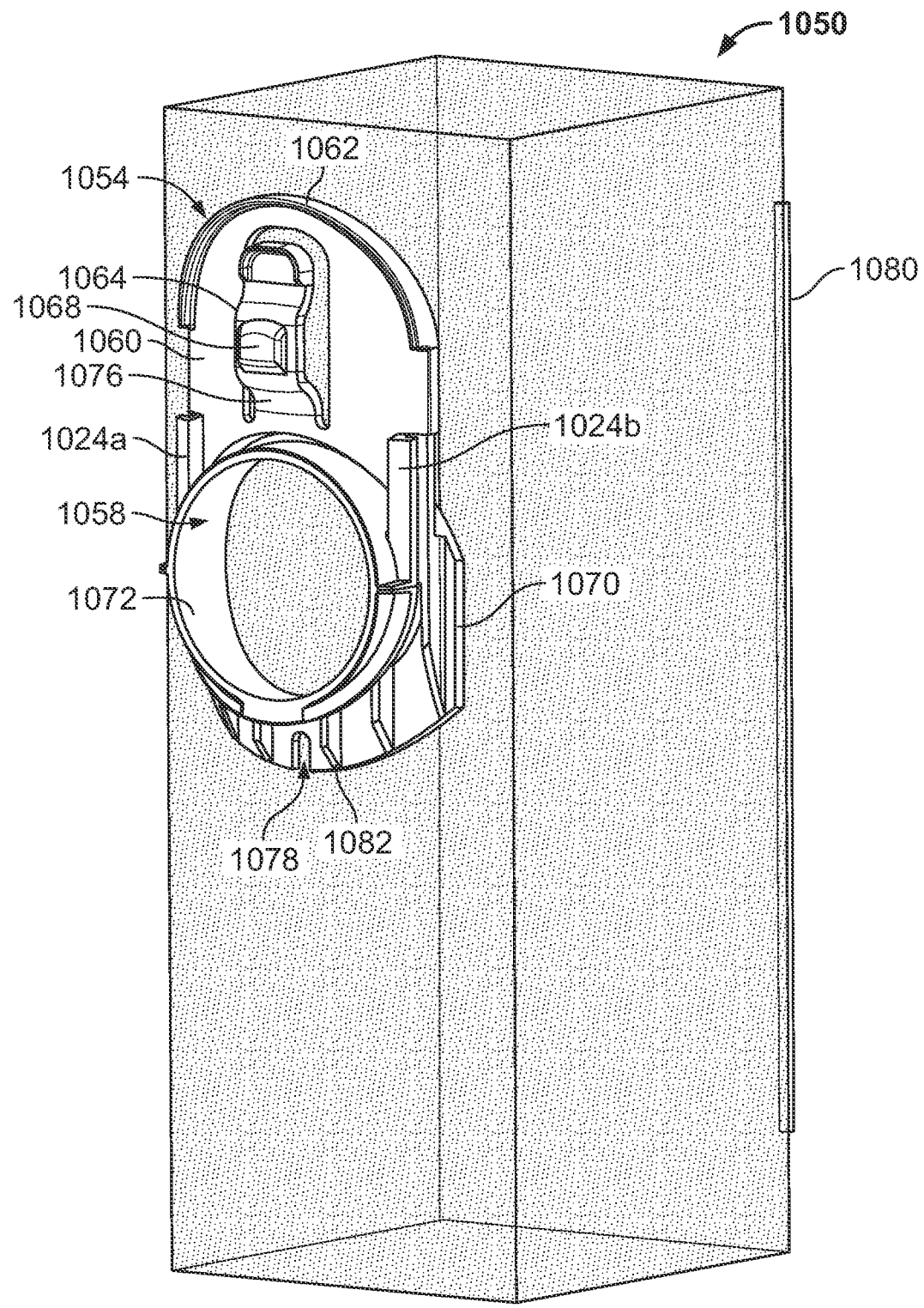
FIG. 30 is a front perspective view of the removable liner of FIG. 25.
Figure 31:
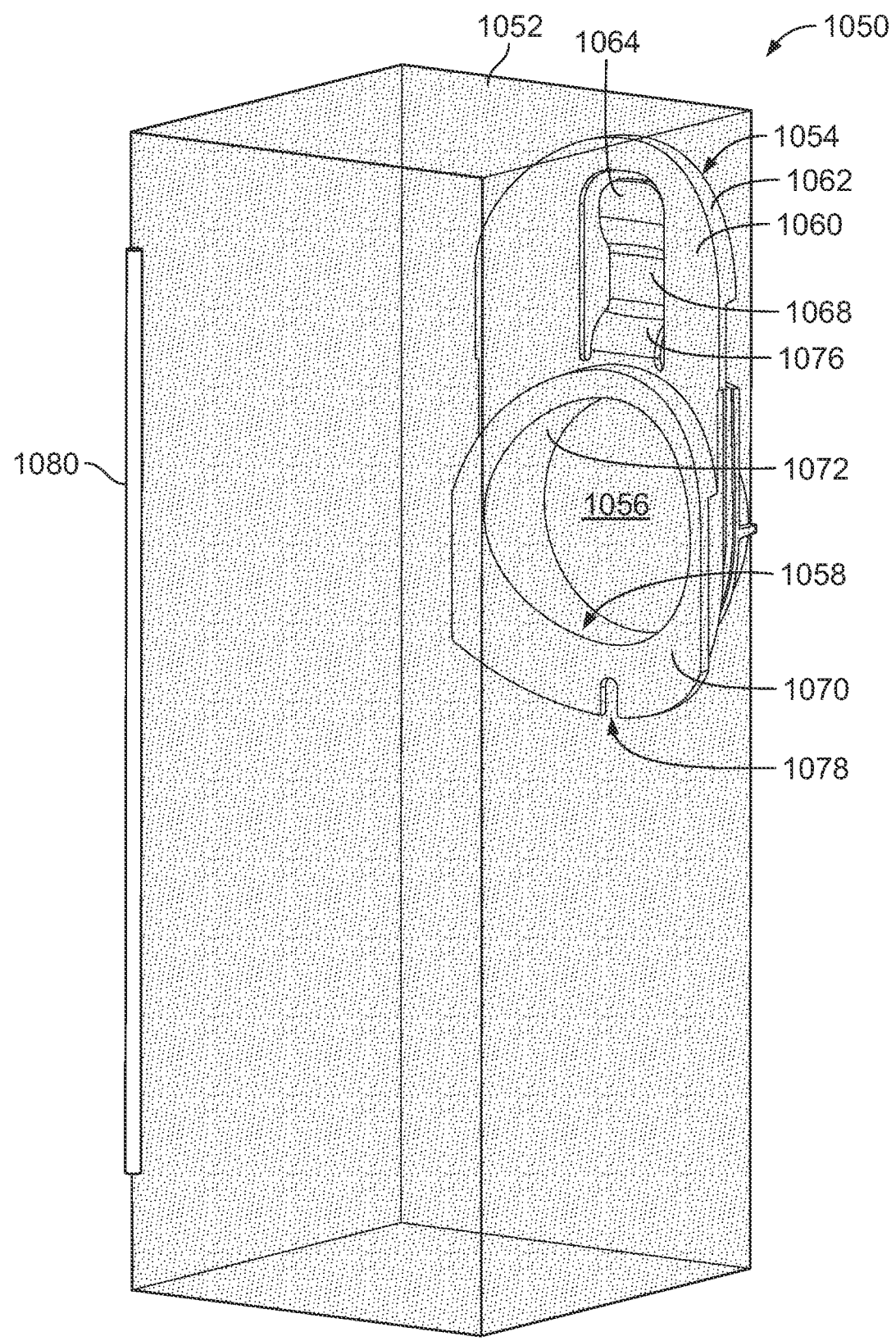
FIG. 31 is a rear perspective view of the removable liner of FIG. 25.

FIG. 30 is a front perspective view of the disposable liner 1050 and FIG. 31 is a rear perspective view of the disposable liner 1050. The disposable liner 1050 can include a mesh debris bag 1052 and a rigid connection tab 1054 attached thereto that can be configured to removably engage the disposable liner 1050 with the strainer basket 1010. The debris bag 1052 defines a generally closed chamber with an inlet aperture 1056 (e.g., similar to a traditional vacuum bag with a single inlet) for receiving debris laden water through the inlet 1032 of the strainer basket 1010. The debris bag 1052 can be generally tubular and have "boxed" corners, but of course, other shapes are possible. According to some aspects of the present disclosure, the debris bag 1052 can be formed from a contiguous piece of mesh material (e.g., a rectangle) with a single seam that can be welded or sewn, continuously, using automation processes known to those of ordinary skill in the art, and the resulting tube can then be cut to length. The end-seams of the debris bag 1052 can also be welded, or sewn, when the bag 1052 is cut to length. The mesh debris bag 1052 can define a plurality of openings (not shown) having diameters that are the same size as, or smaller than, the diameters of openings 1044 of the strainer basket 1010 (see, e.g., FIG. 25). Advantageously, this permits the debris bag 1052 to capture debris that would ordinarily not be captured by the strainer basket 1010, and/or debris which would ordinarily get lodged in the openings 1044 of the strainer basket 1010. According to some embodiments, the bag 1052 can include one or more stiffeners, such as a wires, tubes, or the like that traverse the perimeter/exterior of the bag 1052, in order to support the bag 1052 and prevent same from being drawn through the inlet aperture 1032 of the strainer basket 1010 during backflow operations. For example, as shown, a vertical support member 1080 can be integrated into the continuous seam of the bag 1052, opposite the connection tab 1054. Additionally, the basket 1010 could also be provided with one or more tracks, tabs, or the like (e.g., positioned within the interior chamber 1030 and opposite the inlet aperture 1032), configured to removably retain the vertical support member 1080 against the body 1012 of the basket 1010, thereby providing further support for the bag 1052 and preventing same from being drawn into the inlet aperture 1032 of the strainer basket 1010 during backflow operations.

The rigid connection tab 1054 includes a body 1060, an aperture wall 1072 extending from (e.g., generally perpendicular to) the body 1060 and defining an inlet aperture 1058, a handle 1062, a locking tab 1064, one or more tracks 1024a and 1024b disposed about the aperture wall 1072, and a flange 1070 extending about a lower periphery of the body 1060 and the inlet aperture 1058. The flange 1070 can be configured to enhance the structural rigidity of the connection tab 1054 and includes one or more alignment features, such as one or more of a notch 1078 and ribs 1082, configured to assist a user with positioning the connection tab 1054 within the basket 1010 and engaging the liner 1050 therewith. The locking tab 1064 can be provided with a protrusion 1068 configured to engage the handle 1020 of the basket 1010 when positioned therein (see, e.g., FIG. 25).

The inlet aperture 1056 of the debris bag 1052 can be secured about the aperture wall 1072 of the connection tab 1054. As will be discussed in greater detail herein, the tracks 1024a and 1024b of the connection tab 1054 are sized and shaped to removably engage the connection flange 1038 of the basket 1010. The handle 1062 can be configured to allow a user to easily grasp the disposable liner 1050 and remove the liner 1050 from the strainer basket 1010 when the bag 1052 has been filled with debris, while also minimizing the user's contact with the debris. As shown in FIGS. 25 and 26, the handle 1062 can extend above the annular flange 1018 of the basket 1010, such that the user can grasp the handle 1062 when the liner 1050 is engaged with the with the basket 1010. According to certain embodiments of the present disclosure, the handle 1062 can also function as a handle for the basket 1010 when the liner 1050 is engaged therewith, allowing a user to remove both the liner 1050 and basket 1010 from, for example, a pool or spa pump with a single movement.

Additionally, the handle 1062 can be bonded to the debris bag 1052, or the handle 1062 can include a feature that engages the bag 1052, such that the bag 1052 is prevented from collapsing into the interior of the strainer basket 1010 and blocking the inlet aperture 1032 during backflow operations. One or more bars (see, e.g., bars 270 of FIG. 10), or a grating, can also be disposed within the inlet aperture 1058 of the connection tab 1054 in order to prevent the debris bag 1052 from being drawn into the inlet aperture 1032 of the strainer basket 1010 during a backflow operation. According to some embodiments of the present disclosure, the debris bag 1052 can be formed from a material that is sufficiently rigid, such that the bag 1052 is self-supporting (e.g., holding its shape against gravity and water flow) and does not collapse into the interior of the strainer basket 1010 during normal operation of the filter, or during a backflow operation.

The debris bag 1052 and the tab 1054 can be secured together using ultrasonic welding, chemical adhesives, or the like, or these components could be formed together as a single component. For example, the debris bag 1052 and the tab 1054 could both be formed from polymers that can be formed both into a textile (e.g., the bag 1052) and an injection-molded component (e.g., the tab 1054), such that the debris bag 1052 and the tab 1054 can be easily welded to each other, being formed from the same material. Such materials can include polyester, nylon, and the like. For example, the bag 1052 can be formed from a contiguous sheet of 0.100" diamond polyester mesh having a thickness of 0.031". The bag 1052 can also be formed from a polyester mesh fabric that is a mixture of polyester and bamboo, making the bag 1052 more environmentally friendly.

The connection tab 1054 can have a curvature that matches the curvature of the cylindrical body 1030 of the basket 1010 and, as mentioned above, the connection flange 1038 of the basket 1010 is configured to removably receive the first and second tracks 1024a and 1024b of the connection tab 1054, such that the connection tab 954 can be positioned against the cylindrical body 1012 of the of basket 1010 when the disposable liner 1050 is engaged therewith. Additionally, the connection flange 1038 of the basket 1010 can be slidably received by, or be in snap-fit engagement with, the first and second tracks 1024a and 1024b of the connection tab 1054. Conversely, the tracks 1024a and 1024b can also be configured to slidably receive the connection flange 1038. According to some embodiments, the first and second tracks 1024a and 1024b and/or the notch 1078 of the connection tab 1054 can cooperate with the support 1026, vertical members 1034, and/or connection flange 1038, of the basket 1010 to facilitate a blind-mate interface for installation of a new disposable liner 1050 within the strainer basket 1010, without the use of tools.

Additionally, the aperture wall 1072 can be sized and positioned on the body 1060 of the connection tab 1054, such that the aperture wall 1072 is substantially concentric with at least a portion of the inlet wall 1016 of the basket 1010 and the inlet apertures 1032, 1056, and 1058 aligned when the disposable liner 1050 is engaged with the basket 1010 (e.g., as shown in FIG. 25). For example, as shown in FIGS. 25 and 26, the aperture wall 1072 of the connection tab 1054 can have an exterior diameter that is less than an inner diameter of a curved portion of the aperture wall 1016 of the basket 1010 and can have a height such that the aperture wall 1072 of the connection tab 1054 extends into the inlet aperture 1032 basket 1010. According to some embodiments of the present disclosure, the inlet wall 916 of the basket 1010 and the aperture wall 1072 of the connection tab can be configured such that the aperture wall 1072 extends beyond the cylindrical body 1012 and there is clearance therebetween, providing for a direct connection between the aperture wall 1072 of the liner 1050 and the outlet of, for example, a pool or spa pump.

In operation, a user can vertically align the tracks 1024a and 1024b of the connection tab 1054 with the connection flange 1038 of the basket 1010 (e.g., as shown in FIGS. 27 and 28), and then lower the connection tab 1054 into the basket 1010, such that the flange 1038 is slidably received by the tracks 1024a and 1024b. As shown best in FIG. 26, the notch 1078 of the connection tab 1054 can rest on the support 1026 of the basket 1010, thereby preventing further downward travel and providing rotational/angular alignment. The ribs 1082 of the connection tab 1054 can also slide between the vertical members 1034 of the basket 1010 as the connection tab 1054 is received therein, providing for additional rotational/angular alignment. Additionally, the protrusion 1068 of the locking tab 1064 can engage a lower face of the basket handle 1020, thereby preventing upward travel of the connection tab 1054 and securing the liner 1050 within the basket 1010. Furthermore, the connection tab 1054, and the locking tab 1064, can be formed from a resiliently deformable material. As such, a user can disengage the connection tab 1054 from the basket 1010 by applying a force against the locking tab 1064 (e.g., towards the interior of the basket 1010) until the locking tab 1064 is deflected and the protrusion 1068 is no longer retained under the handle 1020 of the basket 1010 and by pulling upward on the handle 1062 of the liner 1050. The locking tab 1064 can also be provided with a ramped portion 1076 to facilitate deflection of the locking tab 1064 and displacement of the protrusion 1068 as the connection tab 1054 is inserted into the basket 1010.

Figure 32:
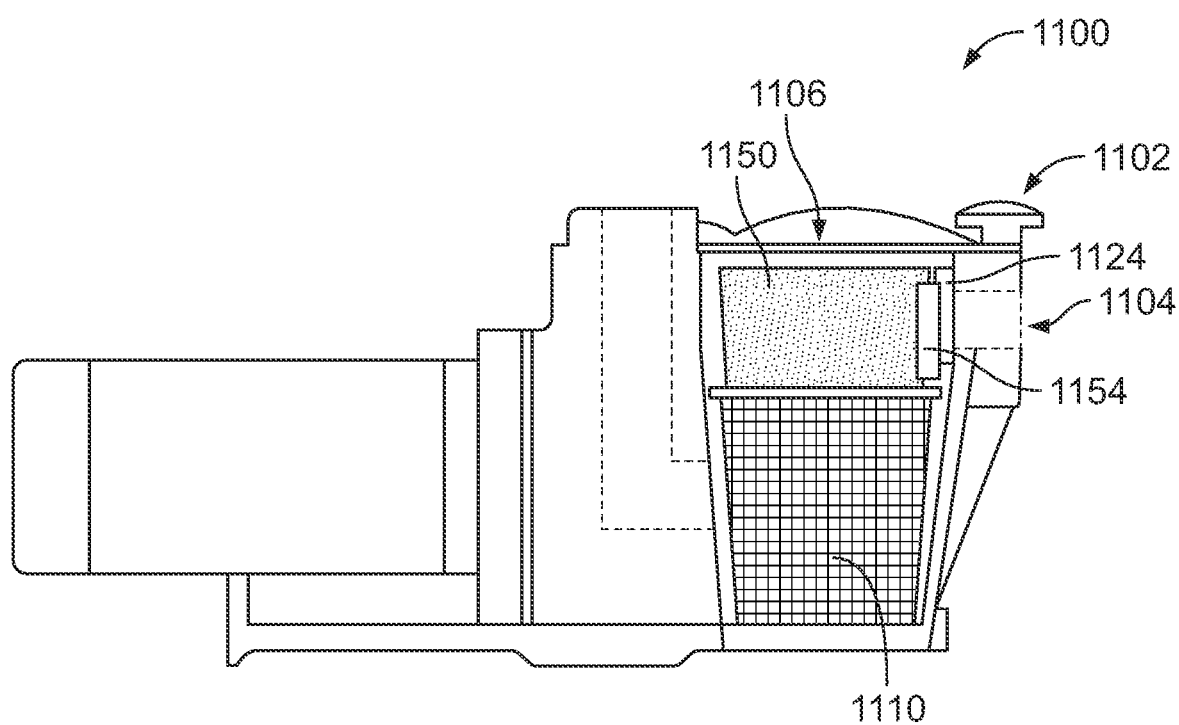
FIG. 32 is a partial cross-sectional view of another embodiment of the disposable insert system of the present disclosure, including a strainer basket and a removable liner and positioned within a pool or spa pump.
Figure 33:
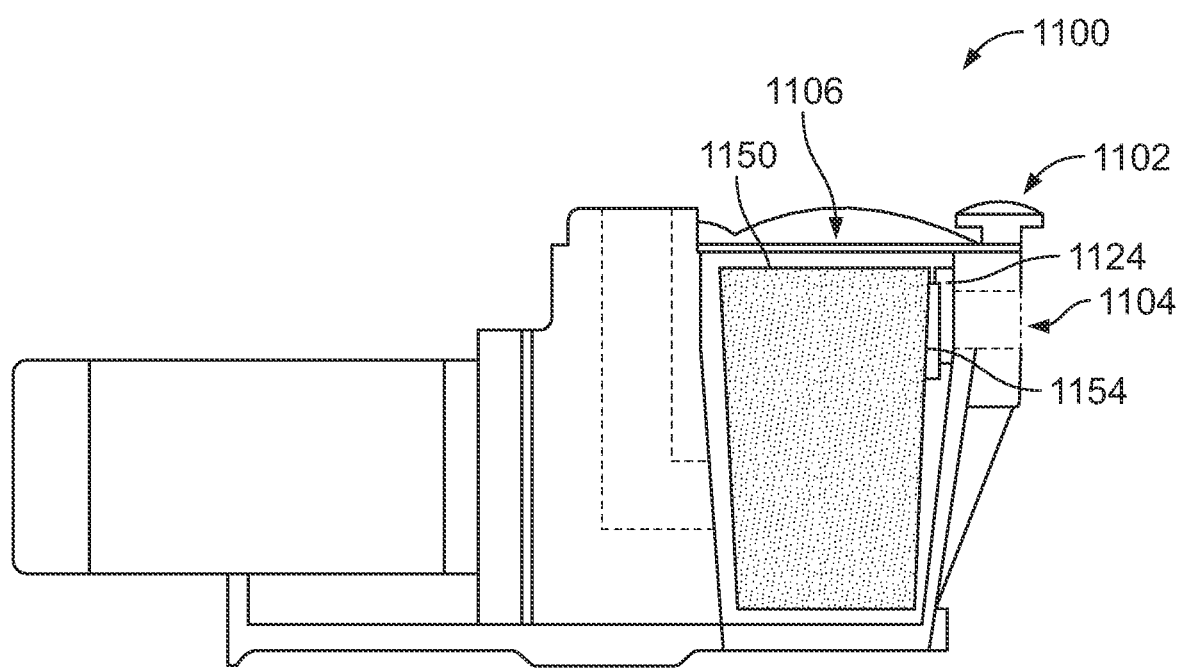
FIG. 33 is a partial cross-sectional view of another embodiment of the disposable insert system of FIG. 32, wherein the strainer basket is not provided.

FIGS. 32-33 illustrate another embodiment of the disposable insert strainer system, indicated generally at 1100, including a strainer basket 1110 and a disposable liner 1150. Specifically, FIG. 32 is a partial cross-sectional view of the strainer system 1100 positioned in a pool or spa pump 1102 and FIG. 33 is a partial cross-sectional view of the strainer system 1100 positioned in the pump 1102 with the basket 1110 removed.

As shown in FIG. 32, the basket 1110 is positioned within a chamber 1106 of the pool or spa pump 1102 and below a fluid inlet 1104 thereof, and the disposable liner 1150 is positioned at least partially within the basket 1110 and coupled about the inlet 1104. The basket 1110 can be substantially similar to any of the baskets disclosed herein (e.g., baskets 10, 410, 710, 910, and 1010), but for the inclusion of an inlet aperture (e.g., inlet aperture 32) in the sidewall thereof, and the disposable liner 1150 can be substantially similar in form and function to any of the liners disclosed herein (e.g., liners 50, 150, 550, 650, 850, 950, and 1050). Additionally, the pump 1102 can be provided with one or more engagement features 1124 (e.g., formed on an inner wall of the pump 1102) for removably securing the liner 1150 directly within the pump chamber 1106. The engagement features 1124 can be similar to other engagement features discussed herein, such as tracks 424a and 424b described in connection with FIG. 13, tracks 924a and 924b described in connection with FIG. 21, and/or connection flange 1038 described in connection with FIG. 28, and can be provided within the chamber 1106 of the pump 1102 to provide a direct connection therebetween, as opposed to providing a direct connection to respective baskets 410, 910, and 1010. For example, the liner 1150 can include a rigid connection tab 1154 that is substantially similar in both form and function to connection tab 954 of liner 950 and the engagement features 1124 of the pump 1102 can be substantially similar to the tracks 924a and 924b of basket 910, providing for direct removable engagement between the liner 1150 and the pump 1102. According to further embodiments of the present disclosure, the engagement features 1124 can be adapters coupled to the pump 1102 and can be substantially similar to other adapters disclosed herein (e.g., adapters 180, 280, and 380). For example, the rigid connection tab 1154 of the liner 1150 can be substantially similar in both form and function to the connection tab 154 of the liner 150 and the engagement features 1124 of the pump 1102 can be substantially similar to the adapter 180 of system 100, described in connection with FIG. 9. Accordingly, an existing pool or spa pump, or other fluid handling device, can be retrofitted to accept the disposable liners disclosed herein, without requiring modification of the pump or other fluid handling device. It should also be understood that the engagement features 1124 of the pump are not required to be positioned about the inlet 1104 of the pump 1102 and can be positioned therebelow. According to one example, the liner 1150 could be similar to the liner 50, described in connection with FIG. 3, but having continuous walls (e.g., without inlet aperture 56) and engagement features 1124 of the pump 1102 could be positioned circumferentially about the interior of the chamber 1106 below the inlet 1104 to removably engage a peripheral flange (e.g., peripheral flange 60) of the liner 1150.

As shown in FIG. 32, the liner 1150 can be positioned within the basket 1110, thereby providing additional support for the liner 1150. However, it should also be understood that the liner 1150 can be positioned directly within the pump chamber 1106, without requiring the basket 1110, as shown in FIG. 33. According to some embodiments, the liner 1150 can include one or more stiffeners, such as a wires, tubes, or the like (e.g., vertical support member 980 described in connection with FIG. 23) that traverse the perimeter/exterior thereof, in order to support the liner 1150 and prevent same from being drawn into the inlet 1104 of the pump 1102 during backflow operations. In such embodiments, the pump chamber 1106 could also be provided with one or more additional tracks, tabs, or the like (e.g., positioned opposite the inlet 1104), configured to removably retain the support member against an inner surface of the pump chamber 1106, thereby providing further support for the liner 1150 and preventing same from being drawn into the inlet 1104 during backflow operations.

The various exemplary strainer baskets, disposable inserts and related components of the systems described in connection therewith can be formed from one or more environmentally friendly materials, for example, metals such as steel and aluminum. Post-consumer recycled plastics can be formed into fibers or threads which can be used to form the mesh bags disclosed herein and other components can be molded, partially, or entirely, from "regrind," which is plastic waste produced during other molding operations. Fibers from bamboo, hemp, wood, animal hair, etc. can be used to create woven and non-woven sheets that can form the disposable debris bags disclosed herein. Biodegradable polymers can also be used, as well as additives to accelerate the biodegradation process. Table 1 provides a list of commercially available biodegradable products that can be used to form the various components of the present disclosure.

TABLE 1

| Product | Society | Composition | Applications |
| --- | --- | --- | --- |
| Mater-Bi ® | Novamont (Italy) | Starch and polyester | Collection bags for green waste agricultural films, disposable items. |
| Polynat ® | Rovere'h (France) | Rye flower (80%) | Disposable items, flower containers |
| Ecofoam ® | American Excelsior Company (USA) | Starch | Wrapping plastics |
| Biopol ® | Goodfellow (Great Britain) | PHB/PHV | Razors, bottles |
| Eco-pla ® | Cargill Dow (USA) | PLA | Sanitary products, sport clothes, conditioning and packaging |
| Bio-D ® | Cirad (France) | Proteins extracted from cotton seed | Agricultural films |
| Ecoflex ® | BASF (Germany) | Co-polyester | Agricultural Films |
| Eastar Bio ® | Eastman (Great Britain) | Co-polyester | Agricultural films |
| BAK 1095 ® | Bayer (Germany) | Polyester amide | Disposable items, flower containers |

One or more of the debris bags of the present disclosure can be formed from a metal wire mesh using a deep drawing process, whereby the metal mesh is drawn into a concave shape, and an inlet aperture can be formed in the deep drawn mesh bag in a secondary operation. Wire mesh could also be welded together to form the required components. Additionally, one or more of the debris bags of the present disclosure can be formed from a thermoplastic material using a thermoforming (e.g., vacuum and/or pressure forming) process and an inlet aperture and filter openings could be formed in the resultant component in a secondary operation. As discussed above, one or more of the strainer baskets, adapters, connection tabs, or the rigid, or semi-rigid, debris bags can be formed using an injection molding process.

While discussed herein in connection with a pump assembly for a pool or spa, it should be understood that any of the strainer systems (e.g., strainer systems 100, 500, 600, 900, and 1000) and/or related components (e.g., baskets 10, 410, 710, 910, and 1010, liners 50, 150, 550, 650, 850, 950, and 1050, connection tabs 154, 254, 954, and 1054, frame 70, adapters 180, 280, and 380, etc.) disclosed herein can be utilized in connection with a plurality of fluid handling devices and environments where fluid straining and/or filtration is required or desired and where streamlined installation, usage, removal, disposal, and replacement of straining and/or filtration systems by a pool/spa owner, service technician, or other personnel is preferable. Furthermore, one or more of the adapters disclosed herein (e.g., adapters 180, 280, and 380), or similar adapters, can be used in connection with existing devices to allow same devices to engage with one or more of the removable liners (e.g., liners 50, 150, 550, 650, 850, 950, and 1050), thereby providing same existing devices with the enhanced functionality described herein. For example, the strainer systems and/or related components disclosed herein can be located in a fluid flow path in front of a traditional pool or spa filter and function as disposable pre-filters and can be utilized as disposable debris collection vessels in robotic cleaners, suction cleaners, leaf canisters, and the like.

Having thus described the present disclosure in detail, it is to be understood that the foregoing description is not intended to limit the spirit or scope thereof.

What is claimed is:

1. A disposable insert system for a swimming pool or spa fluid handling device having an open-topped pump strainer basket and being installable in a swimming pool or spa filtration system, the open-topped pump strainer basket having an intake aperture in a sidewall thereof for receiving water to be strained as it flows through the fluid handling device, comprising:

a removable liner sized and shaped to be inserted into the open-topped pump strainer basket of the fluid handling device, the removable liner including:

a connection tab formed from a rigid material having an inlet aperture for receiving water to be strained, the inlet aperture being sized and shaped to align with and fluidically engage the intake aperture of the strainer basket; and a flexible body having an inlet in a sidewall thereof and being secured about the inlet aperture of the connection tab, the flexible body defining a central chamber for receiving the water through the inlet to be strained and having a plurality of openings formed therein, the plurality of openings having diameters smaller than openings of the strainer basket, wherein the connection tab of the removable liner is removably engageable with one or more retainers positioned about the intake aperture of the open-topped pump strainer basket.

2. The disposable insert system of claim 1, in combination with the fluid handling device.

3. The disposable insert system of claim 2, wherein the fluid handling device is a pool or spa pump.

4. The disposable insert system of claim 1, wherein the flexible body is formed from a biodegradable mesh material.

5. The disposable insert system of claim 4, wherein the connection tab is formed from a biodegradable material.

6. The disposable insert system of claim 1, further comprising an adapter collar securable to the intake aperture of the open-topped pump strainer basket, the adapter collar including the one or more retainers.

7. The disposable insert system of claim 6, wherein the intake aperture of the open-topped pump strainer basket, the adapter collar, the inlet aperture of the connection tab, and the central chamber of the flexible body form a continuous flow path for receiving the water to be strained.

8. The disposable insert system of claim 6, wherein the connection tab includes a peripheral flange extending about the inlet aperture of the connection tab, the peripheral flange removably engageable with the one or more retainers of the adapter collar.

9. The disposable insert system of claim 6, wherein the connection tab includes one or more alignment features and the adapter collar includes one or more reciprocal alignment features that cooperate to align the inlet aperture of the connection tab with the adapter collar.

10. The disposable insert system of claim 6, wherein the connection tab is slidably engageable with the adapter collar.

11. The disposable insert system of claim 6, wherein the connection tab is in snap-fit engagement with the adapter collar.

12. The disposable insert system of claim 1, wherein the connection tab includes a handle for disengaging the removable liner from the open-topped pump strainer basket.

13. The disposable insert system of claim 12, wherein the connection tab and the handle are integrally formed.

14. The disposable insert system of claim 12, wherein the handle includes a vertical support member extending from a peripheral flange about the inlet aperture of the connection tab and a horizontal support member depending from an upper edge of the vertical support member.

15. The disposable insert system of claim 12, wherein the handle includes a vertical support member extending from a peripheral flange about the inlet aperture of the connection tab, the vertical support member having an aperture therein that is located adjacent to an upper edge thereof.

16. The disposable insert system of claim 12, wherein the flexible body is attached to the handle such that the flexible body is prevented from entering the intake aperture of the open-topped pump strainer basket during a fluid handling device backflow operation.

17. The disposable insert system of claim 1, wherein the flexible body and the connection tab are formed from one or more similar materials.

18. The disposable insert system of claim 17, wherein the flexible body and the connection tab are bonded together via ultrasonic welding.

19. The disposable insert system of claim 1, in combination with the open-topped pump strainer basket.

20. The disposable insert system of claim 19, wherein the open-topped pump strainer basket includes a body defining a central chamber and a plurality of outlet openings in the body;
    wherein the inlet aperture is in fluidic communication with the central chamber; and
    wherein the removable liner is removably engageable with the strainer basket.

21. The disposable insert system of claim 20, wherein the removable liner is removably engageable with one or more retainers positioned about an interior chamber of the fluid handling device.

22. The disposable insert system of claim 21, wherein the one or more retainers comprise an adapter configured to be positioned about an inlet of the fluid handling device.

23. The disposable insert system of claim 20, wherein the flexible body is formed from a biodegradable mesh material.

24. The disposable insert system of claim 23, wherein the connection tab is formed from a biodegradable material.

25. The disposable insert system of claim 20, further comprising an adapter collar securable to the intake aperture of the open-topped pump strainer basket, the adapter collar including the one or more retainers.

26. The disposable insert system claim 25, wherein the intake aperture of the open-topped pump strainer basket, the adapter collar, the inlet aperture of the connection tab, and the central chamber of the flexible body form a continuous flow path for receiving the water to be strained.

27. The disposable insert system of claim 25, wherein the connection tab includes a peripheral flange extending about the inlet aperture of the connection tab, the peripheral flange removably engageable with the one or more retainers of the adapter collar.

28. The disposable insert system of claim 25, wherein the connection tab includes one or more alignment features and the adapter collar includes one or more reciprocal alignment features that cooperate to align the inlet aperture of the connection tab with the adapter collar.

29. The disposable insert system claim 25, wherein the connection tab is slidably engageable with the adapter collar.

30. The disposable insert system of claim 25, wherein the connection tab is in snap-fit engagement with the adapter collar.

31. The disposable insert system of claim 20, wherein the connection tab includes a handle for disengaging the removable liner from the open-topped pump strainer basket.

32. The disposable insert system of claim 31, wherein the connection tab and the handle are integrally formed.

33. The disposable insert system of claim 31, wherein the handle includes a vertical support member extending from a peripheral flange about the inlet aperture of the connection tab and a horizontal support member depending from an upper edge of the vertical support member.

34. The disposable insert system of claim 31, wherein the handle includes a vertical support member extending from a peripheral flange about the inlet aperture of the connection tab, the vertical support member having an aperture therein that is located adjacent to an upper edge thereof.

35. The disposable insert system of claim 31, wherein the flexible body is attached to the handle such that the flexible body is prevented from entering the intake aperture of the open-topped pump strainer basket during a fluid handling device backflow operation.

36. The disposable insert system of claim 20 in combination with the fluid handling device.

37. The disposable insert system of claim 36, wherein the fluid handling device is a pool or spa pump.

* * * * *